(12) United States Patent
Schorey et al.

(10) Patent No.: US 12,455,623 B2
(45) Date of Patent: Oct. 28, 2025

(54) MULTIPLE SWITCHING ELECTROMYOGRAPHY (EMG) ASSISTIVE COMMUNICATIONS DEVICE

(71) Applicant: Control Bionics Limited, Camberwell (AU)

(72) Inventors: James E. Schorey, Milford, OH (US); Peter S. Ford, Sydney (AU); Robert W. Wong, Sydney (AU)

(*) Notice: Subject to any disclaimer, the term of this patent is extended or adjusted under 35 U.S.C. 154(b) by 982 days.

(21) Appl. No.: 17/556,063

(22) Filed: Dec. 20, 2021

(65) Prior Publication Data

US 2022/0113799 A1    Apr. 14, 2022

Related U.S. Application Data

(63) Continuation-in-part of application No. 16/192,976, filed on Nov. 16, 2018, now Pat. No. 11,284,844.

(60) Provisional application No. 62/737,070, filed on Sep. 26, 2018, provisional application No. 62/587,356, filed on Nov. 16, 2017.

(51) Int. Cl.
*G06F 3/01* (2006.01)
*G06F 3/0346* (2013.01)

(52) U.S. Cl.
CPC .......... *G06F 3/015* (2013.01); *G06F 3/0346* (2013.01)

(58) Field of Classification Search
CPC .......... G06F 3/015; G06F 3/013; G06F 3/011; G06F 3/0346
See application file for complete search history.

(56) References Cited

U.S. PATENT DOCUMENTS 10,980,480 B2 *   4/2021   Grant ................. A61B 5/287
11,853,478 B2 *  12/2023   Schorey ............. G06F 3/011

\* cited by examiner

*Primary Examiner* — An H Do
(74) *Attorney, Agent, or Firm* — Jenei LLC

(57) ABSTRACT

A method, human interface device, and computer program product that provide improved multilevel switching from each bioelectrical sensor with inclusion of switch filtering based on extraneous events (e.g., spasms). A biosignal is received from a sensor device by an electronic processor of a first electrode switch device. In response to determining that the amplitude of the signal has changed from less than a first switch range to greater than the first switch range and less than the second switch range, the electrode switch device communicates a first switch signal to control the human interface system. In response to determining that the amplitude of the biosignal has changed from less than the second switch range to greater than the second switch range, the electronic switch device performs one of: (i) ignoring the instance and (ii) transmitting a second switch signal to control the human interface system.

18 Claims, 23 Drawing Sheets

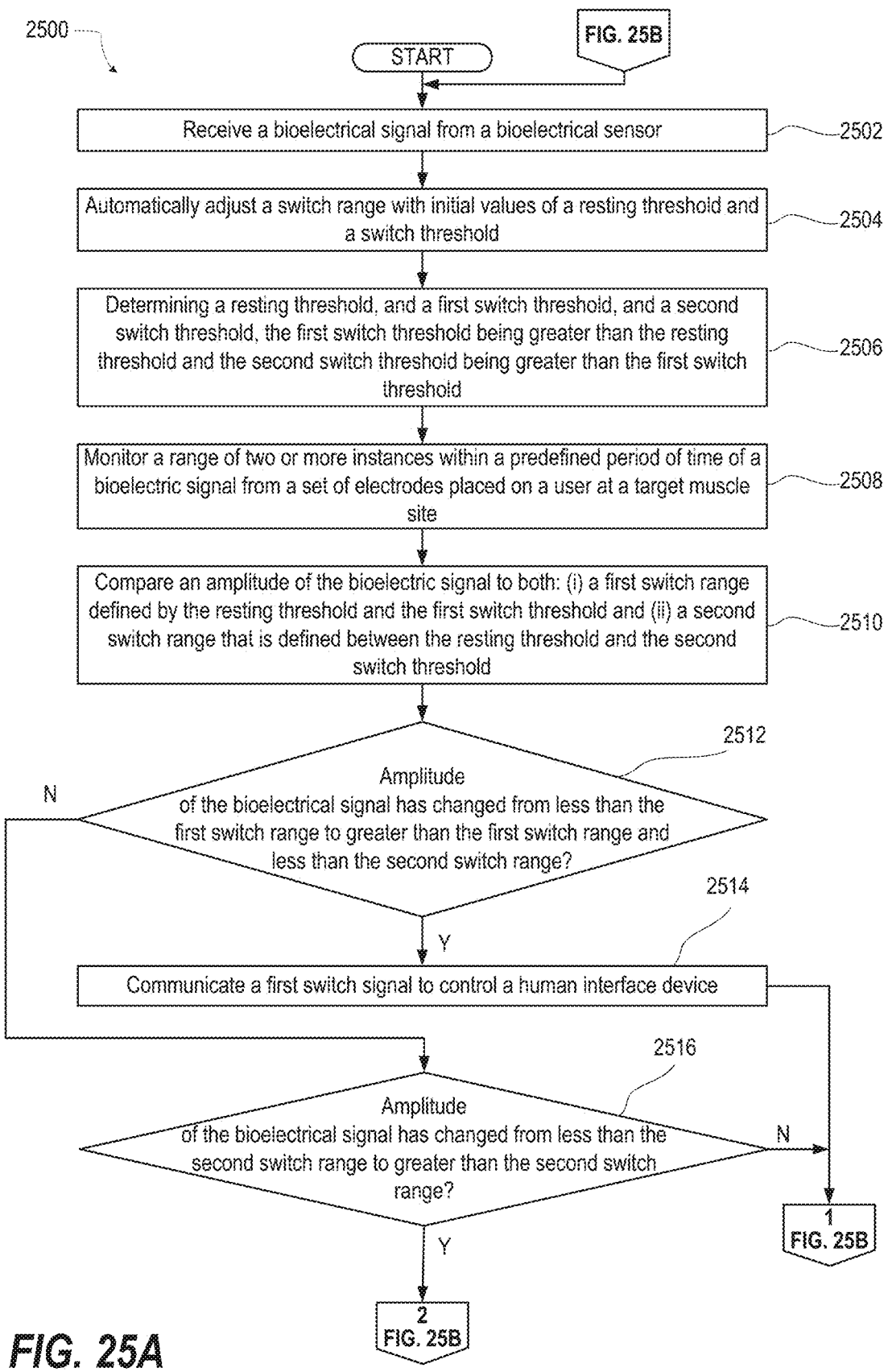

MULTIPLE SWITCHING ELECTROMYOGRAPHY (EMG) ASSISTIVE COMMUNICATIONS DEVICE

FIELD OF THE INVENTION

The present application is a continuation-in-part to U.S. patent application Ser. No. 16/192,976 entitled "Electromyography (EMG) Assistive Communications Device with Context-Sensitive User Interface" filed 16 Nov. 2018, which claims priority to U.S. Provisional Application No. 62/587,356 entitled "ELECTROMYOGRAPHY (EMG) ASSISTIVE COMMUNICATIONS DEVICE" filed 16 Nov. 2017, and to U.S. Provisional Application No. 62/737,070 entitled "ELECTROMYOGRAPHY (EMG) ASSISTIVE COMMUNICATIONS DEVICE" filed 26 Sep. 2018, all of which are hereby expressly incorporated by reference herein.

FIELD OF THE INVENTION

The present disclosure generally relates to biosignal switch controls and more particularly to electromyography-based switching systems having an artificial intelligent interface.

BACKGROUND OF THE INVENTION

Various types of injuries and diseases can limit the ability of an affected person with controlling various kinds of user interfaces. Such conditions include amyotrophic lateral sclerosis (ALS), also known as Lou Gehrig's disease, motor neuron disease (MND), spinal cord injury (SCI), or cerebral palsy (CP). Alternative/augmentative communication (AAC) technologies are increasingly becoming available that can provide a measure of control to some but not all of these individuals. In particular, some degree of control is provided by eye tracking devices, blow tubes, a face actuated toggle switch, etc. However, some individuals lack sufficient controllable movement to use such AAC technologies. Devices on the Assistive Technology (AT) market do not adjust over time to the user's abilities. In a matter of months, for example, an ALS patient can lose speech and motor control that were available when a device was first adopted. Other users may experience a significant drop in motor abilities over the span of a single session due to fatigue.

Attempts at expanding the number of people who can use AAC include use of biosignals. A motor unit is defined as one motor neuron and all of the muscle fibers that the one motor neuron innervates. When a motor unit fires, the impulse (called an action potential) is carried down the motor neuron to the muscle. The area where the nerve contacts the muscle is called the neuromuscular junction, or the motor end plate. After the action potential is transmitted across the neuromuscular junction, an action potential is elicited in all of the innervated muscle fibers of that particular motor unit. The sum of all this electrical activity from multiple motor units, the signal typically evaluated during electromyography, is known as a motor unit action potential (MUAP). This electrophysiological activity measures muscle response or electrical activity in response to a nerve's stimulation of the muscle. The composition of the motor unit, the number of muscle fibers per motor unit, the metabolic type of muscle fibers and many other factors affect the shape of the motor unit potentials in the myogram.

Generally known systems for using biosignals are labor intensive, requiring extensive setup time and frequent adjustments by a trained clinician in order to provide a usable system. Each individual can have a markedly different range of biosignals as compared to another person. Even the same person can have a wide variation in the characteristics of the biosignals as the person becomes tired. Moreover, certain individuals can have a complicated response including involuntary spasms that may lead to false switching signals.

SUMMARY OF THE INVENTION

In one aspect, the present disclosure provides for methods that include receiving a signal from a biosignal sensor by an electronic processor of a first switch device. In another aspect, the methods include determining a resting threshold, and a first switch threshold, and a second switch threshold. The first switch threshold is greater than the resting threshold. The second switch threshold is greater than the first switch threshold. The method includes monitoring, by the electronic processor, a range of two or more instances within a predefined period of time of a biosignal from a set of electrodes placed on a user at a target muscle site. Each instance comprises a first resting level, followed by a switching level that is greater than the first resting level, and second resting level that is less than the switching level. The method includes comparing, by the electronic processor, an amplitude of the biosignal to both: (i) a first switch range defined by the resting threshold and the first switch threshold and (ii) a second switch range that is defined between the resting threshold and the second switch threshold. In response to determining that the amplitude of the biosignal has changed from less than the first switch range to greater than the first switch range and less than the second switch range, the method includes communicating, by the first electrode switch device, a first switch signal to control a human interface device. In response to determining that the amplitude of the biosignal has changed from less than the second switch range to greater than the second switch range, the method includes performing one of: (i) ignoring the instance and (ii) communicating, by the first electrode switch device, a second switch signal to control the human interface system.

In another aspect, the present disclosure provides a human interface system including a first electrode switch device comprising a biosignal sensor having a set of electrodes configured to be placed on a user at a target muscle site to receive a biosignal. The human interface system includes a controller having an electronic processor communicatively connected to the biosignal sensor and a human interface device. The controller determines a resting threshold, a first switch threshold, and a second switch threshold. The first switch threshold is greater than the resting threshold and the second switch threshold is greater than the first switch threshold. The controller monitors a range of two or more instances within a predefined period of time of a biosignal from a set of electrodes placed on a user at a target muscle site. Each instance comprising a first resting level, followed by a switching level that is greater than the first resting level, and second resting level that is less than the switching level. The controller compares an amplitude of the biosignal to both: (i) a first switch range defined by the resting threshold and the first switch threshold and (ii) a second switch range that is defined between the resting threshold and the second switch threshold. In response to determining that the amplitude of the biosignal has changed from less than the first switch range to greater than the first switch range and less than the second switch range, the controller communicates a first switch signal to control a human interface device. In response to determining that the amplitude of the biosignal has changed from less than the second switch range to greater than the second switch range, the controller performs one of: (i) ignoring the instance and (ii) communicating, by the first electrode switch device, a second switch signal to control the human interface system.

In an additional aspect, the present disclosure provides a computer program product that includes program code on a computer readable storage device. When executed by a processor associated with an electrode switch device, the program code enables the electrode switch device to provide functionality of receiving a biosignal from a bioelectrical sensor. The functionality includes determining a resting threshold, and a first switch threshold, and a second switch threshold, the first switch threshold being greater than the resting threshold and the second switch threshold being greater than the first switch threshold. The functionality includes monitoring a range of two or more instances within a predefined period of time of a biosignal from a set of electrodes placed on a user at a target muscle site. Each instance comprises a first resting level, followed by a switching level that is greater than the first resting level, and second resting level that is less than the switching level. The functionality includes comparing an amplitude of the biosignal to both: (i) a first switch range defined by the resting threshold and the first switch threshold and (ii) a second switch range that is defined between the resting threshold and the second switch threshold. In response to determining that the amplitude of the biosignal has changed from less than the first switch range to greater than the first switch range and less than the second switch range, the functionality includes communicating a first switch signal to control a human interface device. In response to determining that the amplitude of the biosignal has changed from less than the second switch range to greater than the second switch range, the functionality includes performing one of: (i) ignoring the instance and (ii) communicating, by the first electrode switch device, a second switch signal to control the human interface system.

These and other features are explained more fully in the embodiments illustrated herein. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which:

FIGS. 25A-25B depict a flow diagram of a method for multiple switch level control of a human interface system, according to one or more embodiments.

DETAILED DESCRIPTION

Figure 1:
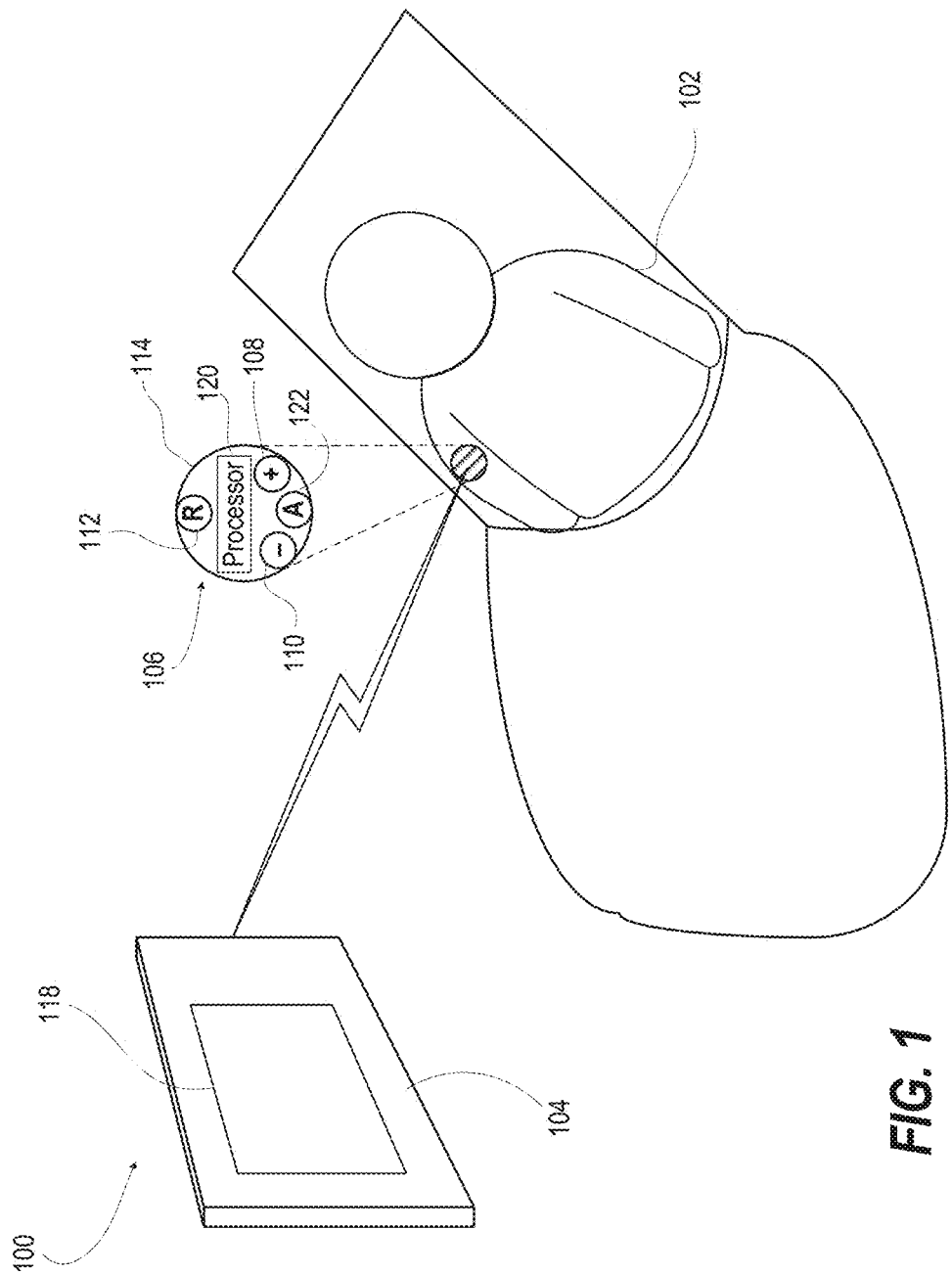
FIG. 1 illustrates a diagram of an EMG device system enabling a user to control a device, such as a user interface device, according to one or more embodiments.

In one aspect, the present disclosure provides a method that includes monitoring a signal from a set of sensors placed on a user. In another aspect, the method includes automatically adjusting a selected one or both of: (i) a resting threshold; and (ii) a switch threshold that is greater than the resting threshold based at least in part on a trend of the biosignal. A determination is made as to whether an amplitude of the biosignal is less than the resting threshold. In response to determining that the amplitude is less than the resting threshold, a further determination is made as to whether an amplitude of the biosignal subsequently is equal to or greater than the switch threshold. In response to determining that the biosignal is greater than the switch threshold, the method includes triggering a device with a switch signal.

In another aspect, the present disclosure provides a system that includes a processor in communication with a set of bioelectrical sensors and a user interface. The processor provides functionality to monitor a biosignal from the set of bioelectrical electrodes. The processor automatically adjusts a selected one or both of: (i) a resting threshold; and (ii) a switch threshold that is greater than the resting threshold based at least in part on a trend of the biosignal. The processor determines whether an amplitude of the biosignal is less than the resting threshold. In response to determining that the amplitude is less than the resting threshold, the processor determines whether an amplitude of the biosignal subsequently is equal to or greater than the switch threshold. In response to determining that the biosignal is greater than the switch threshold, the processor triggers the user interface device with a switch signal.

In another aspect, the present disclosure illustrates various techniques and configurations to enable a series of dynamic workflows for the selection and presentation of content from an information system relevant to activities of a human user. The dynamic workflows used with the biosignal sensor device as described herein enable the integration of user interfaces and user communication platforms to achieve relevant and timely communication among users, other individuals, and related actions. The dynamic workflows described herein further may be integrated with social networks and portable communication mediums to provide additional availability and delivery of content to users in a variety of settings.

In one aspect, the present disclosure provides a method that includes monitoring a biosignal from a set of electrodes placed on a user. The method includes automatically adjusting a selected one or both of: (i) a resting threshold; and (ii) a switch threshold that is greater than the resting threshold based at least in part on a trend of the biosignal. A determination is made as to whether an amplitude of the biosignal is less than the resting threshold. In response to determining that the amplitude is less than the resting threshold, a further determination is made as to whether an amplitude of the biosignal subsequently is equal to or greater than the switch threshold. In response to determining that the biosignal is greater than the switch threshold, the method includes triggering a device with a switch signal.

In another aspect, the present disclosure provides a system that includes a processor in communication with a set of bioelectrical sensors and a user interface. The processor provides functionality to monitor a biosignal from the set of bioelectrical electrodes. The processor automatically adjusts a selected one or both of: (i) a resting threshold; and (ii) a switch threshold that is greater than the resting threshold based at least in part on a trend of the biosignal. The processor determines whether an amplitude of the biosignal is less than the resting threshold. In response to determining that the amplitude is less than the resting threshold, the processor determines whether an amplitude of the biosignal subsequently is equal to or greater than the switch threshold. In response to determining that the biosignal is greater than the switch threshold, the processor triggers the user interface device with a switch signal.

In another aspect, the present disclosure illustrates various techniques and configurations to enable a series of dynamic workflows for the selection and presentation of content from an information system relevant to activities of a human user. The dynamic workflows used with the biosignal sensor device as described herein enable the integration of user interfaces and user communication platforms to achieve relevant and timely communication among users, other individuals, and related actions. The dynamic workflows described herein further may be integrated with social networks and portable communication mediums to provide additional availability and delivery of content to users in a variety of settings.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

While exemplary embodiments incorporating the principles of the present invention have been disclosed herein above, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

As used herein, the term "client application" refers to an application that runs on a client computing device. A client application may be written in one or more of a variety of languages, such as C, C++, C#, J2ME, Java, ASP.Net, VB.Net and the like. Browsers, email clients, text messaging clients, calendars, and games are examples of client applications. A mobile client application refers to a client application that runs on a mobile device. As used herein, the term "network application" refers to a computer-based application that communicates, directly or indirectly, with at least one other component across a network. Web sites, email servers, messaging servers, and game servers are examples of network applications.

As utilized herein, the terms "component," "computer component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more computer components can in various embodiments reside on a server and the server can be comprised of multiple computer components. One or more computer components are in some cases referred to as computer systems whereby one or more computer components operate together to achieve some functionality. One or more computer components can reside within a process or thread of execution and a computer component can be localized on one computer or distributed between two or more computers. In addition, the embodiments described herein may have aspects of entirely hardware, partly hardware, and partly software, or entirely software. The term unit", "module", "device", "server" or "system" used herein refers to computer-related entity such as hardware, hardware and software in combination, or software. For example, the unit, module, device, server, or system may refer to hardware that makes up a platform in part or in whole and/or software such as an application for operating the hardware.

The term "controller" as used herein indicates a method, process, or computer component adapted to affect a user device (i.e., the system to be controlled or effected).

As used herein, the term "electrode" means an operable connection to a muscle or nerve that allows an electrical potential so to be recorded or applied. An electrode can be further described by its location, i.e., internal, external, or percutaneous; electrical or other recording characteristics, i.e., unipolar, bipolar, laplacian, magnetic or optical; and with respect to internal electrodes by its placement, i.e., intramuscular, epimysial, or nerve.

The term "electronic device" is used to designate any devices that can have a microprocessor and that can be communicated with. A microprocessor can include one or more processors, memory, and programmable input/output peripherals. A controller can include one or more microprocessors and/or memory with instructions that can help control or communicate with electronic devices.

As used herein, when the term "function" is used to describe a relationship between one variable or parameter and a second variable or parameter, the relationship so described is not considered to be an exclusive relationship unless expressly stated, rather the other variables or parameters that are not mentioned or described but that are known to those of ordinary skill in the art may also have a functional relationship to the second variable or parameter. By way of example, if x is described as a function of y the statement is not intended to limit x's value to only being described by y unless expressly stated, rather the variable x may also be a function of other variables (e.g., x=f(y, t)).

"Intelligent Agent" is an autonomous computer program that carries out tasks and directs its activity towards achieving goals. Intelligent agents may learn or use knowledge from the environment, humans, and/or data sources to achieve their goals. Intelligent "agents" may also be referred to as "assistants" and/or "administrators." "Adaptive" means that an intelligent agent makes decisions on the basis of rules and can modify the rules on the basis of new information that becomes available.

As used herein, the term "Non-volatile memory," "NVM," or "non-volatile storage" means a type of computer memory that can retrieve stored information even after having been power cycled. In contrast, volatile memory needs constant power in order to retain data. Examples of non-volatile memory include read-only memory, flash memory, ferro-electric RAM, most types of magnetic computer storage devices (e.g. hard disk drives, solid state drives, floppy disks, and magnetic tape), optical discs, and early computer storage methods such as paper tape and punched cards. Non-volatile memory can be classified as traditional non-volatile disk storage, or storage in non-volatile memory chips, e.g., EEPROM, SSD, NAND, etc.

An "operable connection" is one in which signals or actual communication flow or logical communication flow may be sent or received. Usually, an operable connection includes a physical interface, an electrical interface, or a data interface, but it is to be noted that an operable connection may consist of differing combinations of these or other types of connections sufficient to allow operable control.

The term "processor" is generally understood to refer to a hardware component, such as a processing unit of a computer system.

As described herein, the term "sensor" may include one or more electrodes or sensor electronics (e.g., in a processor or other circuitry) configured to acquire signals and to process the acquired signals in an analog domain, a digital domain or both. A sensor may comprise electrodes and associated sensor electronics integrated into a common structure such as an electrode pad or may comprise electrodes and sensor electronics that are disposed remotely from one another, such as electrodes coupled to a remotely positioned processor (e.g., positioned at another location on a user or garment) or other circuitry using an electrically conductive structure such as a conductive trace, wire, cable, or the like, for example. Biopotential sensors may include but are not limited to electromyography (EMG) sensors, ECG sensors, respiration, galvanic skin response (GSR), or others. Other types of sensors may also be incorporated into the devices described herein. These sensors may include but are not limited to accelerometers (single or multi-axis), GPS sensors, galvanic skin response (GSR), bioimpedance, gyroscopes, bend-angle measurement (flex) sensors (to measure joint angle or joint angles), etc.

As used herein, the terms "signal" may take the form of a continuous waveform or discrete value(s), such as electrical potentials, electrical currents, magnetic fields, optical fields, or digital value(s) in a memory or register, present in electrical, optical, or other form.

The term "state" as used herein refers to a set of variables that define the characteristics of a particular system in a specific combination. In one non-limiting example, the state of a single axis, hinged joint is expressed as a vector comprised of the current angle, angular velocity, and angular acceleration. In other aspects the state of a system includes otherwise unmeasurable or practically unobservable values.

The present innovation provides a controller that switches from on/off based on set parameters to control one of a wide variety of electronic devices. A prototype control device comprises (a) an electromyography (EMG) sensor and (b) an accelerometer. In one or more embodiments, a control device can utilize just one of the sensors. The EMG sensor can sense volitional electrical potential in muscles collected via an electrode. For example, the volitional electrical signal may incompletely innervate a muscle and thus not have the ability to trigger enough motor units to cause a physically manifest contraction of the muscle. However, this subfunctional activation of motor units within the muscle does result in measurable electromyography (EMG) signals.

In one or more embodiments, the device receives data input form one or more sensors. One or more embodiments can utilize standard electrocardiogram (EKG) electrodes. The device can be in multiple pieces or a unitary product. The electrodes can be attached directly to the unit body, wirelessly coupled, or connected by electrical leads. Other sensors may be utilized in the system, such as a proximity sensor, photodetector, a Hall-effect sensor, a radio frequency identifier (RFID) sensor, a biomedical sensor (such as electromyography, a moisture sensor, a fluid sensor, a temperature sensor, an electrodermal activity sensor, a chemical presence sensor, a biological presence sensor, sound sensor, vibration sensor, and a pH level sensor), a force sensor that may sense a mechanical force such as a pressure sensor or a flex sensor.

In one or more embodiments, the sensor can be an activity sensor, which generates a signal indicative of user activity (e.g., user movement or user posture transitions). For example, an activity sensor may include one or more accelerometers, such as one or more single-axis, two-axis, or three-axis accelerometers, capable of detecting static orientation or vectors in three dimensions. An example accelerometer is a micro-electromechanical accelerometer. In other examples, an activity sensor may alternatively or additionally include one or more gyroscopes, pressure transducers, piezoelectric crystals, or other sensors that generate a signal that changes as a function of user activity. In some examples, user activity may also be detected via one or more EMG sensors that generate an electrical signal indicative of muscle movement or one or more intracranial pressure sensor that indicate a change in pressure in cranium, which may result from changes in user posture or a change in user activity level.

In one or more embodiments, the volitional electrical potential is used by the controller as a logical control input. A logical control or triggering command resembles a digital logic or on/off signal. In the case of a volitional electrical potential, the on/off signal is tailored to change state upon the user applying the volitional electrical potential.

One of the initial steps to the process is identifying which muscles and nerves of the user are still controlled by the user and capable of generating volitional electrical signals. An initial mapping process for identifying muscles and nerves where a user is capable of generating measurable, but still sub-functional volitional electrical potential, can be an initial starting point for tailoring the neural controller for a variety of users.

In one embodiment, the biosignal sensor device uses the body's bioelectrical EMG signals to completely control a computer to generate speech, browse the web, listen to music, and more. In one or more embodiments, the present innovations address particular needs of users that have difficulty controlling a device using a biosignal. Some users, for example those with cerebral palsy (CP), have spasms that can make it hard to differentiate what is intended as a Switch and what is a spasm. Spasms most often are accompanied by gross motor movement. By using accelerometer data, this gross movement can be recognized and used to disallow a Switch, even if the EMG activity otherwise would be considered a switch. Accelerometer data filtering can be by some combination of discrete x, y, and z data, or the algorithm can be by a simple product of x, y, and z; that is, if the product of x, y, z is greater than some user-selected limit, do not allow a switch.

The present invention provides user interface concepts, principles and techniques that can be translated into software algorithms to provide a rich functionality, convenience, flexibility, and ease-of-use to users. Further, the disclosed concepts/principles/techniques can lead to easier implementation of the gesture recognition algorithms. Note that these concepts, techniques, and principles can be used with controllers described elsewhere as well as any other devices that can track user's head/face/bodily motions, facial expressions, and gestures to control or communicate with any electronic devices. Further, the UI concepts described herein can be used to not only control an electronic device distinct from the controller, but also the controller and/or the controlling system itself. For the purpose of simplicity, the rest of the document will use the term "controller" to include "controlling systems" as well. Further, it is also understood that controllers themselves can be electronic devices; therefore, any mention of "controlling/communicating with an electronic device" can also include controlling/communicating with the controller itself.

Embodiments of the disclosed technology provide reliable and fast communication for a human through an interface, which detects the intent of the user. Embodiments of the disclosed technology enable people with severe speech and motor impairments to interface with computer systems for the purpose of typing in order to establish and maintain seamless spontaneous communication with partners in face-to-face situations, as well as in remote environments such as Internet chat, email, or telephone (via text-to-speech). In addition, embodiments also enable the target population to access information available on the Internet through a computer. In an embodiment, healthy humans may also utilize the proposed interface for various purposes.

The systems and methods of the present invention are adaptable and, in some embodiments, can include additional sensors for multiple applications. In some embodiments, the systems and methods of the present invention can be integrated with, for example and not limited to, electro-oculogram (EOG), microphones, accelerometers, gyroscopes, miniature cameras, and flow and/or pressure sensors, as well as electropalatography, electromyography (EMG) and electroencephalography (EEG) electrode arrays for detecting tongue contact with the palate, muscle movement and/or activity, and brain activity.

The present disclosure includes various exemplary embodiments of systems and methods that utilize the location and context of a user and other resources to a) adjust to the current situation, b) prevent high risk situations, and/or c) respond to and manage situations. Various embodiments include collecting, aggregating, and analyzing user-related data specific to that user's condition, motivations, and usage. Such data/information can be collected from a wide variety of sensors and other data sources, including but not limited to: portable electronic devices (PED) such as smartphones, tablets, computers, PDAs, wearables (data collection devices worn on the person, such as Fitbit, etc.), implants, Google GLASS, etc.; nearby sensors or devices such as security/video cameras, smart devices (such as smart home-related sensors, etc.), crowdsourcing data collection applications of nearby users, building/store/office Wi-Fi networks, location-sensitive beacons, etc.; and/or extended data collection mechanisms such as road traffic sensors, public video cameras or billboard displays, weather data collection sensors, law enforcement/security-related devices, etc.

In one or more embodiments, an example communications network includes a plurality of heterogeneous, differing, or different types of sensing devices configured to monitor the location and/or context of a user; and a plurality of heterogeneous, differing, or different types of interface devices each configured to engage in interaction with the user, with a support person for the user, and/or with a third party in the event that the network detects a relationship between the monitored location and/or context and a trigger predetermined in the network for the user; wherein the interaction is selected based on the trigger and the monitored location and/or context. The example communications network may include one or more server, client, cloud, peer-to-peer, and/or other devices configured to develop and/or update a profile of the user based on monitoring data from the sensing devices and/or the interaction engaged in by one or more of the interface devices.

The system can operate in a home, a nursing home, a hospital, or other setting. In one or more embodiments, the system includes one or more mesh network appliances to enable wireless communication in the home monitoring system. Appliances in the mesh network can include home security monitoring devices, door alarm, window alarm, home temperature control devices, fire alarm devices, among others. Appliances in the mesh network can be one of multiple portable physiological transducer, such as a blood pressure monitor, heart rate monitor, weight scale, thermometer, spirometer, single or multiple lead electrocardiograph (ECG), a pulse oximeter, a body fat monitor, a cholesterol monitor, a signal from a medicine cabinet, a signal from a drug container, a signal from a commonly used appliance such as a refrigerator/stove/oven/washer, or a signal from an exercise machine, such as a heart rate. In one example, a user may have mesh network appliances that detect window and door contacts, smoke detectors and motion sensors, video cameras, key chain control, temperature monitors, CO and other gas detectors, vibration sensors, and others. A user may have flood sensors and other detectors on a boat. A user may have access to a panic transmitter or other alarm transmitter. Other sensors and/or detectors may also be included.

An embodiment of the disclosed technology may comprise one or more of the following components: (1) rapid serial presentation of stimuli, such as visual presentation of linguistic components (e.g., letters, words, phrases, and the like) or non-linguistic components (e.g., symbols, images, and the sort), or other modalities such as audible presentation of sounds, optionally with individual adjustment of presentation rates, (2) a user intent detection mechanism that employs multichannel electroencephalography (EEG), electromyography (EMG), evoked-response potentials (ERP), input buttons, and/or other suitable response detection mechanisms that may reliably indicate the intent of the user, and (3) a sequence model, such as a natural language model, with a capability for accurate predictions of upcoming stimuli that the user intends in order to control the upcoming sequence of stimuli presented to the subject.

In an embodiment of the disclosed technology, there is provided an optimal real-time, causal predictive, open-vocabulary, but context-dependent natural language model to generate efficient sequences of language components that minimize uncertainty in real-time intent detection. An embodiment provides accurate probabilistic large-vocabulary language models that minimize uncertainty of upcoming text and exhibit high predictive power, with sub-word features allowing for open-vocabulary use. In an embodiment, there are provided learning techniques integrated in the systems that allow perpetual, on-line adaptation of the language models to specific subjects based on previously input text. In addition, an embodiment provides optimal presentation sequence generation methods that help minimize uncertainty in intent detection and minimize the number of symbols presented per target.

The principles disclosed can be used with handheld and body worn controllers as well as with control systems where the user's body or body part is used as part of the control system. Body parts used for user actions prescribed to perform user gestures can include, but are not limited to, head, facial muscles, part of the face, jaw, tongue, eyes, fingers, hands, arms, torso, chest, abdomen, shoulders, legs, feet, toes, and muscles.

A user gesture can be defined as a combination of actions performed (by the user) with the intent of communicating with or controlling an electronic device. These actions can be bodily actions that can include motions of various body parts, facial expressions, actions to orient and hold various body parts in certain poses/positions/orientations, as well as other bodily actions. Holding the eye gaze steady or moving the eye gaze can also be considered a bodily action. Some embodiments can also use actions performed by the user such as speech/speaking, holding breath/inhaling/exhaling, tensing of muscles/body parts (that may or may not be detected externally, such as jaw muscles, abdominal muscles, arm and leg muscles, anal sphincter, etc.), and so on as bodily actions. User actions such as entering meditative or attentive state, consciously relaxing the body with or without meditation, (mentally) imagining, visualizing, remembering or intending particular actions (e.g. pushing or pulling, lifting or lowering imaginary, virtual or real objects), experiences or scenarios (which can be detected by analyzing brainwaves or other biometric information), deep breathing, inhaling, exhaling, holding breath, etc. can also be used as actions in defining user gestures. A user gesture can require some bodily actions to be performed in a specified sequence and can require other bodily actions to be performed concurrently/simultaneously with each other. User gestures can be recognized and translated by the controller or control system into signals to communicate with and/or control an electronic device. Some user gestures can be recognized and translated into signals to control the controller/control system itself. Signals generated in response to some user gestures may be stored in the control system or controlled device for indefinite amount of time and that stored signal information can be retrieved when required. Bodily actions performed as part of a user gesture can serve various purposes in a specified user gesture. In one embodiment, the types of bodily actions are based on the purpose they can fulfill in a user gesture.

A particular bodily action can serve different purposes (and thereby can be viewed as having different types) when it is used in different types of user gestures. Further, a particular bodily action can occur multiple times within a user gesture and can be specified to have different purpose(s) and type(s) during different occurrences.

Any particular heuristics can be implemented in a controller/control system by means of multiple user gestures. For example, the selection heuristics can be implemented in one embodiment using a first user gesture that uses a smile facial expression as the Primary Control Expression (PCE) as well as another user gesture that uses an eyebrow raise facial expression as the PCE, and so on.

One challenge that users with spasms have with switching technology is "false" switches. False Switches are cases where spasms are recognized by the system such as with an EMG switch. In one or more embodiments, the settings for sensitivity of "Switch Disable" can be adjusted such that various levels of signals captured by the accelerometer and/or EMG switch can be used to disallow an EMG device Switch. The Switch Disable Threshold can be programmed by some discrete combination of x, y, and z data, or by the x, y, z product.

In one or more embodiments, an accelerometer switch mode can be used with EMG or without. In this mode, the user and clinician record the x, y, z, and EMG (optional) components of a user movement. This "Signature" is set as a switch for the biosignal sensor device. When movements with characteristics that are similar to the Signature are detected, the biosignal sensor device allows that this is a switch. The sensitivity of the Switch, that is, how close the movement follows the original signature, can be programmed.

In one or more embodiments, context sensitive switching can be incorporated, such as when the system learns more about the user or has additional associations supplied. Switch scanning is usually slower than direct select methods like eye tracking (or mousing or keyboarding if the user has that level of function). To "even the score", the present innovation contemplates methods for improving the speed of switch scanning such as context sensitive switching. Inputs are gathered that add context to the user's situation. These inputs can be used and appropriately tailored within the "chat panel" on the display. For example, with a combination of a time-of-day clock and a proximity detector, the application can put up a chat panel that related to a discussion of school when the user's daughter enters the room at 4:00 pm on a weekday. As another example, if the temperature in the room moves outside of the user's comfort range, a chat panel related to environmental control can be programmed to appear. For example, if you know the nurse stops in every Tuesday at 11 am, then at that time, a menu comes up with a variety of pre-selected responses that relate to a nurse visit. If a spouse comes home at 5 pm every day, a menu for that could come up every day at 5 pm. Thus, instead of the user switching through a sometimes-deep hierarchy of chat panels, the biosignal sensor device with context sensitive switching can anticipate what the user (patient) wants to say or do.

In one or more embodiments, the present innovation can provide both dynamic and static scaling modes. Static scaling imposes fixed criteria that the signal must satisfy in order to be counted as a Switch. These criteria remain unchanged over time. Dynamic scaling changes the criteria over time for determining if a switch has been made based on the user's performance. In one or more embodiments, the resting level and the signaling level are both used in this ongoing calculation. As such, the biosignal sensor device will make it easier to Switch as the user fatigues, or as other electrode interface conditions change. In one or more embodiments, a physiological reading off of the user's body or accelerometer resting level and a physiological reading off of the user's body or accelerometer signaling level are both used in this ongoing calculation. As such, the biosignal sensor device will make it easier to Switch as the user fatigues, or as other electrode interface conditions change.

Dynamic threshold amplitude can set a scale factor for use by the biosignal sensor device's dynamic scaling algorithm. The lower the percentage or level on the scale, the more sensitive the biosignal sensor device will be in allowing that the signal is a switch. Threshold amplitude (static scaling) sets the amplitude the signal must cross above in order to be counted as a switch. Threshold amplitude (dynamic scaling) sets a scale for use when in the biosignal sensor device's dynamic scaling mode. The higher the level, the less sensitive the biosignal sensor device will be in allowing a switch to be made.

The Signal Off parameter is pre-set in the Static Scaling mode and computed continuously in the Dynamic Scaling mode. Signal off Amplitude sets the amplitude a signal counted as a Switch must fall below before a new Switch can be counted. Setting this parameter at the same level as the Threshold Amplitude will remove Signal off amplitude as a switching determiner.

A parameter, Signal Off, was created to address the problems of spasms, fasciculation, and high muscle tone. Signal Off is pre-set in the Static Scaling mode and computed continuously in the Dynamic Scaling mode. Signal Off is used to disallow any additional Switches after the first one until the signal level drops below the Signal Off amplitude.

Dynamic Signal Off Amplitude sets the level a Switch signal must drop below before another Switch is allowed. In one or more embodiments, setting this at 100% or full level will set the Signal Off Amplitude to the user's ongoing average Resting Level. The Resting Level is the average of readings over a user-selectable time period. Setting this parameter at the same percentage as Threshold Amplitude will remove Signal Off as a Switching determiner.

Dynamic Scaling changes the criteria over time for determining if a switch has been made based on the user's performance. In one or more embodiments, the Dynamic Scaling may make use of resting level and the signaling level in this ongoing calculation. In one or more embodiments, the Dynamic Scaling may make use of the resting level and the signaling level of one or more sensors on the user's body such as a physiological sensor or accelerometer for motion detection in this ongoing calculation. As such, the biosignal sensor device will make it easier to switch as the user fatigues, or as the electrode interface conditions change.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical, and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but no other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As shown in FIG. 1, the present invention provides for a system 100 for detecting and measuring biosignals of a user 102 comprising: a biosignal sensor device 114 comprising one or more sensors 106 configured to detect biosignals from the user 102; and a sensor processor 120 configured to process signals from the one or more sensors 106 and configured to facilitate processing of biosignals detected by the system 100. The system 100 functions to provide a biosignal sensing tool for a user 102, a group of users, or an entity associated with the user/group of users 102. In one or more embodiments, the system 100 is configured to be worn by a user 102 as the user performs activities, e.g., watching videos, receiving stimuli, exercising, reading, playing sports. In one or more embodiments of the present invention, a sensor 106 for detecting various types of electrophysiological data or biomechanical data from a person is provided.

In one or more embodiments, the biosignals detected and measured by the system 100 comprise biosignals. However, the biosignals can additionally or alternatively comprise any other suitable biosignal data. In variations of the system 100 for biosignal detection and measurement, the system 100 is configured to detect any one or more of: electroencephalograph (EEG) signals, signals related to magnetoencephalography (MEG) impedance or galvanic skin response (GSR), electrocardiography (ECG), heart rate variability (HRV), electrooculography (EOG), and electromyography (EMG). Other variations of the system 100 can additionally or alternatively comprise sensors configured to detect and measure other biosignals, including biosignals related to cerebral blood flow (CBF), optical signals (e.g., eye movement, body movement), mechanical signals (e.g., mechanomyographs) chemical signals (e.g., blood oxygenation), acoustic signals, temperature, respiratory rate, positional information (e.g., from a global positioning sensor), motion information (e.g., from an accelerometer and/or a gyroscope with any suitable number of axes of motion detection), and/or any other signals obtained from or related to biological tissue or biological processes of the user, as well as the environment of the user.

In one or more embodiments, the system 100 is configured to be wearable by a user, require little maintenance, and maintain contact between the set of sensors and the user as the user performs activities in his/her daily life. As such, the system 100 is preferably comfortable for long term use, aesthetically pleasing, includes sufficient power storage, and adapts in response to the user's motions, to maintain contact with the user. The system 100, however, can be configured in any other suitable manner that enables detection and/or measurement of biosignals of the user.

The sensor device 114 may include an electrically conducting interface configured to be in contact with a person, for example, the skin of the person. In particular, the electrically conducting interface may be capable of detecting an electrophysiological signal without the use of an electrically conducting gel. The electrically conducting interface may be suitable for obtaining (e.g., measuring from the person) any type of physiological data, in particular, electrophysiological data and/or biomechanical data. Examples of electrophysiological data include, but are not limited to, EEG, EKG (or ECG), EOG, and EMG. Electroencephalography (EEG) refers to the recording of the electrical activity of the brain over time. Electrocardiogram (EKG or ECG) refers to recording the electrical activity of the heart muscle over time. Electrooculogram (EOG) refers to the recording of eye muscle activity over time. Electromyogram (EMG) refers to the recording of the activity of skeletal muscles in the body over time.

In general, according to the present invention, data relating to the physiological state, the lifestyle and certain contextual parameters of an individual is collected and transmitted, either subsequently or in real-time, to a site, preferably remote from the individual, where it is stored for later manipulation and presentation to a recipient, preferably over an electronic network such as the Internet. Contextual parameters as used herein means parameters relating to the environment, surroundings, and location of the individual, including, but not limited to, air quality, sound quality, ambient temperature, global positioning, and the like. Referring to FIG. 1, located at user location is sensor device 114 adapted to be placed in proximity with at least a portion of the human body. Sensor device 100 is preferably worn by an individual user on his or her body, for example as part of a garment such as a form fitting shirt, or as part of an arm band or the like. In one embodiment, sensor device 114 includes one or more sensors, which are adapted to generate signals in response to physiological characteristics of an individual, and a microprocessor. Proximity as used herein means that the sensors of sensor device 114 are separated from the individual's body by a material or the like, or a distance such that the capabilities of the sensors are not impeded.

The sensor device 114 generates data indicative of various physiological parameters of an individual, such as the individual's heart rate, pulse rate, beat-to-beat heart variability, EKG or ECG, respiration rate, skin temperature, core body temperature, heat flow off the body, galvanic skin response or GSR, EMG, EEG, EOG, blood pressure, body fat, hydration level, activity level, oxygen consumption, glucose or blood sugar level, body position, pressure on muscles or bones, and UV radiation exposure and absorption. In certain cases, the data indicative of the various physiological parameters is the signal or signals themselves generated by the one or more sensors and in certain other cases the data is calculated by the microprocessor based on the signal or signals generated by the one or more sensors.

Additionally, system 100 may also generate data indicative of various contextual parameters relating to the environment surrounding the individual. For example, system 100 can generate data indicative of the air quality, sound level/quality, light quality, or ambient temperature near the individual, or even the global positioning of the individual. System 100 may include one or more sensors for generating signals in response to contextual characteristics relating to the environment surrounding the individual, the signals ultimately being used to generate the type of data described above. Such sensors are well known, as are methods for generating contextual parametric data such as air quality, sound level/quality, ambient temperature, and global positioning.

The systems and methods of the present invention may support concurrent processing of biosignal data from multiple data sources and sensors (EEG, EMG, EOG, EYE TRACKING, MOTION, ECG), which requires a machine learning approach for efficient and rapid processing of big data on constrained devices.

In an aspect, a computer system is provided that is implemented by one or more computing devices. The computing devices may include one or more client or server computers in communication with one another over a near-field, local, wireless, wired, or wide-area computer network, such as the Internet, and at least one of the computers is configured to receive signals from sensors worn by a user.

In one embodiment, the sensors include one or more biosignal sensors, such as electroencephalogram (EEG) sensors, electromyography (EMG) sensors, galvanometer sensors, electrocardiograph sensors, heart rate sensors such as photoplethysmography (PPG), eye-tracking sensors, blood pressure sensors, breathing sensors, pedometers, gyroscopes, and any other type of sensor. The sensors may be of various types, including: electrical biosignal sensor in electrical contact with the user's skin; capacitive biosignal sensor in capacitive contact with the user's skin; blood flow sensor measuring properties of the user's blood flow; and wireless communication sensor placed sub-dermally underneath the user's skin. Other sensor types may be possible.

The sensors may be connected to a wearable device, which may be a wearable computing device or a wearable sensing device such as a wearable headset or headband computer worn by the user. The sensors may be connected to the headset by wires or wirelessly. The headset may further be in communication with another computing device, such as a laptop, tablet, or mobile phone such that data sensed by the headset through the sensors may be communicated to the other computing device for processing at the computing device, or at one or more computer servers, or as input to the other computing device or to another computing device. The one or more computer servers may include local, remote, cloud based or software as a service platform (SAAS) servers.

Embodiments of the system may provide for the collection, analysis, and association of particular biosignal and non-biosignal data with specific mental states for both individual users and user groups. The collected data, analyzed data or functionality of the systems and methods may be shared with others, such as third-party applications and other users. Connections between any of the computing devices, internal sensors (contained within the wearable device), external sensors (contained outside the wearable device), user effectors, and any servers may be encrypted. Collected and analyzed data may be used to build a user profile that is specific to a user. The user profile data may be analyzed, such as by machine learning processes, either individually or in the aggregate to function as a BCI, or to improve the algorithms used in the analysis. Optionally, the data, analyzed results, and functionality associated with the system can be shared with third party applications and other organizations through an API. One or more user effectors may also be provided at the wearable device or other local computing device for providing feedback to the user, for example, to vibrate or provide some audio or visual indication to assist the user in achieving a particular mental state, such as a meditative state.

At least one of the biosignal measuring means may employ at least one sensor in order to measure brain activity. Brain activity may be measured through electroencephalography ("EEG") techniques electrically, or through functional near-infrared spectroscopy ("MIR") techniques measuring relative changes in hemoglobin concentration through the use of near infrared light attenuation. A sensor employing pulse oximetry techniques may also be employed in the wearable device. Optionally, the wearable device may include at least one sensor measuring eye activity using electrooculography ("EOG") techniques. Other sensors tracking other types of eye movement may also be employed.

In various implementations, the wearable device may include a variety of other sensors and input means. For example, the wearable device may comprise at least one audio transducer such as a single microphone, a microphone array, a speaker, and headphones. The wearable device may comprise at least one inertial sensor for measuring movement of the wearable device. The wearable device may comprise at least one touch sensor for receiving touch input from the user.

The wearable device may sample from both the user's environment and biosignals simultaneously or generally contemporaneously to produce sampled data. The sampled data may be analyzed by the wearable device in real-time or at a future predetermined time when not being worn by the user. In one or more embodiments, the device of the present invention can be a wearable device. In one embodiment, the wearable device can be selected from the group consisting of a smart watch or watch band, a wrist or arm band, a finger ring, a sleeve, an ear bud, or other ear insert, a chest strap, a smart sock, an adhesive patch, and smart glasses.

In an example, the biometric sensors can be electromagnetic energy sensors. In an example, the biometric sensors can be blood pressure sensors. In an example, the biometric sensors can be oxygenation sensors. In an example, the biometric sensors can comprise both electromagnetic energy sensors and blood pressure sensors. In an example, the biometric sensors can comprise both blood pressure sensors and oxygenation sensors.

In an example, a biometric sensor of this system can be an electromagnetic energy sensor. In an example, an electromagnetic energy sensor can be an electromagnetic energy receiver which receives electromagnetic energy which is naturally generated by the electromagnetic activity of body tissue and/or organs. In an example, an electromagnetic energy sensor can comprise an electromagnetic energy emitter at a first location relative to body tissue and an electromagnetic energy receiver at a second location relative to body tissue, wherein the electromagnetic energy receiver receives energy which has been transmitted from the electromagnetic energy emitter through body tissue. In an example, the electromagnetic energy receiver can collect data concerning (changes in) the conductivity, resistance, and/or impedance of electromagnetic energy transmitted through body tissue from the electromagnetic energy emitter to the electromagnetic energy receiver. In an example, an electromagnetic energy emitter and an electromagnetic energy receiver can together be referred to as an electromagnetic energy sensor.

In an example, one or more electromagnetic energy sensors can be selected from the group consisting of: action potential sensor, bipolar electrode, capacitive electrode, capacitive sensor, conductance electrode, conductance sensor, dry electrode, wet electrode, electrical resistance sensor, electrocardiographic (ECG) sensor, electrode, electroencephalographic (EEG) sensor, electromagnetic brain activity sensor, electromagnetic path, electromagnetic sensor, electromyographic (EMG) sensor, galvanic skin response (GSK) sensor, impedance sensor, inductance sensor, interferometer, magnetometer, neural action potential sensor, neural impulse sensor, and piezoelectric sensor. In an example, one or more electromagnetic energy sensors can be selected from the group consisting of: electroencephalograph (EEG) sensor, electromyographic (EMG) sensor, electrocardiographic (ECG) sensor, skin and/or tissue impedance sensor, and skin and/or tissue resistance sensor.

In one embodiment, the system 100 uses a set of sensor devices 114. The set of sensor devices 114 functions to directly detect biosignals (e.g., bioelectrical signals) from a user, wherein each sensor in the set of sensor devices 114 is configured to provide at least one channel for signal detection. In one embodiment, each sensor in the set of sensor devices 114 is identical to all other sensors in composition; however, each sensor in the set of sensor devices 114 can be non-identical to all other sensors in composition to facilitate unique signal detection requirements at different region of the user's body (e.g., user's brain). The set of sensor devices 114 can comprise sensors that are non-identical in morphology to facilitate application at different body regions; however, the set of sensor devices 114 can alternatively comprise sensors that are identical in morphology. The set of sensor devices 114 can be placed at specific locations on the user to detect biosignals from multiple regions of the user. Furthermore, the sensor locations can be adjustable, such that the set of sensors can be tailored to each user's unique anatomy. Alternatively, the biosignal sensor system 100 can comprise a single sensor configured to capture signals from a single location, and/or can comprise sensors that are not adjustable in location.

In one embodiment, each sensor in the set of sensor devices 114 provides a single channel for signal detection, such that the number of sensors correspond to the number of channels for signal detection in a one-to-one manner; however, the set of sensor devices 114 can alternatively provide any other suitable number of channels for signal detection relative to a number of sensors in the set of sensor devices 114. For instance, in one variation, multiple sensors of the set of sensor devices 114 can be configured to provide one channel for signal detection, such that the number of channels for signal detection is smaller than the number of sensors in the set of sensor devices 114. Preferably, the set of sensor devices 114 can provide electrical characteristics (e.g., frequency bandwidth, nominal voltage range, etc.) to accommodate electroencephalographic signals and electromyographic signals; however, the set of sensor devices 114 can alternatively be configured to accommodate only electroencephalographic signals or to accommodate any other suitable type(s) of signals. In a specific example, each sensor in the set of sensor devices 114 is characterized by a frequency bandwidth from 0 to 80 Hz, and is characterized by a nominal voltage of 10-100 microvolts. In a variation of the specific example, each sensor in the set of sensor devices 114 can accommodate large electromyographic signals (e.g., eye blinks, clenched jaw signals) characterized by nominal voltages in the millivolt range (e.g., 5 millivolts).

The set of sensor devices 114 can comprise sensors configured to detect signals through the user's skin and/or hair, and preferably comprises electrically conductive sensor pads that provide low to moderate contact impedances and low-voltage signal transmission. The sensors of the set of sensor devices 114 are also preferably low-noise, and/or provide non-polarizable contact with the user's skin. As such, the sensors preferably behave such that the contact half-cell voltage is independent of current magnitude or direction of flow in relation to a sensor in a particular range of interest. However, the sensors can alternatively comprise sensors with any other suitable noise-handling and/or polarizability behavior. The sensors are preferably comfortable to wear for long periods of usage, conform to the user's skin, are characterized by a surface with a sufficiently high coefficient of friction, such that the sensors do not readily slip or move relative to the user after application to the user, are non-toxic, and/or are hypoallergenic. However, the sensor pads of the set of sensor devices 114 can be characterized by any other suitable user comfort characteristic(s), morphological behavior, and/or friction characteristic(s).

FIG. 1 illustrates an exemplary system 100 for enabling a user 102 to control a device, such as a user interface device 104. The system 100 gives the user complete control over the system 100 without requiring extensive computer experience. Here are just a few examples of what persons with paralysis, loss of speech, or loss of motor control can do with the system 100: Communicate with family, caregivers, and clinicians using text-to-speech (TTS); send text messages and email; surf the web; watch videos and movies; listen to music, radio, and podcasts; read the news; play video games; use environmental controls; and participate in the classroom using telepresence robots and assistive technology.

In one or more embodiments, the system 100 of the present invention includes a set of bioelectrical electrodes 106. In one or more embodiments, a first active electrode 108, a second active electrode 110 and a reference ("R") electrode 112 are attachable to an electrode device (an "EMG device" e.g., a NeuroNode®, Control Bionics, Inc., Milford, OH) 114 that is adhered to the user 102. In other embodiments, each electrode 108, 110, 112 is individually adhered to the user 102 and interfaced to the system 100 such as via electrical leads or a wireless connection. A processor 120, such as contained in the biosignal sensor device 114 or in the user interface device 104, is in communication with the set of bioelectrical sensors 106 and the user interface device 104 that projects functionality for an application 118 executed on the user interface device 104. The biosignal sensor device 114 includes a processor 120 that supports dynamic and static adjustments to switching threshold that accommodate specific requirements of the user 102 as compared to other individuals or as compared to changing characteristics of the user 102.

In one or more embodiments, biosignal sensor device 114 is a mesh accessible surface electromyography controller, wearable by a user 102, for capturing electromyography and electrocardiography data from certain muscles, including the heart. biosignal sensor device 114 has the ability to store the data onboard for extended periods, and to send the data by Bluetooth or Wi-Fi or other wireless means to a receiver. The biosignal sensor device 114 can analyze the data onboard or send data to a receiver for analysis by code or by a person. When analyzing the data onboard, the biosignal sensor device 114 can assess certain intentions of the user 102, such as sending a command to the receiver to perform any of a range of tasks including displaying text, broadcasting that text in the form of computer-generated speech, controlling programs and other software within the receiver as well as within other peripheral programs and devices. The biosignal sensor device 114 monitors parameters and sensor systems and incorporates algorithms that continually adapt to the user's abilities. In addition, the system predicts what the user wants to say/do by gathering context from sensors and user behavior.

In an exemplary embodiment, the processor 120 performs an algorithm as follows:

```
With every 50 ms EMG_DATA_POINT {
  Place data point in an array of 5 seconds of data points = EMG_WINDOW
  Discard the oldest data point in EMG_WINDOW (the array always holds the last 5 seconds
  of EMG data)
  Iterate through EMG_WINDOW and store the EMG value of all peaks in
  PEAK_WINDOW
  Iterate through EMG_WINDOW and store the EMG value of all "pits" in PITS_WINDOW
  AVG_PEAK = average of peaks in PEAK_WINDOW
  AVG_PIT = average of pits in PITS_WINDOW
  THRESHOLD_AMPLITUDE = ((AVG_PEAK + AVG_PIT) / 2) * Sensitivity Scale
  Factor 1)
  SIGNAL_OFF = ((AVG_PEAK + AVG_PIT) / 2) * Sensitivity Scale Factor 2)
}
Use THRESHOLD_AMPLITUDE to determine if EMG_DATA_POINT is an HID switch
```

Threshold Amplitude sets a scale for use when in the biosignal sensor device's Static and Dynamic Scaling Modes. The lower the level, the more sensitive the biosignal sensor device will be in allowing a Switch to be made.

For example, the biosignal sensor device 114 can include an accelerometer ("A") 122 provides a collaborating input or alternate inputs to the electrodes 106. A movement that is characteristic of a spasm can be recognized by the processor 120 and can be used to ignore an otherwise qualifying biosignal. A movement that is recognized as an expected volitional movement for a switch conversely can be relied upon on its own or as a confirmation of a qualifying biosignal. For example, adjusting the baseline for the biosignal can require that the accelerometer confirm a same pattern of movement, albeit slighter, as a previous accepted baseline.

In accordance with another embodiment of the invention, the complete system 100 can use an implantable device suitable for implantation in the body and comprising a set of bioelectrical electrodes 106. In one or more embodiments, a first active electrode 108, a second active electrode 110 and a reference ("R") electrode 112 are attachable to an electrode device (e.g., a NeuroNode®) 114 that is implanted in, adhered to, or otherwise in contact with the user 102. In accordance with another embodiment of the invention, the bioelectrical electrodes 106 are suitable for implantation in the user 102 while attachable to an external biosignal sensor device 114.

In accordance with another embodiment of the invention, there is provided a system for communicating intra-body signals generated by an implantable sensing device. In the context of data being communicated from within the body, transferred signals, generally referred to herein as "intra-body signals" are meant to include different signals representative of a condition, characteristic and/or parameter, directly or indirectly sensed or otherwise observed from within the body. In some examples, intra-body signals may include "biosignals," which are meant to include different signals representative of a sensed biological/physiological condition, characteristic and/or parameter, directly or indirectly sensed or otherwise observed from within the body. Such biosignals are described herein within the context of user/patient monitoring and/or diagnostics; however, it will be appreciated that embodiments of the invention described herein may be practiced for the transmission of data to be used for a variety of purposes or in a variety of contexts, which are therefore considered to fall within the scope of this disclosure. Similarly, different embodiments may also or alternatively consider the transfer of "environmental signals" meant to include different signals representative of an environmental condition, characteristic and/or parameter directly or indirectly sensed or otherwise observed from within the body, or again representative of an internal response of the body to such environmental conditions or characteristics. In yet other examples, such environmental signals may rather allow for a determination of the implanted body's position or movement.

As will be described in greater detail below, some embodiments of the invention rely on an effective data signal communication design and system implemented by, in some embodiments, a concise implantable data manipulation and transmission circuit or platform useable for the transmission of a variety of intra-body signals, in one or more data channels, from within the body to an external receiver. Accordingly, it will be appreciated that while different examples are considered herein in the context of medical monitoring and/or diagnostics via the manipulation of generally electric biosignals, used for example in the context of an electrocardiogram (ECG), electroencephalogram (EEG), electrocorticogram (ECoG), electromyogram (EMG), electro-oculogram (EOG), electrogastrogram (EGG), etc., other types of signals may also be considered. For instance, upon adding a transducer as part of the described systems, other non-electrical biological parameters such as blood pressure, body temperature, blood oxygen saturation ($SpO_2$), blood $CO_2$ saturation, NO concentration, respiration, and/or other types of physiological sensing systems, as will be readily appreciated by the skilled artisan, may be considered, whereby such sensed parameters are effectively converted by an appropriate implantable transducer or the like to generate an electrical signal representative thereof and readily transmittable using different embodiments of the invention, as described herein.

In other embodiments, environmental sensors are used instead of or in combination with biosensors, which environmental sensors may include, but are not limited to, gravitational sensors, magnetic field sensors, radiation sensors and the like. For instance, the implantation of such environmental sensors within the body may allow one to measure or evaluate a response of the body to such environmental conditions, detect an intensity or amplitude of environmental conditions within the body, or use such measurements to identify a position or movement of the body, for example. It will be appreciated by the skilled artisan in considering the following disclosure that other types of sensors and sensed characteristics may be considered herein without departing from the general scope and nature of the present disclosure.

Figure 2:
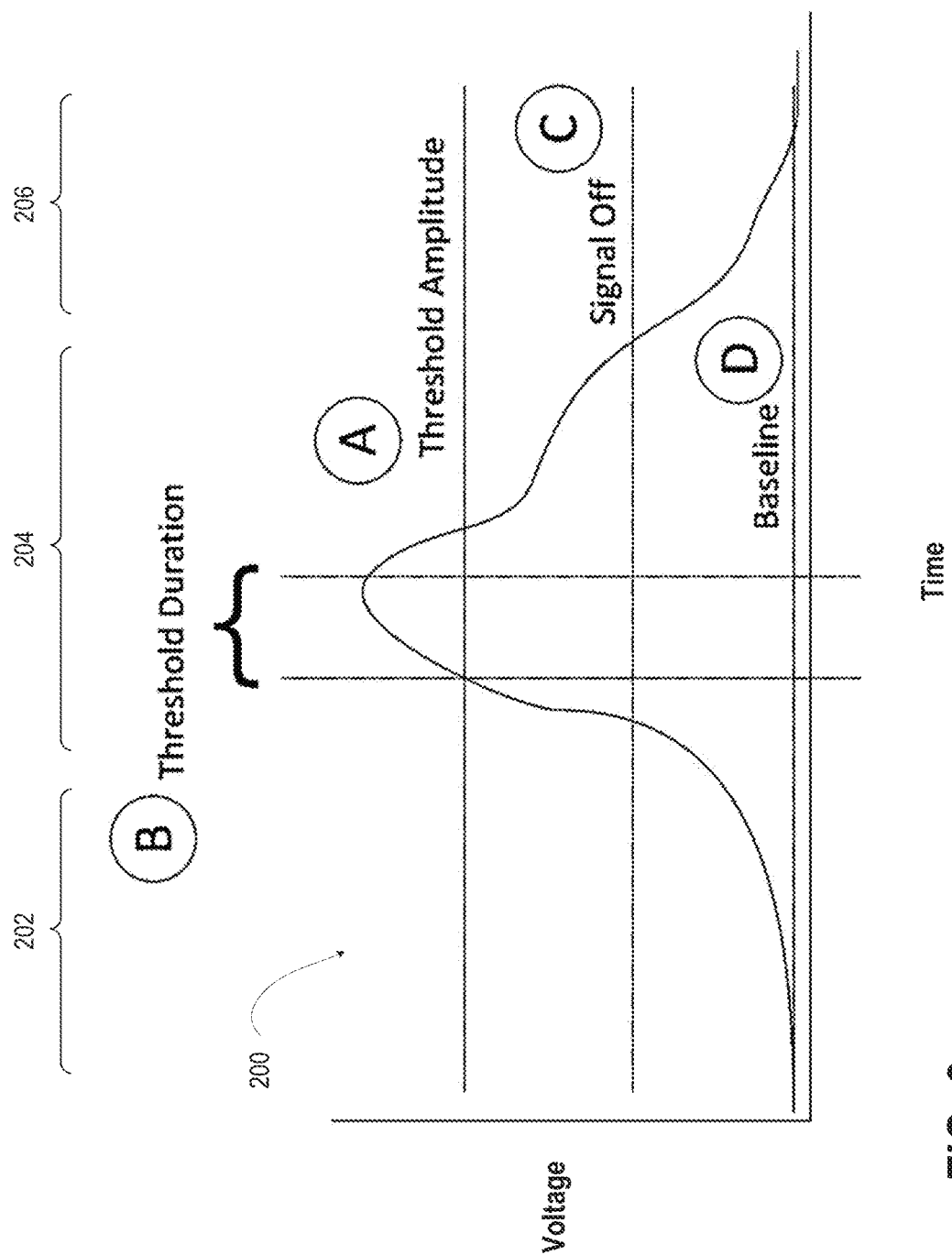
FIG. 2 illustrates a graph of a representative bioelectrical signal that is volitionally generated by a user, according to one or more embodiments.

FIG. 2 illustrates a graph of a representative biosignal 200 that is volitionally generated by a user. The signal 200 begins with a resting level 202, followed by switching level 204, which is then followed by another resting level 206. When the signal 200 reaches (A), a human interface device (HID) code is sent so long as the signal stays above (A) for a threshold duration (B). Another Switch code is not allowed until the signal 200 drops below a threshold level (C). Dropping below threshold (C) or another threshold such as baseline (D) can be required to reset monitoring for a subsequent triggering of an HID code (switch). In one or more embodiments, value (D) can be deemed the "0 point" for calculations rather than 0 amplitude/duration (A/D) units.

The triggering input determines whether or not to switch the state of the command signal from an initial state to a second state. In one embodiment, the initial state is a default state of the toggle switch (e.g., 0) corresponds to a baseline or no volitional electrical potential 102 generated by the user while the complimentary state (e.g. 1) corresponds to an elevated level of volitional electrical potential, thus when the volitional electrical potential returns to baseline or zero level the toggle switches back to the default state (e.g. 0). In another embodiment, the triggering input causes only a state change from its current state to the next state (i.e., in the case of a binary switch toggling to the other state, e.g., from a 1 to a 0 or vice versa).

In embodiments with multiple state switches, when the volitional electrical potential exceeds the trigger state the switch state increments by a fixed amount (i.e., moving from the current mode to another mode). For example, in one aspect the switch state may possess three separate modes of operation, a first state corresponding to no stimulus, a second state corresponding to a specific pattern or other action applied, and third state corresponding to a second pattern or other action.

In other embodiments, multiple inputs are used by the controller to determine the user's desired action. In one exemplary embodiment, a first volitional electrical potential signal is used as a toggle input, where the action of the first volitional electrical potential signal is used to toggle the state of the controller from mode to mode. Then a second volitional electrical potential signal is used by the controller to actuate a second action. One of ordinary skill in the art can adapt the forgoing exemplary embodiment so scenarios with multiple volitional electrical potential signals or other EMG or external input devices (e.g., joysticks, buttons, voice input, etc.) can actuate multiple actions.

In one exemplary embodiment, the first action can represent a keyboard key pressed signal. The next state can represent the release of the key. In another exemplary embodiment, the controller utilizes the volitional electrical potential created by the user, in some cases in conjunction with other inputs such as EMG signals or input devices, to select, initiate and modulate pre-defined sequences of commands.

Figure 3:
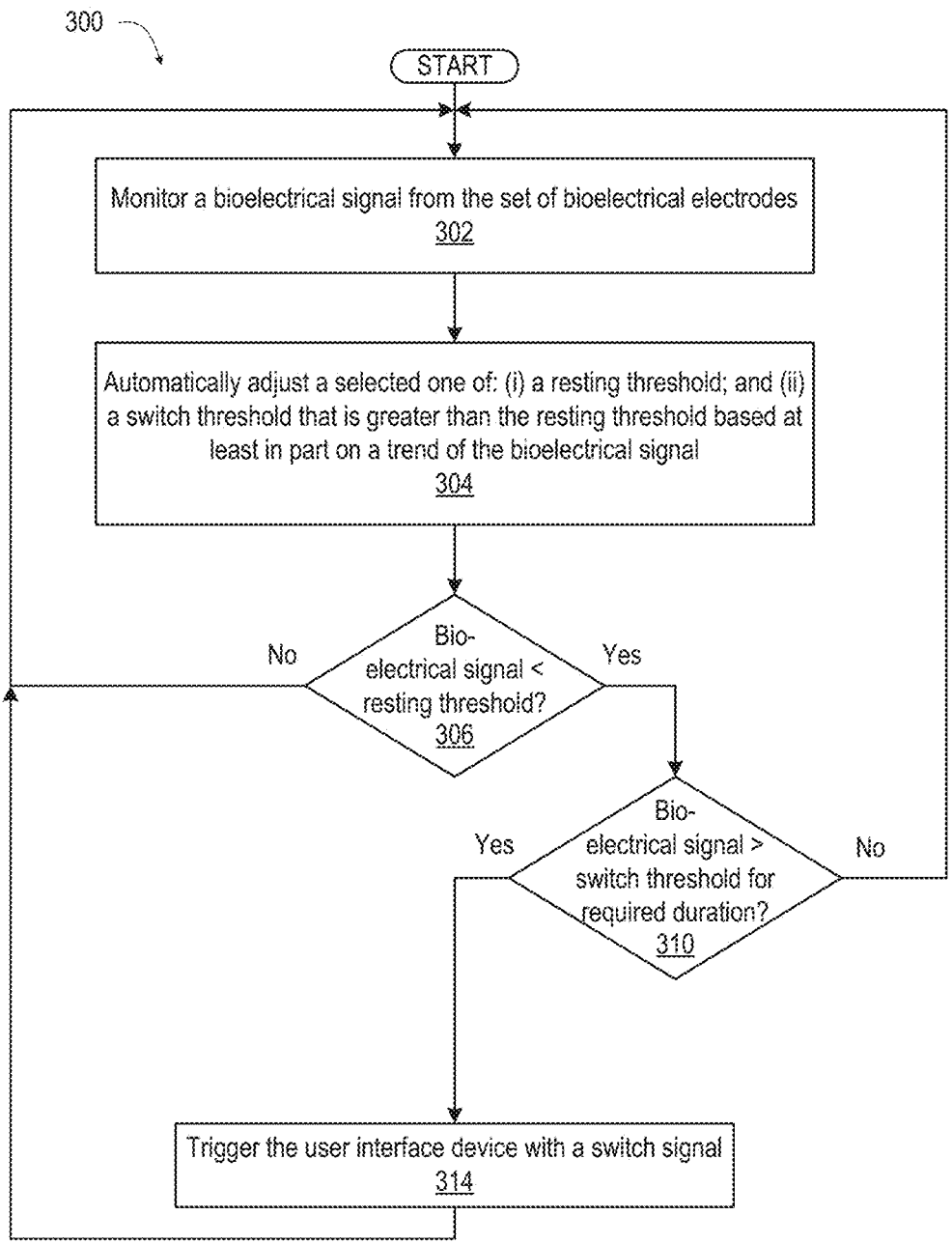
FIG. 3 is a flow diagram illustrating a method of controlling a device with bioelectrical monitoring, according to one or more embodiments.

FIG. 3 illustrates a method of controlling a device with bioelectrical monitoring. In one or more embodiments, method 300 includes monitoring a biosignal from the set of bioelectrical electrodes (block 302). Method 300 includes automatically adjusting a selected one of: (i) a resting threshold; and (ii) a switch threshold that is greater than the resting threshold based at least in part on a trend of the biosignal (block 304). Method 300 includes determining whether an amplitude of the biosignal is less than the resting threshold (decision block 306). In response to determining that the amplitude is not less than the resting threshold, method 300 returns to decision block 306 to continue monitoring for a reset based on being less than the resting threshold. In response to determining that the amplitude is less than the resting threshold in decision block 306, a determination is made as to whether an amplitude of the biosignal subsequently is equal to or greater than the switch threshold for a required duration (decision block 310). In response to determining that the biosignal is not greater than the switch threshold for at least required duration, method 300 returns to decision block 306 to continue waiting for conditions that represent a user commanded switch. In response to determining that the biosignal is greater than the switch threshold for at least required duration, method 300 includes triggering the user interface device with a switch signal, such as to interact with an application (block 314). Then method 300 returns to block 302.

In one or more embodiments, method 300 includes monitoring a movement sensor that is attached to the user, wherein triggering the device with the switch signal is further in response to determining that a movement signal sensed by the movement sensor concurrently with the biosignal is less than a spasm threshold.

In one or more embodiments, method 300 includes: (i) determining, by the device, whether a contextual trigger condition exists; (ii) in response to determining that the contextual trigger condition exists, presenting to the user an application that is associated with the contextual trigger condition; and (iii) controlling the application with the switch signal. In an exemplary embodiment, the contextual trigger condition is a chronological event. In another exemplary embodiment, the contextual trigger condition comprises an ambient environmental event and the application comprises an environmental control interface. In another exemplary embodiment, the contextual trigger condition is a detected third-party proximity event and the application comprises a human communication application.

Figure 4:
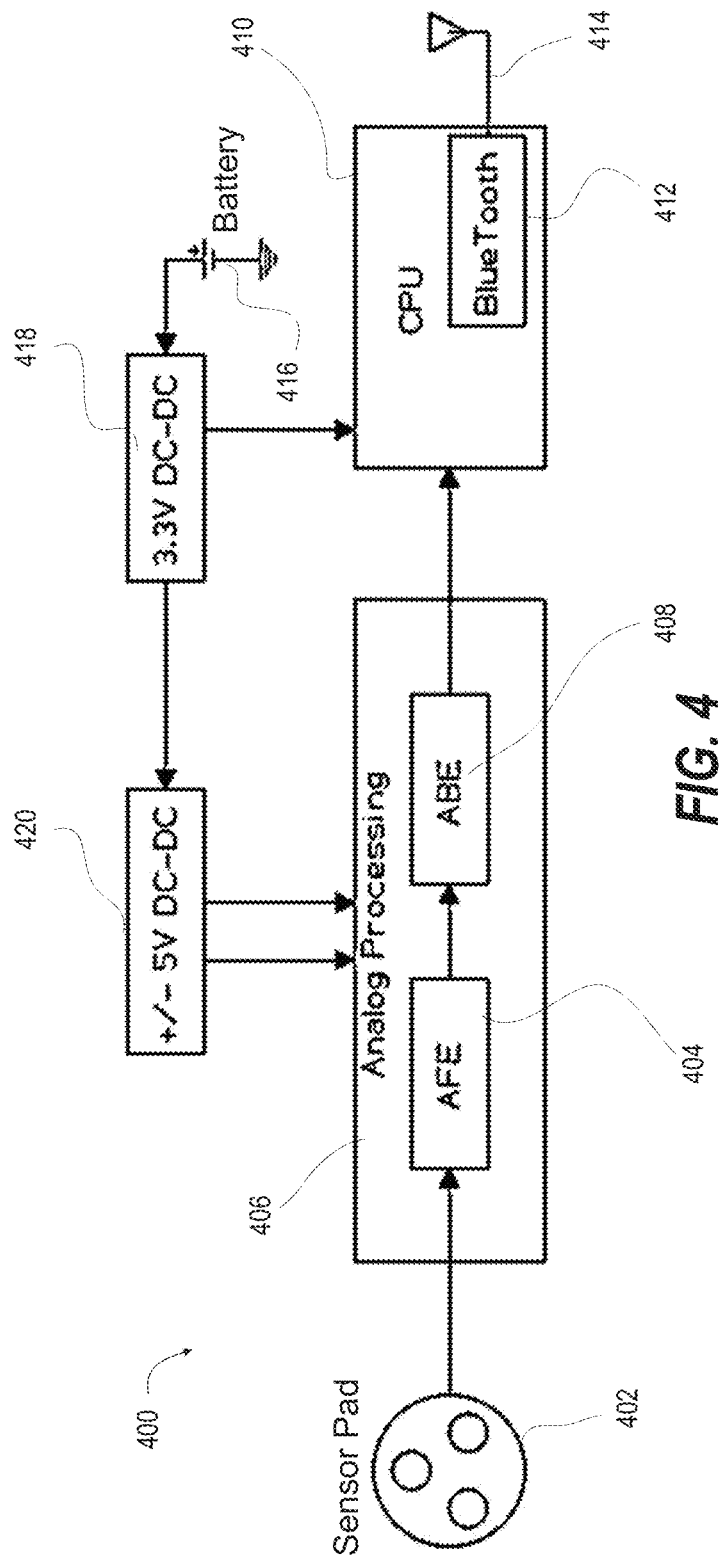
FIG. 4 is a functional block diagram illustrating an example biosignal sensor device, according to one or more embodiments.

FIG. 4 illustrates an example biosignal sensor device 400 having a sensor pad 402 that provides a signal to an analog front end (AFE) 404 of an analog processing component 406. The processed signal is relayed by an analog back end (ABE) 408 of the analog-processing component 406 to a central processing unit (CPU) 410. The CPU 410 performs intelligent coding that includes software to process and analyze biosignal data and to produce and transmit data and commands. The CPU 410 generates an HID switch ON or switch OFF code that is relayed by a Bluetooth transceiver 412 over an antenna 414.

The system may further include a suitable power source, such as a battery pack or a battery. For example, the system may be powered by a coin cell battery, an AA battery, a AAA battery, or multiple batteries, or powered through plug into a power outlet or through a solar energy system. In one or more embodiments, power for the biosignal sensor device 400 is provided by a battery 416. In one embodiment, the power is provided by battery that is converted by a 3.3 V DC-DC digital power supply 418 to support the CPU 410 and a +/−5 v DC-DC power supply 420 that supports the analog processing component 406. In one embodiment, battery 416 can be a LIR2032 80 mAh rechargeable coin cell battery or similar power source. Power supply 420 can be based on Linear Technology LT3582-5, boost and single inductor inverting DC/DC converter. Input range: 2.55 to 5.5 V.

Bluetooth transceiver 412 can be a Bluetooth semiconductor chip that can include Bluetooth Low Energy (BLE) capability to transmit and receive data and supports a mesh network of multiple biosignal sensor devices 400 with one elected host to contact another device. Thus, each biosignal sensor device 400, or similar units configured for monitoring a biosignal, determines a hierarchy of data flow in which one biosignal sensor becomes the central controller and passes all data to and from each of the other biosignal sensor units in the mesh network. This enables a number of biosignal sensor units to be attached to a user so that all data and instructions are efficiently channeled through a single unit to and from other devices or software. Outbound data: data sent from the biosignal sensor or mesh network can be sent in Boolean format (0 or 1, i.e., OFF or ON) or dynamic format such as a data stream to control switching software or hardware, or variable software (such as a cursor through X and Y coordinates on a screen) or hardware (such as a robotic device).

Target systems include software (such as programs that can be controlled by Boolean or dynamic data, including Assistive Technology programs); hardware (such as robotic systems which may include control and response software); firmware (such as resident software that controls a device such as a television, music or video player or recorder, smartphone, tablet, computer, environmental control system); proximity systems such as a Near Field Communication (NFC) system; analytical systems, such as a cardiography or other data analysis systems, pattern recognition systems or other data-based system; and programmed or artificial intelligence systems. The biosignal sensor device 400 captures physiological data and stores, analyzes, transmits, and uses the data and calculated results to display information, interface with other software and hardware systems, and control other devices.

The simplified device 400 shown in FIG. 4 may also include a variety of computer-readable media. Computer-readable media can be any available media that can be accessed by the CPU and can include both volatile and nonvolatile media that is either removable and/or non-removable, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), Blu-ray discs (BD), compact discs (CDs), removable media or storage, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and solid state drive), magnetic cassettes, magnetic tapes, magnetic disk storage, magnetic strips, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various wearable device implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The device implementations described herein may be further described in the general context of computer-executable instructions, such as program modules, being executed by a computing device. Generally, program modules include routines, programs, objects, components, data structures, and the like, that perform particular tasks or implement particular abstract data types. The wearable device implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Figure 5:
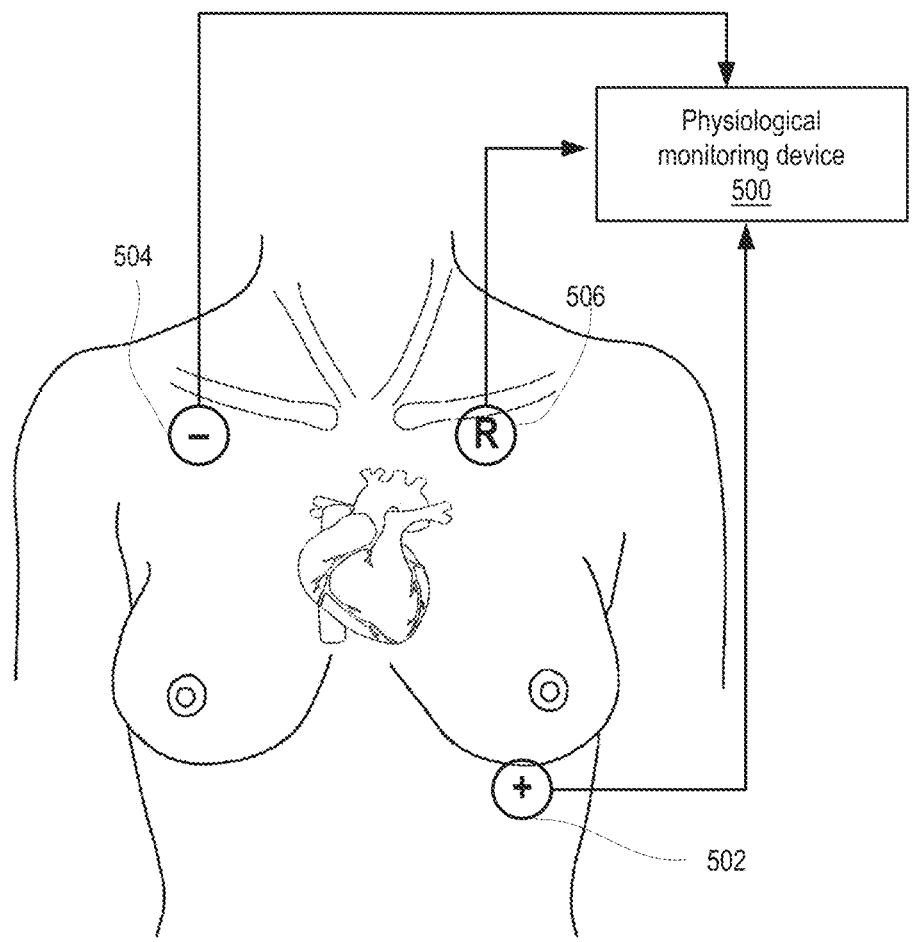
FIG. 5 is a front view illustrating an electromyography (EMG) device interfaced to detached nodes placed on a torso of user, according to one or more embodiments.

FIG. 5 illustrates a physiological monitoring device 500 interfaced to detached nodes: (i) first active electrode 502, second active electrode 504, and reference "R" electrode 506.

Figure 6:
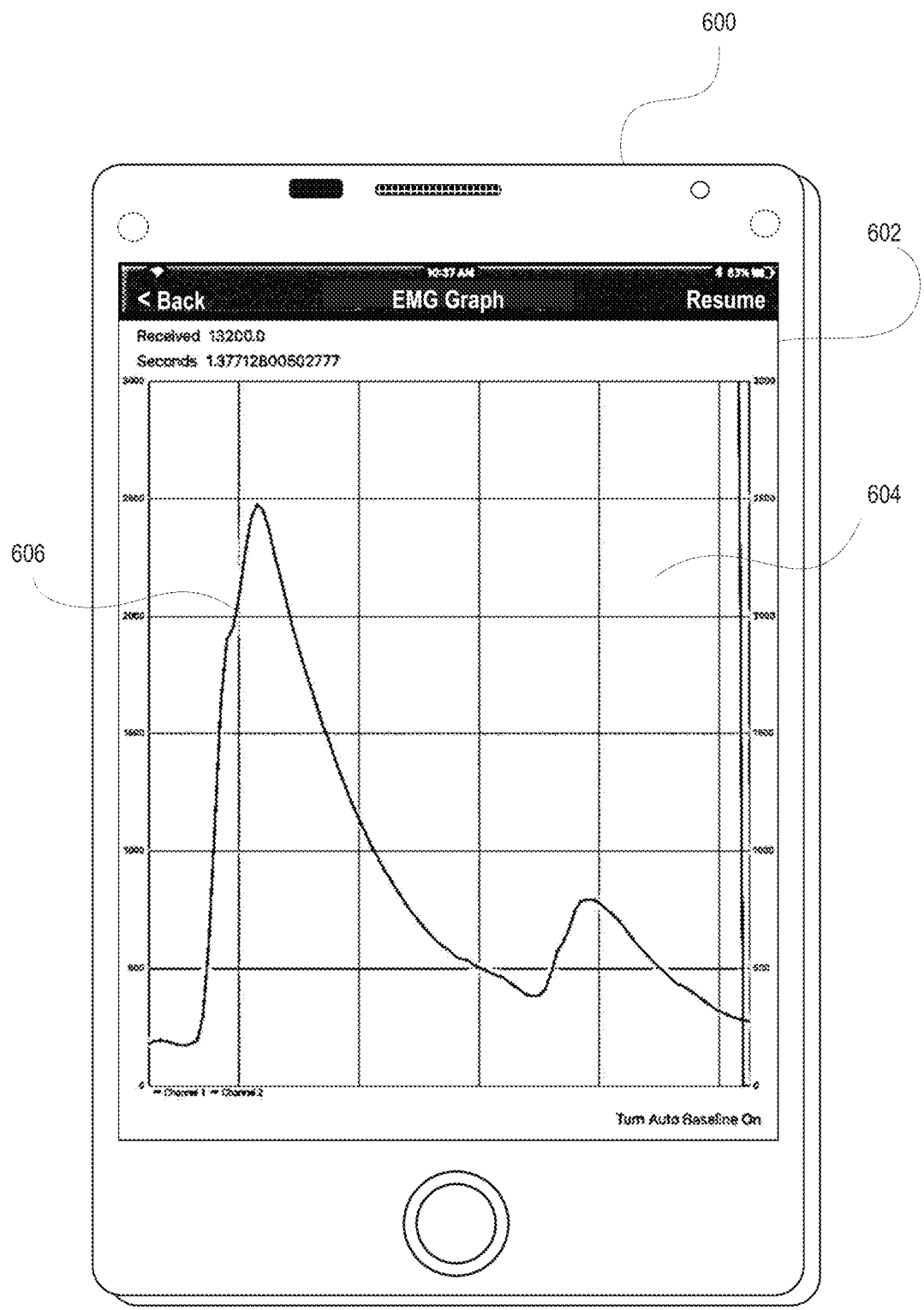
FIG. 6 is a front view illustrating a user device having a user interface device that is presenting an electromyography (EMG) trace, according to one or more embodiments.

FIG. 6 illustrates a user device 600 having a user interface device, such as a touchscreen 602, that executes a physiological graph application 604. In this instance, the user interface device is presenting an EMG trace 606.

In some embodiments, the subject is partially or completely disabled, such as for example a quadriplegic subject, and the apparatus provides for control of a user device that facilitates control of a disabled subject's environment so that the subject can be at least partially self-sufficient. For example, in some embodiments the user device is a portable electronic device (PED), personal computer, a wheelchair, a bed, a telephone, a home appliance, and/or a speech synthesizer. Exemplary user devices can include or be a mobile phone, a smartphone, a PDA, a computer, and a media player. A media player can include or be any device suitable for displaying images, and/or playing sounds and/or video. A smartphone is a portable electronic device (PED) that combines the functions of a personal digital assistant (PDA) with a mobile phone. Smartphones typically have computer and computer processing hardware, firmware, and software built into the unit. Smartphones can include the functionality of portable media players, low-end compact digital cameras, pocket video cameras, and global positioning system (GPS) navigation units to form one multi-use device. Modern smartphones also include high-resolution touch screens and web browsers that display standard web pages as well as mobile-optimized sites. High-speed data access is provided by Wi-Fi and Mobile Broadband. The most common mobile operating systems (OS) used by modern smartphones include Google's Android, Apple's iOS, Nokia's Symbian, RIM's BlackBerry OS, Samsung's Bada, Microsoft's Windows Phone, Hewlett-Packard's webOS, and embedded Linux distributions such as Maemo and MeeGo. Such operating systems can be installed on many different phone models, and typically each device can receive multiple OS software updates over its lifetime. In some embodiments, the subject is in need of controlling a complex user device or is functioning in a difficult environment and can utilize the assistive device to control the user device or function in the environment. For example, the subject in some embodiments can be a pilot, driver, scuba diver, or soldier.

Figure 7:
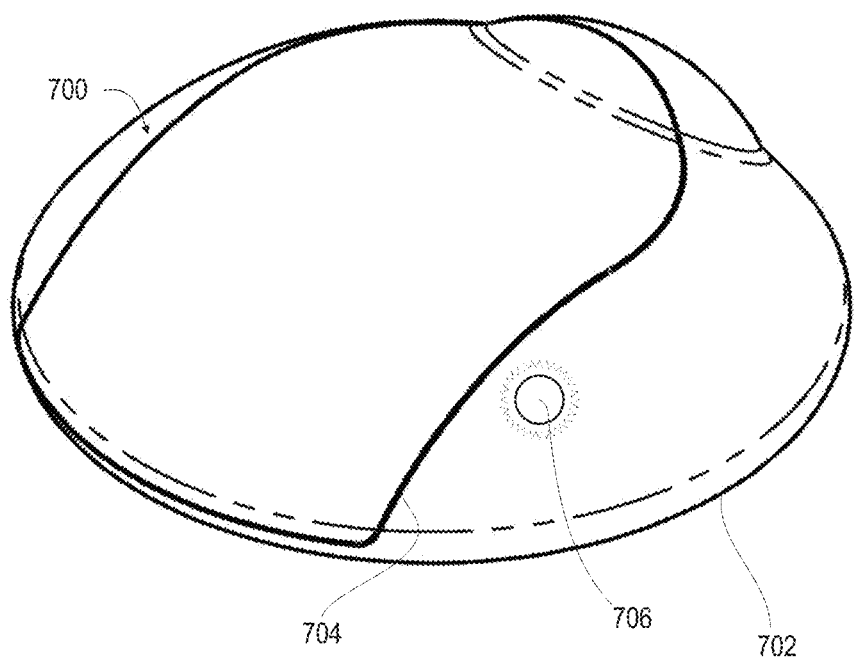
FIG. 7 is an isometric view illustrating an example biosignal sensor device having an outer housing with a battery, according to one or more embodiments.
Figure 8:
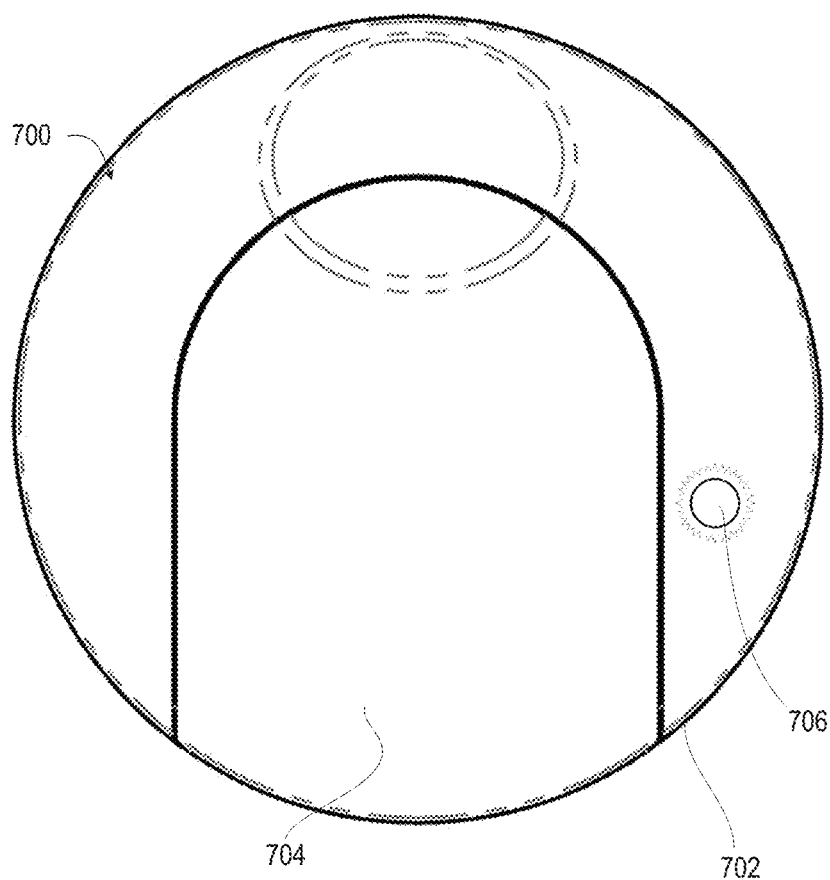
FIG. 8 is a top view of the example biosignal sensor device having the outer housing with the battery, according to one or more embodiments.
Figure 9:
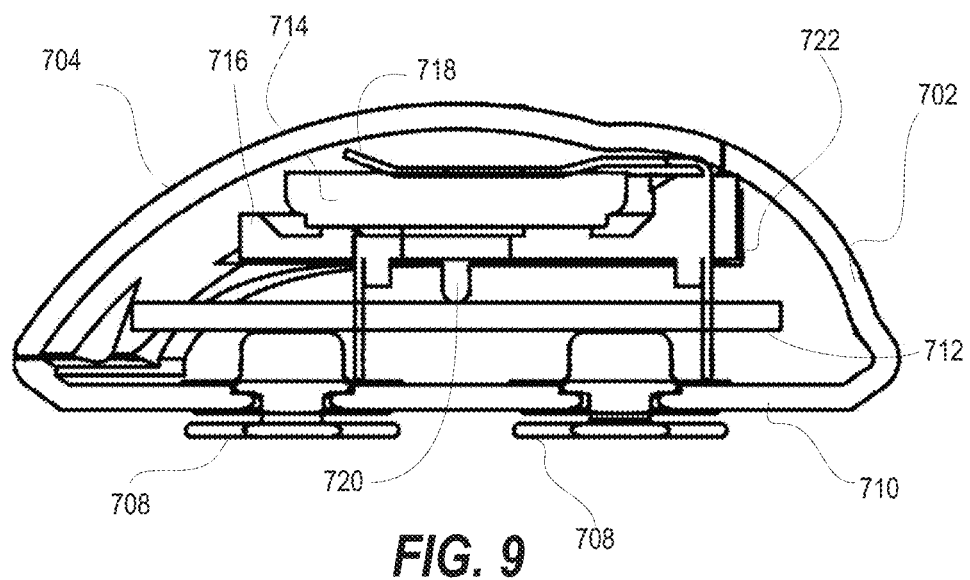
FIG. 9 is a side cutaway view illustrating the example biosignal sensor device having the outer housing with a battery compartment, according to one or more embodiments.

FIGS. 7-8 illustrates an example biosignal sensor device 700 having an outer housing 702 with a removable battery door 704. One or more light emitting diode (LED) indicators 706 can indicate various colors to communicate status and operating mode. FIG. 9 illustrates that electrodes 708 are snap fit inserted into an underside 710 of the outer housing 702. Each electrode 708 makes physical and electrical contact with a bottom surface of a printed circuit board (PCB) 712. In one or more embodiments, a coin cell battery 714 is located beneath the battery door 704 and is held in a battery receptacle 716 by a by a battery arm 718. In other embodiments, the battery is non-removeable by the user within the device. A battery contact 720 extends from the battery receptacle 716 to the PCB 712 to provide an electrical ground. A battery contact 722 extends from the battery arm 718 to the PCB 712 to provide positive electrical voltage to power the biosignal sensor device 700.

The biosignal sensor device 700 can operate as a stand-alone EMG switch, capable of pairing with a variety of devices. If using the biosignal sensor device 700 with a portable electronic device, the sensitivity can be set within biosignal sensor controller application executed on the portable electronic device as described below. As a standalone switch, the biosignal sensor device 700 has built-in indicators 706 in order to visually cue the user at the instance of a switch. A green indicator light indicates an EMG signal was counted as a switch. A blinking red light indicates that the biosignal sensor device 700 is Bluetooth broadcasting. Upon powering up, the biosignal sensor device 700 will go through a launch sequence as a series of colors such as green, blue, red, and white. After passing through the launch sequence, the biosignal sensor device 700 will remain on a solid color for a few seconds indicating a static threshold level: 10, 20, 50, 100, or 200 microvolts, or dynamic scaling. It is recognized that various color schemes may be used depending upon the application of the device.

Figure 10:
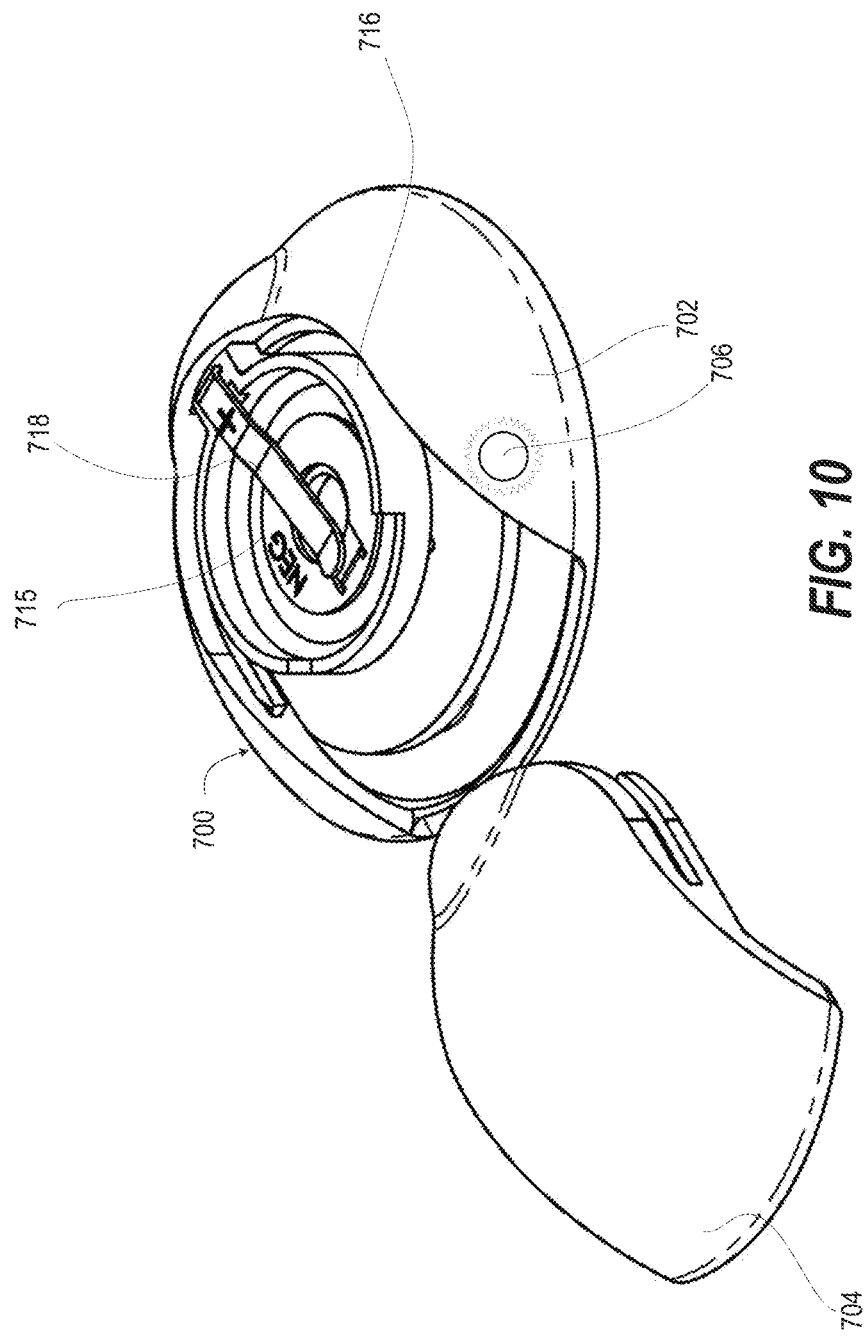
FIG. 10 is an isometric view illustrating the biosignal sensor device with the battery door detached from the outer housing, according to one or more embodiments.

FIG. 10 illustrates the biosignal sensor device 700 with the battery door 704 detached from the outer housing 702, exposing the base electrode 715 and the battery (not shown) within a battery receptacle 716, wherein the battery is retained by the first active electrode arm 718. In one or more embodiments, the biosignal sensor device 700 contains a battery 714 that is non-replaceable by the user. In some embodiments, the battery is rechargeable by the user.

In one or more exemplary embodiments, manually changing the threshold can be made by: (i) ensuring that the device Bluetooth is "OFF"; (ii) Power on the biosignal sensor device 700 by inserting the battery 714 or performing a power cycle with a provided plastic collar stay or shim that is momentarily inserted between the battery 714 and the first active electrode 718; (iii) Upon performing the power cycle on the biosignal sensor device 700, the biosignal sensor device 700 will go through a launch sequence as the series of colors as previously described; (iv) Insert a pushpin tool to cycle through the threshold colors until the desired threshold is reached; (v) Attach the biosignal sensor device 700 to the electrodes; (vi) Attach the electrodes to the user's skin; (vii) Test the user's signaling ability using the signal indicator 706. If the signal indicator 706 is always green, set the threshold to a higher scale. If the signal indicator 706 never turns green, set the threshold to a lower scale; (viii) Turn on the Bluetooth functionality of the biosignal sensor device 700.

Figure 11:
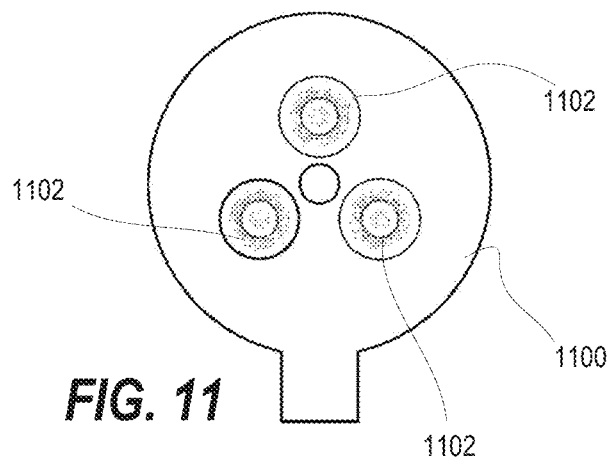
FIG. 11 is a top view illustrating a single disk with three (3) snap connectors that can be conveniently attached directly to the biosignal sensor device according to one or more embodiments, wherein the attachment of the biosignal sensor device can be by adhesive, strap, or other means of attachment.

The method may further include putting a device on the user, wherein the device provides a controller that switches from on/off based on set parameters to control one of a wide variety of electronic devices. For example, the device may be put on the user's wrists, ankles, fingers, chest, feet, arms, legs, forehead, etc., through a belt, wrist band, or through attachment to socks, gloves, pajamas, eye mask, hairband, etc. The system may further include an attachment part, such as a magnet, Velcro, belt, etc., for attaching to a fixture and/or the user. FIG. 11 illustrates a single adhesive disk 1100 with three (3) snap connectors 1102 that can be conveniently attached directly to the biosignal sensor device 700 (FIG. 9).

In one or more embodiments, the devices (or additional sensors) can be positioned at any appropriate position on a subject's body, e.g., chest, abdomen, wrist, arm, etc. The devices can be in direct contact with the skin of a subject or indirect contact with the skin of the subject. In some instances, the devices are fixed directly to the skin of the subject by any suitable means, e.g., by applying a tape or glue. In some instances, the devices are fixed on a monitoring garment that can be tightly conformed to the body of the subject.

The wearable device and/or sensor is generally suitable to be directly attached to a subject or embedded in or carried by a support structure, such as a monitoring garment that is suitable to be worn by the subject. The monitoring garment is configured and adapted to cooperate with the wearable device and tightly conform to the body or a part of the body of a subject when secured thereon. The monitoring garment can include one or more devices, e.g., to monitor one or more physiological parameters, such as electrocardiogram, temperature, blood oxygen level, heart rate, pulse rate, blood pressure, etc. The monitoring garment can further include processors that are in electrical connection with the devices.

The monitoring garment can include various garments or items that are adapted to tightly conform to at least a portion of a subject's body, such as a scuba wet suit, shirt, vest, jacket, band, strap, belt, and the like. In some instances, the monitoring garment is a thoracic strap around the subject's chest, a belt around the subject's abdomen (e.g., a belt), or combinations thereof. The devices can be attached to different items of the monitoring garment, e.g., devices attached to a strap around the chest or attached to a belt around the abdomen of the subject. The devices can also be attached to the same item of the monitoring garment, e.g., devices attached to the same strap around the chest of the subject. Monitoring garment can be made with materials that are suitable for a wearable garment or clothing tightly conformed to the body or a body part of the subject, e.g., elastic materials.

Figure 12:
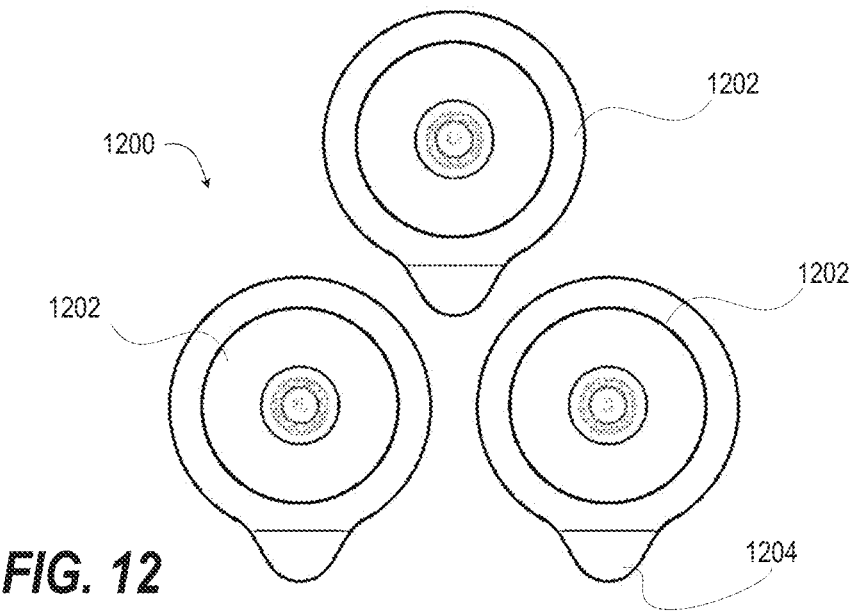
FIG. 12 is a top view illustrating an example of a set of three (3) individually gelled electrodes with a peel away tab for a reliable electromyography (EMG) signal acquisition and transmission, according to one or more embodiments.

FIG. 12 illustrates an example of a set 1200 of three (3) individually gelled electrodes 1202 with a peel away tab 1204 for a reliable EMG signal.

Figure 13:
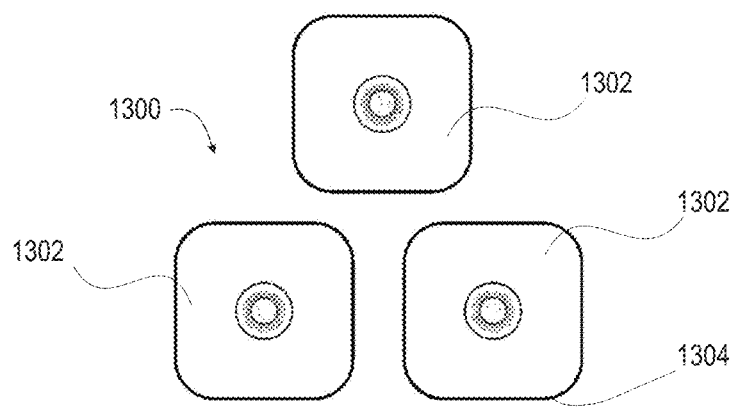
FIG. 13 is a top view illustrating an example of a set of three (3) individually gelled electrodes on a reduced size substrate, according to one or more embodiments.

FIG. 13 illustrates an example of a set 1300 of three (3) individually gelled electrodes 1302 on a reduced size substrate 1304. The individually gelled electrodes 1202, 1302 (FIGS. 12-13, respectively) can be connected to a lead wire adapter base that mounts to the biosignal sensor device 700. Orient the plastic keying points on the face of the adapter plate with the matching keying points on the bottom of the biosignal sensor device 700 (FIG. 9). Take care that the two pieces are aligned before snapping them together. Observe the black and white color-coding of the lead wires (two white, one black) and match them to the accompanying connectors exiting the adapter plate.

Figure 14:
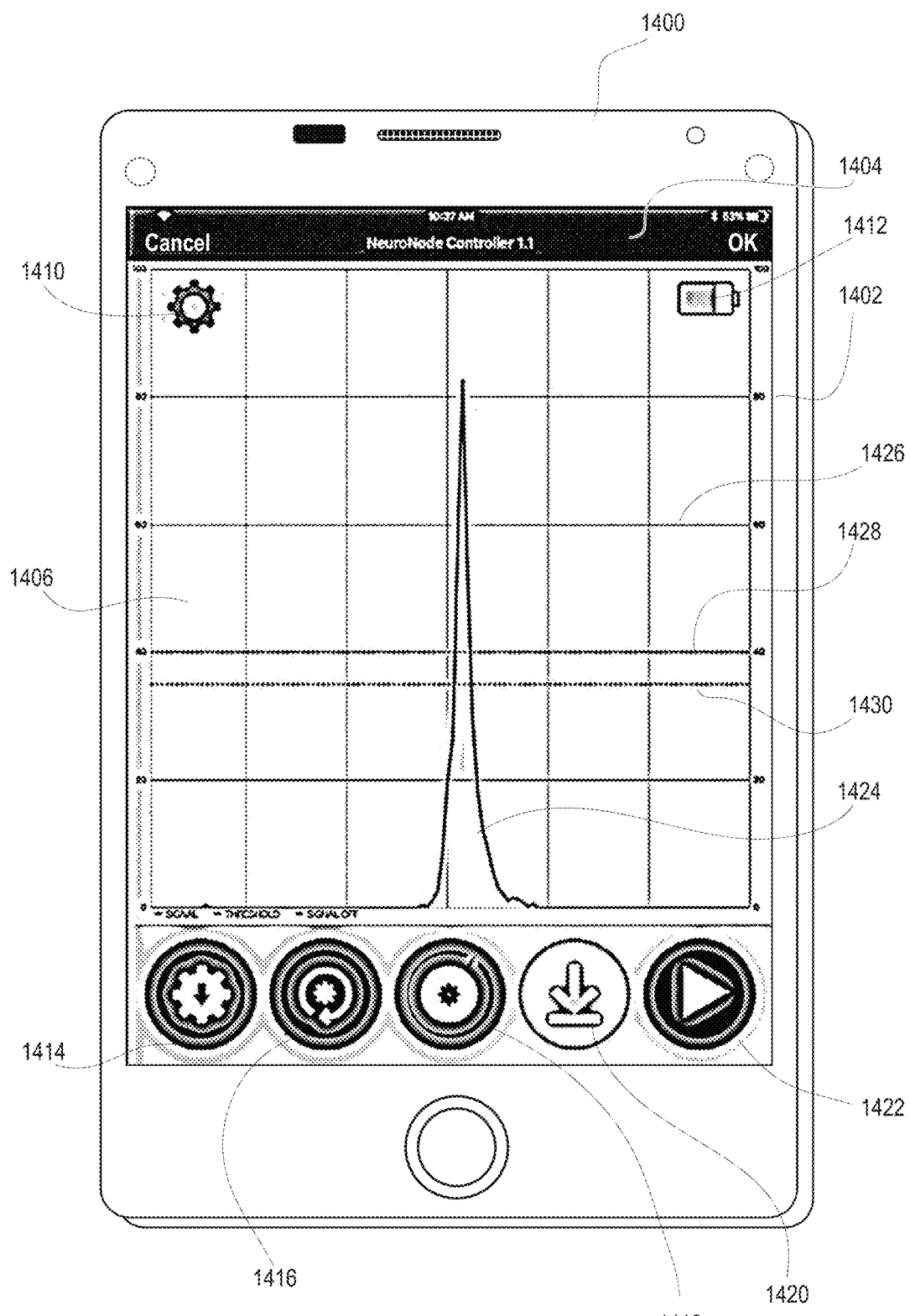
FIG. 14 is a front view illustrating a user device such as a portable electronic device (PED) having a user interface on which is presented a controller application, according to one or more embodiments.

In one or more exemplary embodiments, FIG. 14 illustrates a user device such as a portable electronic device 1400 having a user interface 1402 on which is presented a controller application 1404. In one or more embodiments, the controller application 1404 performs as an EMG Augmented Assistive Communications (AAC) controller application that is designed to pair with the biosignal sensor device 700 (FIG. 7) as an assistive control device. The application 1400 allows the user to adjust parameters and monitor signal activity to ensure optimal signal outcomes that provide efficient and effective control of a portable electronic device 1400 utilizing Apple's accessibility suite. In one or more embodiments, the controller application 1404, installed on the user's chosen portable electronic device, is used to set the signaling threshold while continuously graphing the data stream. This smart application 1404 automatically re-calibrates to adjust to the user's strength and energy level without assistance from a caregiver or clinician.

The user interface 1402 presents a graph screen 1406 on which are provided: (i) controller settings icon 1410; (ii) battery level indicator 1412; (iii) save settings icon 1414; (iv) restore settings icon 1416; (v) edit graph settings icon 1418; (vi) reset resting level icon 1420; and (vii) pause/play icon 1422. A graphical depiction of amplitude signal trace 1424 as a function of time is annotated with grid lines 1426, a threshold level indicator line 1428, and a signal off level indicator line 1430.

The save settings icon 1414 provides a user control to direct the biosignal sensor controller application 1404 to store the current switching parameters in non-volatile memory of the biosignal sensor device 700. On power-up, the biosignal sensor controller application 1404 will load these saved settings to be used as the working switching parameters. The restore settings icon 1416 sets the application 1404 and the biosignal sensor working switching parameters to the parameters read from the biosignal sensor device 700 (FIG. 7) when the application 1404 was initially launched. Reset resting level icon 1420 sets a new baseline based on the user's current resting level. The button is grayed-out if Auto Baseline is not turned on. Pause/play icon 1422 toggles the real-time graph on (sweeping) and off (paused). Pausing the graph will put the biosignal sensor device 700 (FIG. 7) in a low-power mode, nearly tripling its battery life. Also, when Paused, the biosignal sensor device 700 (FIG. 7) will be disconnected as an input device. This can be helpful for performing maintenance or updates to the portable electronic device 1400 that requires the touchpad.

In one or more exemplary embodiments, Apple's Switch Control is integrated with the exemplary portable electronic device 1400, giving users and therapists versatile scanning technology to enter text, generate speech, and more. In one exemplary embodiment, the Apple iPad comprises Apple Switch Control icons: (i) Keyboard; (ii) Pointer; (iii) App; (iv) Clock; (v) Menu Bar; (vi) System; (vii) Custom; and (viii) Location. The Apple iPad comes with Apple's Switch Control word prediction and text-to-speech software. With Switch Control, the biosignal sensor enables users to write and have their words spoken by a choice of voices. The prediction accuracy will increase as the software learns the words and phrases that are used most often. Switch Control features include: self-learning word prediction, and history and sentence prediction, with a choice of an English, Spanish, French, German, Italian, Swedish, Norwegian, Danish, or Dutch user interface.

Figure 15:
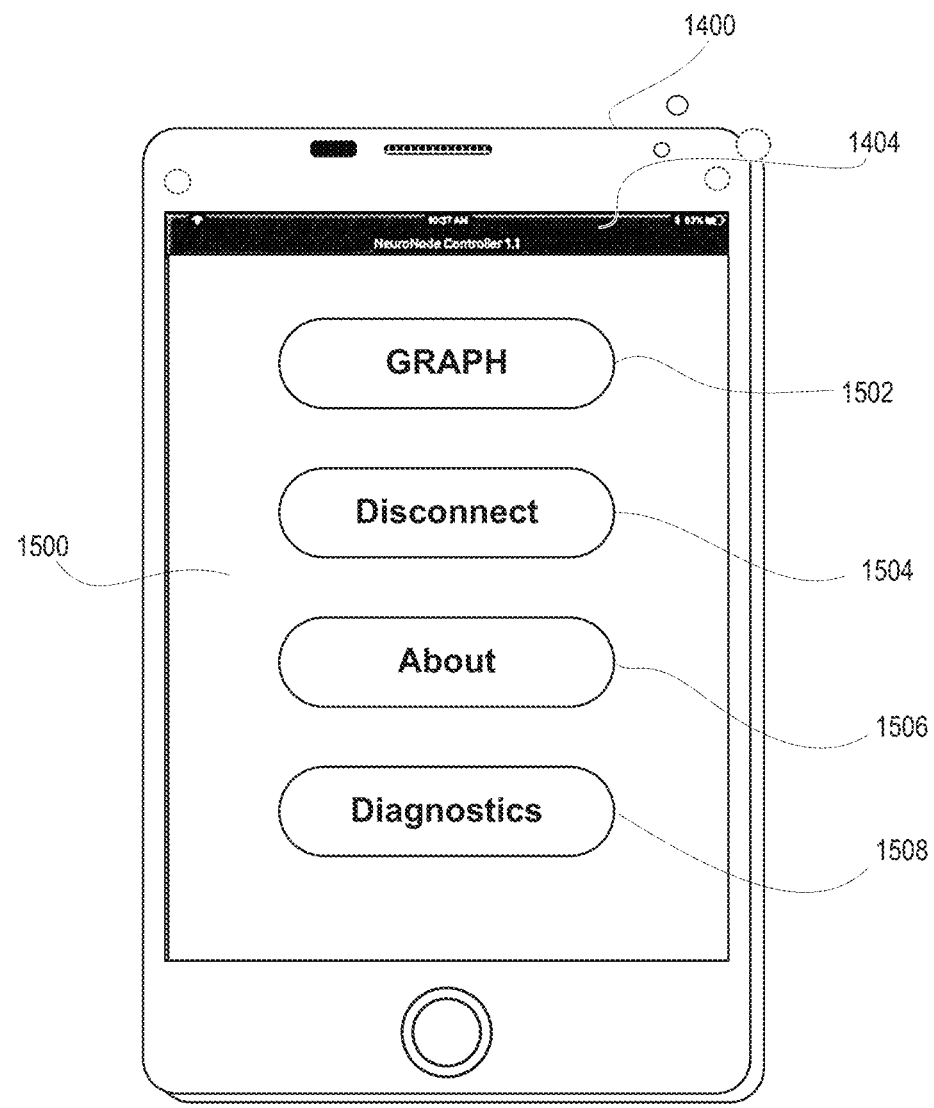
FIG. 15 is a front view illustrating the controller application in main menu mode, according to one or more embodiments.

FIG. 15 illustrates the biosignal sensor controller application 1404 in main menu mode 1500 that includes a graph button 1502 that presents the graph display. A disconnect button 1504 disconnects the biosignal sensor device 700 (FIG. 7). Touch on this button at times when the battery needs changed or when the biosignal sensor device 700 (FIG. 7) will be out of use for more than 60 minutes. For shorter breaks in a session (and to conserve battery life), the user may temporarily pause the Graph Display to put the biosignal sensor device 700 (FIG. 7) to sleep. The about button 1506 displays identifying information about this biosignal sensor system, including the serial number of the biosignal sensor device, the software version of the Application, and the software version of the biosignal sensor itself. Diagnostics button 1508 initiates self-test features.

Figure 16:
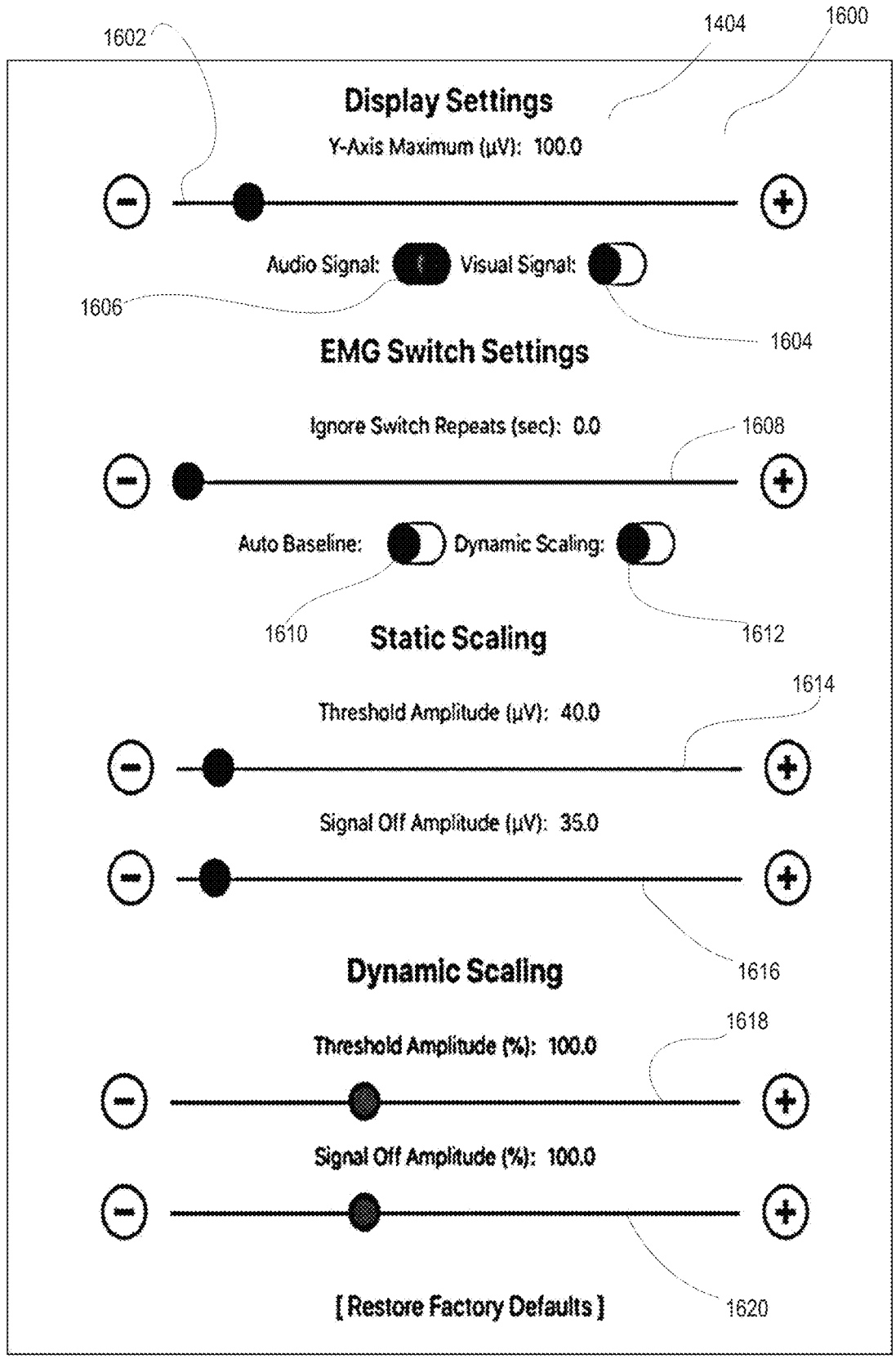
FIG. 16 is a front view illustrating the controller application in graph settings mode, according to one or more embodiments.

FIG. 16 illustrates the biosignal sensor controller application 1404 in graph settings mode 1600 that is triggered by selecting the graph settings icon in the center of the applications icon dock. Y-axis maximum slider bar 1602 sets the full-scale range of the graph. Setting this parameter to 100 microvolts, for example, will allow signals of 0 to 100 microvolts to fully appear on the graph. Visual signal indicator toggle switch 1604 directs the application to flash the display when a switch is made (i.e., when the signal crosses above the threshold amplitude.) Audio signal indicator toggle switch 1606 directs the application to beep when a switch is made (i.e., when the signal crosses above the threshold amplitude).

In one or more exemplary embodiments, an ignore switch repeats slider bar 1608 is helpful when the user is getting "false" switches after the original switch. These unintended switches can be the result of fasciculation or an inability to relax after making the original switch. Saving the ignore switch repeats setting to the biosignal sensor can provide more consistent switching performance across multiple platforms and applications. Auto baseline indicator selection switch 1610 sets the biosignal sensor device to a mode of operation where it will set a new baseline based on the user's current resting level. If the resting level decreases, the biosignal sensor device will use the resting level as the baseline. Dynamic/Static scaling selection switch 1612 imposes respectively either a dynamic or a fixed criterion that the signal must satisfy in order to be counted as a switch. The latter criteria remain unchanged over time.

When in static mode, the threshold amplitude slider bar 1614 sets the amplitude that the signal must cross above in order to be counted as a switch. Signal off amplitude slider bar 1616 sets the amplitude that a signal must fall before a new switch can be counted. Setting this parameter at the same level as the threshold amplitude will remove signal off amplitude as a switching determiner.

In one or more exemplary embodiments, dynamic scaling changes the criteria over time for determining if a switch has been made based on the user's performance. The resting level and the signaling level are both used in this ongoing calculation. As such, the biosignal sensor device will make it easier to switch as the user fatigues, or as the electrode interface conditions change.

When in dynamic mode, dynamic scaling threshold amplitude indicator slider bar 1618 sets a scale for use when in the biosignal sensor device's dynamic scaling mode. The lower the level, the more sensitive the biosignal sensor device will be in allowing a switch to be made. Signal off amplitude slider bar 1620 sets the level a switch must drop below before another switch is allowed. Setting this at 100% will set the signal off amplitude to the user's ongoing average resting level. Setting this parameter at the same level as the threshold amplitude will remove the signal off amplitude as a switching determiner.

In one or more exemplary embodiments, electrode placement entails choosing an EMG target muscle during the assessment, which can be changed at any point. Only one effective target muscle is needed to use the biosignal sensor device 700 (FIG. 7). This muscle is chosen based on two criteria: (i) the muscle should respond, at least minimally, to a contract command; and (ii) the muscle should return to a resting state in a timely manner. The muscle does not need to function at optimal levels. The biosignal sensor device 700 (FIG. 7) is designed to respond reliably and accurately to minimal signals at the target muscle site.

Although the placement of the biosignal sensor device does not have to be exact, there are some general guidelines for placing the device onto the target muscle site. When using a triple electrode (FIG. 11), the two active electrodes are located on the bottom of the biosignal sensor device, running parallel to the battery cover. When using single electrodes and lead wire adapter base (FIGS. 12 and 13), the two active electrodes (white snaps) should be placed along the length of the muscle, which is being used to generate a switch. The reference electrode (black snap) can be placed in an isosceles triangle relationship to the other two active electrodes or on some electrically neutral site on the body.

Upon establishing a good signal and before starting Switch Control, a good signal is established with the biosignal sensor device that will become the user's switch for selecting items on the assistive technology device. A good signal is characterized by having a clear delineation between a resting level and a switching level.

In one or more exemplary embodiments, Turning Switch Control on and off is performed by: Step 1: select the settings icon on the portable electronic device. Step 2: select the general tab within settings. Step 3: select the accessibility settings within the general tab. step 4: select Switch Control with the accessibility tab. A green Switch Control switch indicates that the Switch Control is on. Step 5: tap on the Switch Control switch to turn on Switch Control. A gray Switch Control switch indicates that Switch Control is off.

In one or more exemplary embodiments, Switch Control can be configured with multiple switches. In one or more exemplary embodiments the sensor device, one of the switch actions can be to choose the selected item.

In one or more exemplary embodiments, Scanning style can be configured with autoscanning selection, which moves the focus while scanning after a set duration. In one or more embodiments, manual scanning selection requires a switch to be made in order to move focus, and another switch to be made in order to select an item. Single switch scanning selection requires a switch to be made in order to move focus. If no action is taken after a set duration, the item with focus is automatically selected.

Auto scanning time is the number of seconds (for example, up to 5, 10, 15, 20, 25, 30 seconds or more) that are required to step from one item to another in a panel when using autoscanning style. Pause on first item selection is the number of seconds (for example, up to 2, 3, 4, 5, 6, 7, 8, 9, 10 seconds or more) that autoscanning stays on the first item in panel, group, or user interface. Loops setting sets the number of times Switch Control repeats a scan. The tap behavior setting adjusts what happens when a switch activated to select an item. Default setting shows the scanner menu upon selecting an item. The auto tap setting automatically selects the item unless another switch is made during the set duration, at which time the scanner menu will appear. The "always tap" setting automatically selects the highlighted item instead of showing the scanner menu. This setting only works while scanning in item mode and puts the scanner menu at the end of the scan. Focused item after tap setting determines where the scan restarts after an item is selected, either the "first item" (i.e., the beginning of the scan) or at the "current item". Ignore repeat setting is the number of seconds (for example, up to 6, 7, 8, 9, 10, 12, 14, 16 seconds or more) during which repeated pressing of a switch is ignored. Gliding cursor speed is the speed from "1" (slow) to "100" (fast) at which the gliding cursor moves across the screen. Use this setting to adjust the speed while in point mode. Speech setting turns on or off audio cues during scanning. Cursor color setting controls the color of the gliding cursor in point mode or the color of the grouped items in item mode.

Setting an accessibility shortcut provides a quick, efficient way to turn Switch Control on and off without entering the system settings. In order to create an accessibility shortcut, the accessibility settings are configured by enabling Switch Control as previously described. Then the accessibility shortcut setting is set to "Switch Control", allowing the user to turn Switch Control on and off by pressing the home button on and off three times in quick succession.

In one or more exemplary embodiments, guided access setting limits a portable electronic device to a single application and allows the user to control which application features are available. With guided access, the user is able to temporarily restrict a portable electronic device to a single application and, more importantly, to disable areas of the screen where an accidental gesture or selection may cause an unwanted action.

In one exemplary mode, from the portable electronic device home screen, the default Switch Control scanning mode is item mode. Item mode highlights items or groups on the screen one at a time. Point mode allows selection of an item on the screen by pinpointing it with scanning crosshairs. Changing from point mode to item mode includes adjusting the timing parameters within Switch Control tap behavior settings. Step 1: The default setting is auto tap set to 0.20 seconds that should be adjusted to 2.0 seconds. Step 2: scan to and select any item on the portable electronic device. Once an item is selected, make another switch with 2 seconds to display the scanner menu. Step 3: scan to and select item mode. If in item mode, scan to and select point mode. In order to increase overall speed, it may be helpful to return to Switch Control tap behavior.

The biosignal sensor device will also work with eye tracking devices (also referred to as eye gaze). Eye tracking is a technology that tracks the motion of the eye relative to the head. In a normal embodiment, the eye tracker will determine the user's intention by observing where the eyes are trained and then processing a 'Selection'. A Selection is the process of choosing what the eyes are trained on. Normally, a selection is made by maintaining the gaze in position for some predetermined time or by performing an eye closure. The biosignal sensor device system can be used as the Selection mechanism as a replacement for standard Selection strategies. The biosignal sensor device for Selection can significantly increase the speed of eye tracking communication while significantly decreasing the user fatigue associated with other Selection methods.

It should be understood that the invention's eye gaze user interface and method can be implemented on a wide variety of different types of eye gaze detection and virtual display devices, some head mounted, and some not. In some cases, the device may be head mounted, and in other cases the device may not be head mounted. Some devices may only monitor the gaze direction of one of the user's eyes, while other devices may monitor the gaze direction of both of the user's eyes. The device will generally have a display upon which various visual targets, such as symbols, may be displayed in order to give the user something specific to gaze at. Although in this specification, generally such displays are shown as see-through virtual displays (because this type of display enables a user to see the surroundings beyond the virtual display), in some embodiments the device utilize a standard, non-see-through, type display The device may monitor eye gaze directions by many methods, including video cameras trained on the eye along with automated image analysis software that interprets eye gaze direction from the visual appearance of the eye. Alternately the device may monitor eye gaze direction by bouncing light off of the surface of the eye and noting the direction of the reflected beam or beams of light, or other means.

The device will typically be a computer operated device, often including at least one microprocessor, memory, and software to control the visual display. The device will generally take input from the eye gaze sensor or sensors and convert this input into an eye gaze direction, as well as correlate this eye gaze direction with a particular visible element and eye position zone associated with this particular visible element on the device's display. The device may additionally contain communications devices, such as wired or wireless network connections to communicate to and from other outside devices, cell phone networks, and networks such as the Internet. Note that although in some embodiments, this microprocessor and communications devices may be internal to a device that in turn is mounted on the user's head, in other embodiments, the device may be more of a dumb device, and microprocessor(s) and communications devices may instead be outside of the device, and in some cases connected to the device by a cable.

CONTEXTUAL EMBODIMENTS

The present disclosure illustrates various techniques and configurations to enable a series of dynamic workflows for the selection and presentation of content from an information system relevant to activities of a human user. The dynamic workflows used with the biosignal sensor device as described herein enable the integration of user interfaces and user communication platforms to achieve relevant and timely communication among users and others and related actions. The dynamic workflows described herein further may be integrated with social networks and portable communication mediums, to provide additional availability and delivery of content to users in a variety of settings.

In one example, an internet-hosted information service is offered to users through a series of dynamically changing user interfaces. For example, a software application may be used to collect, display, and deliver relevant and timely communication, suggestions, and content to and from a user. The information service may be used to directly interact and implement aspects of a workflow with a subject human user or patient, while also facilitating interaction with other humans or agents, such as friends, family, experts, professionals, and the like.

The workflows may integrate with various evaluations that dynamically assess a user's current state. For example, user interaction from a series of evaluations may be collected to monitor and measure a user's health, location, time and date, other persons nearby, etc., to facilitate real-time, interaction with the user.

The dynamic workflows and the various interaction applications of the biosignal sensor device as described by the present disclosure may be configured for receipt, processing, and delivery of relevant content from an electronic information system. The information system, as further described herein, may implement human interaction with a series of workflows and processing activities that deliver relevant content to encourage human activity and progress towards an ultimate goal. Relevant content may be provided in a push or pull manner, on schedule or in response to determined conditions, and manually or automatically from the information system, in accordance with the following techniques.

In one or more embodiments, the experience for a user of a computing device of the present invention may be significantly enhanced by operating the computing device in a way that is context dependent. The context, and hence a desired operation of the computing device, may be determined based on the location of the computing device and actions from which intent of the user may be inferred. Such operation may be achieved with a computing device that can sense its position relative to locations that have been designated as being associated with a desired configuration of the computing device. For example, a computing device whose location is in a bedroom may automatically configure itself as an alarm clock or bring up menus for sleep/wake activities. In some embodiments, the context of a computing device may be determined by reading values from tags using a proximity-based radio. The tags may be passive tags, responding the radiation emitted by the computing device.

A context-sensitive user interface input may be provided. Consistent with embodiments of the present invention, a user interface element comprising text input may be provided as part of an application user interface (UI). The UI element may comprise graphical assistance presented to a user as they type to aid in building an application action. The UI element may provide context-sensitive suggestions; that is, given what the element knows about the user's context (e.g. an application focus such as a calendar or an email function and what the user has typed already), the control may offer different options and/or suggestions as to what the user may enter next.

Disclosed are an example system and example methods for retrieving content based on context in a mobile environment. In one example embodiment, the method includes using an application in the system 100 (FIG. 1) that receives events when a user is interacting with a specified application in the device. During operation, the application starts monitoring a specified application for context information. When the application detects the existence of context information, it may retrieve the context information from the specified application and use the retrieved context information to search content of other applications in the device that is related to the retrieved context information.

The user interface control may comprise a text-box in which the user may type actions. Actions may comprise "sentences" that may follow a grammar defined by the application. As the user enters "token" (words) and builds the action, a graphical user interface may follow the text caret and may provide suggestions on tokens that may be typed next and/or selected to continue to build the action. Once the user is done, a completed executable action may be sent to the application for processing.

The contextual application may monitor other applications installed on device for contextual information for use in a predetermined context. In some example embodiments, the predetermined context may be a specific application or applications. In other example embodiments, the predetermined context may refer to a specific field or fields within one or more applications. In still other example embodiments, the predetermined context may be a specified graphical interface screen or screen (i.e., page or pages) within one or more application. In yet other example embodiments, the predetermined context may be certain information or data automatically provided by a system service, such as a location from a global positioning system service; a date from a calendar service; or a time from a clock service, of the device.

Contextual information can be used for a wide variety of applications and can generally be characterized as information that is relevant to an understanding of something. For example, traditionally, context includes information about a location and its surrounding environment, the identity of things named in a text such as people, places, books, and so on. However, other types of information promise to be of as much or even greater benefit for next-generation communication services. Using context information, an application may search and provide results from other applications that are relevant to the context information. The application may receive contextual information when the user of the device is interacting with one or more specified applications, and retrieve content from the application being accessed when such application meets a set of criteria or predetermined context.

In other example embodiments, the contextual application may be configured to notify the user of the device of the results in one or more unobtrusive methods. For example, the retrieved content may be displayed in a status bar or notifications bar of the sensor system, or in an indicator indicating that relevant content has been retrieved and may be displayed in a status window (such as where connectivity strength or battery life remaining are typically found). In another example embodiment, the contextual application may transmit the results or a notification that results have been received to a device located remotely from and communicatively coupled to the sensor system. Such remote device may be a mobile device or a watch capable of communicating with the sensor device system via a wired or wireless connection such as Bluetooth or Wi-Fi. Such transmissions may be in addition to or in lieu of notifications within the sensor device system.

The contextual application may be any application or another computer program installed on the sensor device system which is executable by a processor and can be stored on a computer-readable media. In some example embodiments, the contextual application may refer to firmware and/or a combination of software and firmware. In some other example embodiments, the contextual application may be executed on the web or over a network. The contextual application may process, organize, manipulate, store, generate, display, and/or otherwise render context information that can be used by the contextual application to retrieve content from other applications.

In one or more embodiments, the contextual application may be configured to monitor all applications running on sensor device system. When a user interaction occurs for any application running on sensor device system, contextual application may be notified. Contextual application may then determine whether the application with which the interaction occurs is identified in a defined configuration. In some other example aspects, contextual application may be configured to monitor only specific applications such as, for example, Contacts application, for interaction by a user of sensor device system.

Contextual application may include one or more settings that allow a manufacturer, service provider and/or user of sensor device system to set which of the other applications installed on sensor device system will be monitored and to configure the predetermined context for the applications to be monitored. In some alternative example embodiments, a manufacturer, service provider and/or administrator of contextual application may configure the contextual settings and/or the predetermined context.

In one or more embodiments, the contextual application may be configured to monitor or detect applications for a particular event occurring in the sensor device system. An event may be any event performed as a result of user interaction with sensor device system, any event performed as a result of sensors such as RFID, GPS, facial recognition, voice recognition, time/date, etc. In some example embodiments, events may refer to events triggered by device sensors or system services, such as, for example, location services, accessibility helper services, or date and time services.

User interactions may refer to an event within the sensor device system wherein the user accesses certain applications such that a window of a contacts list application is displayed in the user interface of the sensor device system. Once context information is set and/or retrieved, the context information may be utilized by one or more contextual applications to retrieve content related to the context information from one or more applications.

In one example embodiment, contextual applications may run in the background while another application is being accessed such that when a user accesses and interacts with an application, the contextual application may retrieve the context information without user intervention and/or unobtrusively from an application and utilize the retrieved context information to search for content from any applications. In some alternative example embodiments, applications may be installed on a device or devices communicatively coupled to sensor device system. For example, the applications may be web or other applications stored on a remote server or other mobile device, such as a tablet computer or a watch, and contextual application may search for data from applications via a wired or wireless connection, such as Bluetooth or Wi-Fi.

In one or more embodiments, the contextual application may be configured for use with users or patients having a temporary disability or condition that prevents the user from normal computer or mobile device interaction. For example, a person confined in a hospital bed can utilize the sensor device system to communicate, control devices, signal interactions or emergency events, etc. In some example embodiments, a person may not be suffering from a physical disability but may be constrained due to environmental or situational factors such a person confined on a subway or an airplane where the person could utilize the sensor device system to communicate, control devices, and otherwise interact electronically without having to resort to writing, gestures or vocalizations. An event may be any event performed as a result of user interaction with sensor device system, any event performed as a result of sensors such as RFID, GPS, facial recognition, voice recognition, time/date, etc. In some example embodiments, events may refer to events triggered by device sensors or system services, such as, for example, location services, accessibility helper services, or date and time services.

In one or more embodiments, the contextual application may be configured to monitor or detect applications for a particular event occurring without the sensor device system. An event may be any event performed as a result of user interaction with one or more sensors, any event performed as a result of sensors such as RFID, GPS, facial recognition, voice recognition, time/date, etc. In some example embodiments, events may refer to events triggered by device sensors or system services, such as, for example, location services, accessibility helper services, or date and time services.

In one or more embodiments, the contextual application may be configured for utilization of the context-sensitive user interface element where text input may be provided as part of an application user interface (UI) with or without the sensor device system. For example, a person may temporary or permanent mental disabilities such as a geriatric patient or people with Alzheimer's disease or dementia in general where the user can make use of the contextually-sensitive user interface element to present a hierarchical system of panels for a user experience that guides the patient or user through the course of the day. For example, the system gathers context about the user's environment and adjusts the communication options based on this context.

Further, it is understood that any number of panels may present information in a paged manner. By "paging" and as used herein, it is meant an approach for taking a large or substantial list of items and segmenting them such that in a network perspective, data and/or information may be presented in a quick and efficient manner. By incorporating paging in the display, any number of the panels will only transmit a portion of the data across the network, which in turn may reduce data transfer costs and reduce delays due to this data transfer. It will be understood that one example of paging is infinite scrolling, whereby presented information automatically pages subsequent segmented information upon scrolling to the end of the currently presented page.

Context for custom communication panels can be gathered through automatic queries to an AI device or through other sensor systems. Context could be time-of-day, persons in proximity of the user, temperature, day of the week, calendar entries, medical data or sensor input, or any other input that would change what the user may want to say or do. A communication panel appears for the user on his computer (device) offering these customized choices. This could be in the form of a list or an array of buttons and includes third-party context, which brings up certain pre-made panels of items depending on a person present (or mentioned). A context generated button appears for "How was school", for example, if it is 4:00 pm on a weekday and the school-age daughter walks into the room. Context generated button "Can you take me outside?" appears, for example, if the caregiver is in the room in the afternoon and the current weather is sunny with no chance of rain. The system can be used to control and operate smart appliances without having to remember the names and directions utilizing context-sensitive switching. Smart residential systems can include one or more residential appliances, such as, but not limited to, a refrigerator, stove, microwave, toaster, coffee-maker, alarm clock, thermostats, humidifiers, sprinkler system, lighting, light dimmers, etc. In one or more embodiment, control server and/or controller client controls the operations and/or functions of one or more residential appliances, such as on/off, timers, modulation (e.g., oven temperatures, etc.), pause, snooze, etc.

In one or more embodiments, the predetermined context may be a Hypertext Markup Language (HTML) tag or HTML user interface (UI) element, container, or variable that contains information, data or value that may be used by another application to locate a record. The HTML elements may be components of an HTML document and the information, data or value may include other HTML elements, text, and the like. The data in the configured field may be any data type capable of being recognized by an application such as, for example, a label, a string identifier, a number identifier, or any string of text.

In another example embodiment, the predetermined context may be an Extensible Markup Language (XML) tag or corresponding user interface (UI) element, container, or variable that contains information, data or value that may be used by another application to locate a record. The XML elements may be components of an XML document and the information, data or value may include other XML elements, text, and the like. The XML element may be referenced via an XML Path Language (XPath) location path. The data in the configured field may be any data type capable of being recognized by an application such as, for example, a label, a string identifier, a number identifier, or any string of text.

In some example aspects, such as where an application has multiple user interfaces or pages, a specific interface from where information can be retrieved may be set in the defined configuration of contextual application. In such example aspects, determining if the event meets the defined configuration may include verifying that the user interface or page currently being accessed by a user (i.e., the "active" interface or page) is the user interface of the application specifically defined as a predetermined context.

In some example aspects, contextual application may also provide a notification to the device user regarding the identification or availability of results of the search for content related to the context information. In some example embodiments, the providing of notification to the user may be performed in unobtrusive manner using a notification layer in sensor device system. In other example embodiments, the notifications may be message sent via text or e-mail. Other unobtrusive methods of providing notification to the user while the user is accessing application will be known in the art. In some alternative example embodiments, a mobile device, such as a smart watch, may be communicatively connected to sensor device system. In such example embodiments, notifications of search results may be sent to the second mobile device. Such notifications may occur through text or e-mail messages, vibrations, lights, background changes or other known methods.

In one or more embodiments, the present invention provide systems and methods for implementing an interaction model with the user in order to interact with data of any data source in a natural way. In some examples, the system receives natural language input from the user and processes the input using multiple technologies such as keyword mapping, fuzzy logic, context-sensitivity and historical search data.

In one or more embodiments, the present invention provides systems and methods for data retrieval using an interactive, dynamic model that enables a self-learning and context-sensitive semantic layer to allow a user to retrieve and report data in a natural way from one or more data sources. Instead of pushing the user into a pre-defined or static model thereby allowing the user access to only a pre-defined set of questions and data reporting, the system allows the user to explore data in a manner similar to a conversation, e.g., starting on a broad level and then detailing into specific areas that he/she is attempting to locate.

In one or more embodiments, the sensor device system is configured to learn on multiple levels as the user uses the system more. In one or more embodiments, if the sensor device system does not understand how a keyword is mapped to an existing data structure (e.g., how it is mapped to a data entry or table name of the data sources), the sensor device system provides an interactive object that receives information about the keyword from the user.

In one or more embodiments, one or more context-sensitive main communication panel modules are disclosed that are configured to connect one or more front-end systems, such as one or more digital assistants, to one or more back-end systems that are deployed in a user environment. A digital assistant, also referred to as a virtual assistant or chatbot, is a software agent that is configurable to perform tasks for a user. Examples of digital assistants include Apple Siri, Google Assistant, Amazon Alexa, and Microsoft Cortana. Digital assistants typically interact with users via one or more of text (e.g., online chat, such an instant message application), voice, image, or video inputs or outputs. Digital assistants use natural language processing (NLP) to match user inputs to user intents. Many digital assistants use artificial intelligence techniques, including machine learning, to improve their matching performance. Digital assistants are typically activated using a wake word (e.g., "Alexa" for Amazon ALEXA or "OK Google" for Google ASSISTANT).

In one or more embodiments, the one or more context-sensitive main communication panel modules include (a) a module that is configured to infer at least one of an intent, context, or classification from a command received at the one or more front-end systems, (b) a learning module that is configured to generate one or more requests (e.g., distribute one or more commands to the one or more back-end systems), receive one or more responses to the one or more requests, format the responses according to one or more machine-learned presentation rules, and generate insights for use in future command processing, and (c) an execution (output) module that is configured to generate the one or more responses to the one or more requests (e.g., by executing the one or more commands, such as commands for querying or scraping data sources associated with the back-end system and/or data sources external to the one or more back-end systems, such as external public data sources). In one or more embodiments, the output of the responses is through one or more connected front-end systems, such as one or more digital assistants.

In example embodiments, learning modules employ machine-learning techniques to learn workflows associated with each user environment, including user-specific vocabularies that are used for purposes of determining intent, context, and classification of commands received from the front-end systems, and mapping of commands received from the one or more front-end systems to the machine-learned user workflows. Based on a machined-learned mapping of the query to a machine-learned pathway into one or more of the back-end systems deployed, as discussed above, the learning module automatically submits one or more requests to one or more back-end systems deployed on behalf of the user.

Figure 17:
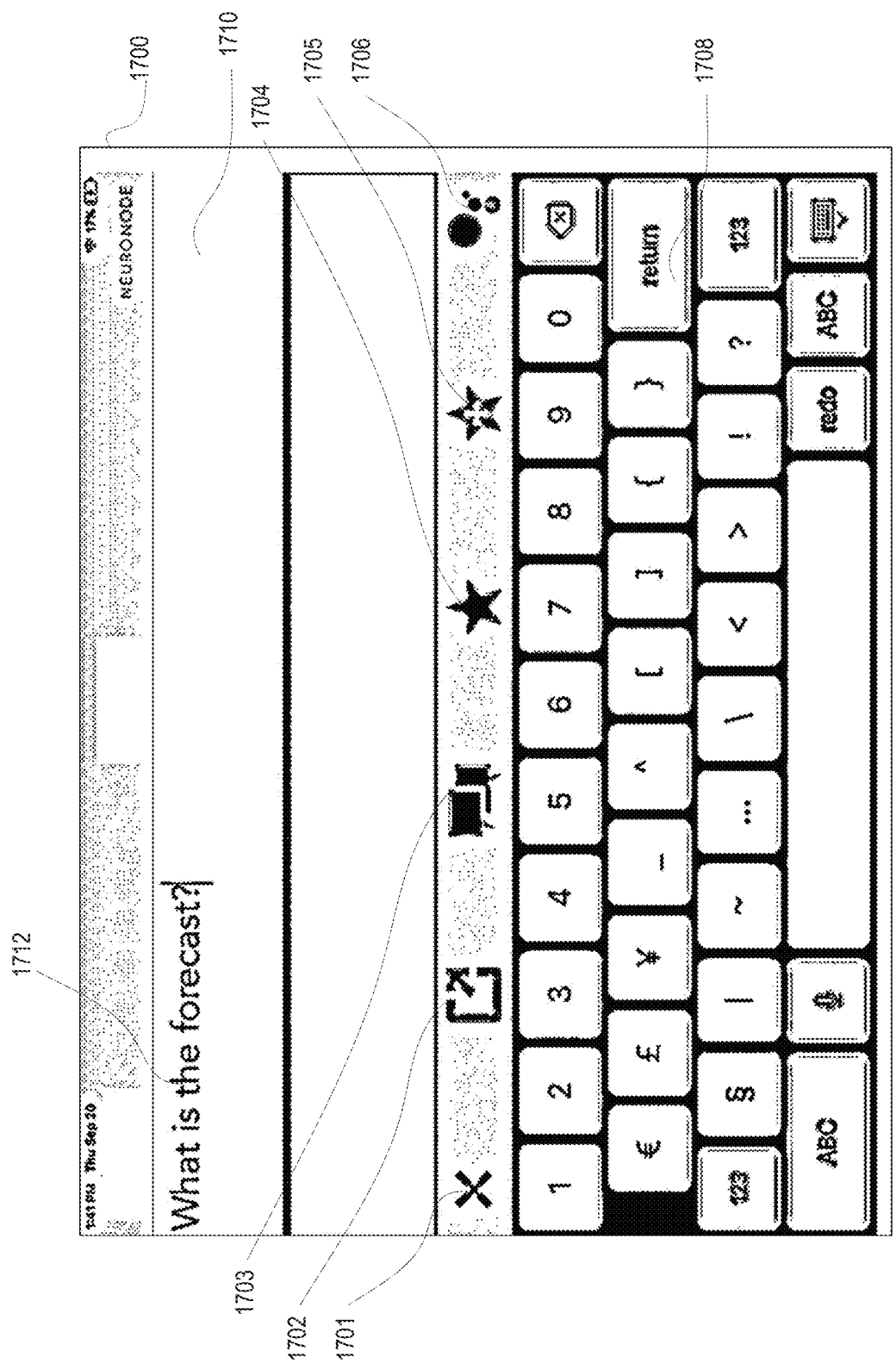
FIG. 17 is a screen depiction illustrating a context-sensitive main communication panel as an artificial intelligence (AI) interface to the electromyography (EMG) system, according to one or more embodiments.

FIG. 17 is a screen depiction illustrating a context-sensitive main communication panel 1700 as an artificial intelligence (AI) interface to the system 100 (FIG. 1). Main communication panel 1700 includes menu icons 1701-1706, an alphanumeric keypad 1708, and a query entry box 1710. Menu icons 1701-1706 can include delete icon 1701, send to sensor device system icon 1702, text-to-speech session icon 1703, access favorites icon 1704, save AI query to Favorites icon 1705, and send query directly to AI device icon 1706. The main communication panel enables a speech-impaired and/or mobility-impaired user to use an AI device such as GOOGLE ASSISTANT without speech and with a minimum of muscular control. User enters a query using assistive technology method of choice into query entry box 1710. User can activate save AI query to Favorites icon 1705 to save the query. User can activate AI device icon 1706 to send a created alphanumeric query 1712 in query entry box 1710 to send directly to the AI device.

Figure 18:
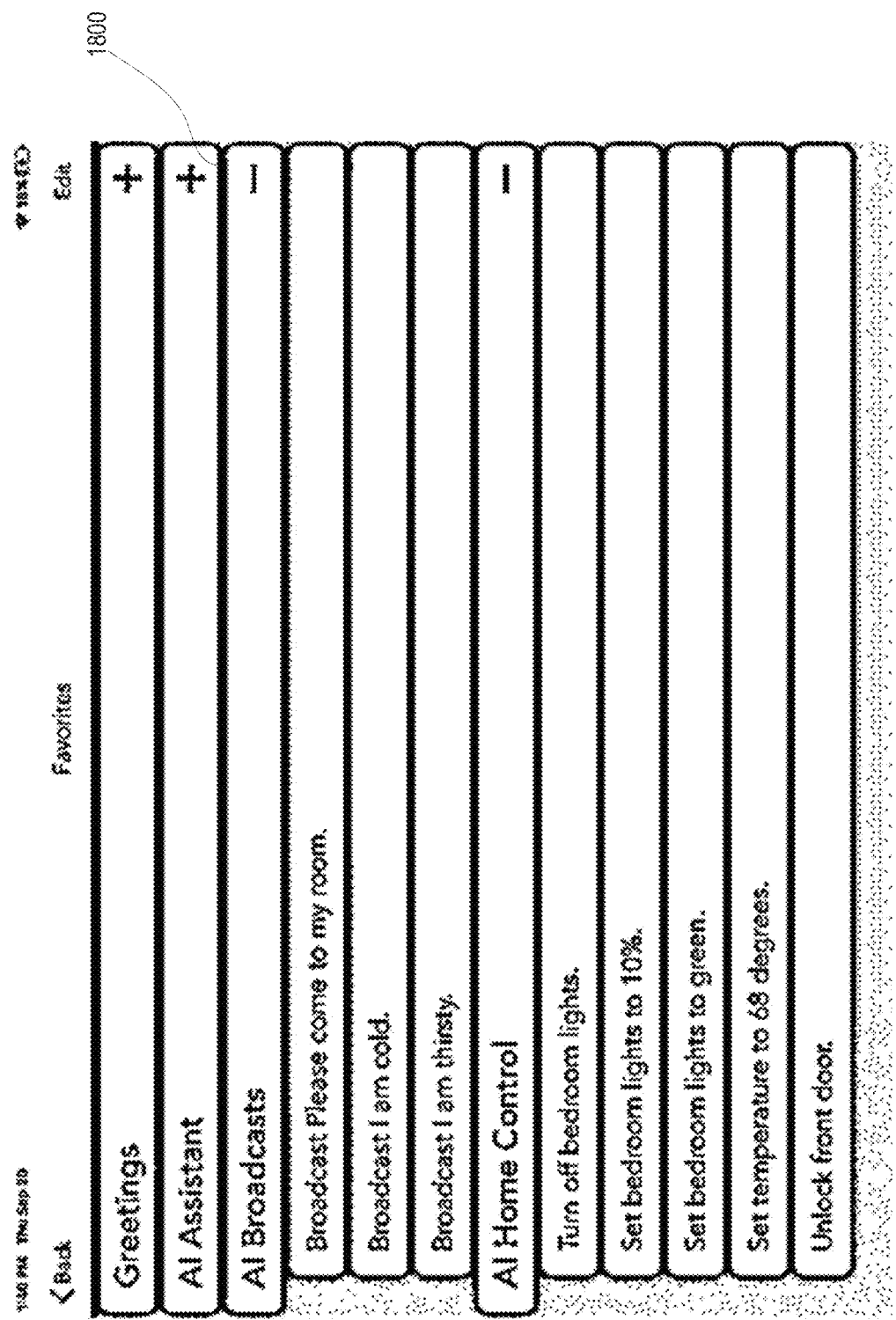
FIG. 18 is a screen depiction illustrating a favorites communication panel that is activated by user selection of favorites icon, according to one or more embodiments.

FIG. 18 is a favorites communication panel 1800 that is activated by user selection of access favorites icon 1704 (FIG. 17). In one or more embodiments, favorites communication panel 1800 can include automatically populated or user created control options such as an expandable list of greetings, an expandable list of selectable AI Assistants, an expanded list of AI broadcasts such as "Broadcast: Please come to my room"; "Broadcast: I am cold"; and "Broadcast: I am thirsty." An expanded list of AI Home Control affordances can include, for example, "Turn off bedroom lights", "Set bedroom lights to 10%; "Set bedroom lights to green"; "Set temperature to 68 degrees" and "Unlock front door". In one or more embodiments, one or more AI Assistants facilitate queries that are related to audio, textual, environmental, and home control responses/actions.

Figure 19:
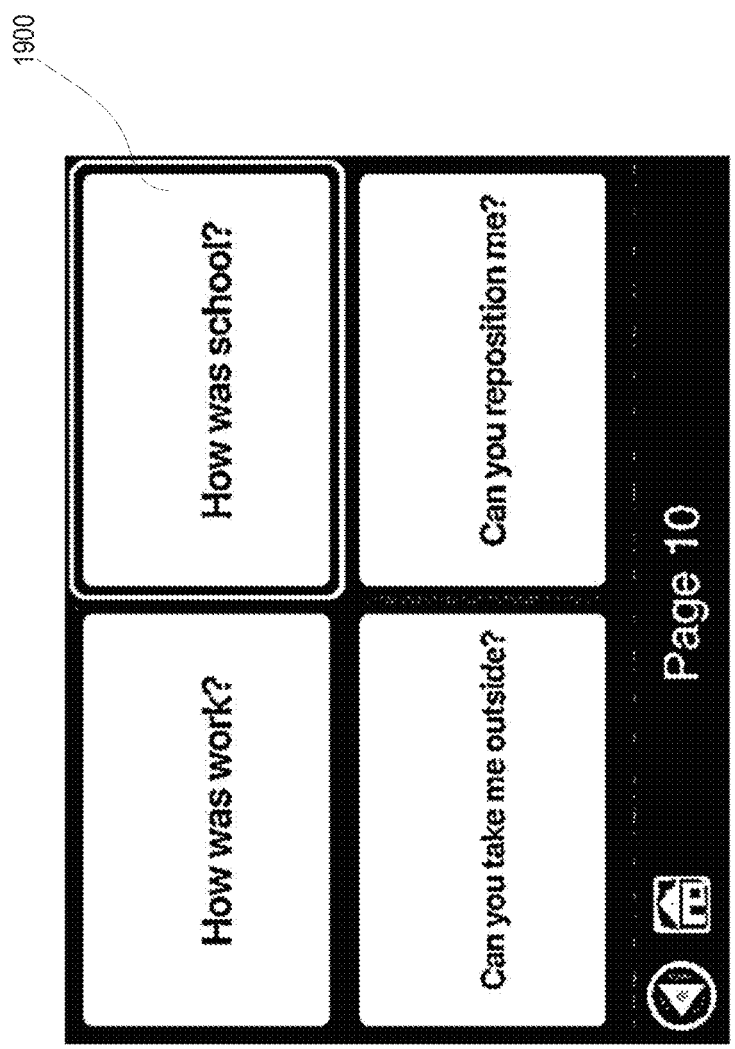
FIG. 19 is a screen depiction illustrating a context-driven user interface panel, according to one or more embodiments.

FIG. 19 is a screen depiction illustrating a representative four-button, context-driven user interface panel 1900. In a more advanced mode, the system gathers context about the user's environment and adjusts the communication options based on this context. Context for custom communication panels can be gathered through automatic queries to an AI device or through other sensor systems. Context could be time-of-day, persons in proximity of the user, temperature, day of the week, calendar entries, or any other input that would change what the user may want to say or do. A communication panel appears for the user on his computer (device) offering these customized choices. This could be in the form of a list or an array of buttons. A context generated button appears for "How was school", for example, if it is 4:00 pm on a weekday and the school-age daughter walks into the room. Context generated button "Can you take me outside?" appears, for example, if the caregiver is in the room in the afternoon and the current weather is sunny with no chance of rain.

In some examples, the sensor device system includes a prediction engine that predicts a subsequent query as a suggestion for the user, and provides the suggestion via the prediction box of the user interface layer. The prediction box may be a graphical user interface object that displays the suggestions provided by the prediction engine. It is noted that the prediction box is not necessarily displayed in the form of a square or rectangle, but can encompass any type of shape. The user may have executed one or two queries, and at this point in the process, the prediction engine may suggest a query or mapping as a suggestion to consider in the next query step via the prediction box, which is based on searches that other people have already done, searches that the same person has done, or certain mappings that other people have done in other contexts in order to not necessarily instruct the user on what to do, but rather as a reminder of a possibility to obtain more value out of the data of the data sources.

The prediction engine may check for previous data queries that map the query to predict a subsequent query. For example, the prediction engine may access the query history storing previously executed queries. The previously executed queries include the user's previous executed queries and other user's previous executed queries. Based on the query history, the prediction engine may determine whether any previous data queries match the query. If so, the prediction engine may determine one or more subsequent queries as suggestions for the user. For example, the previous data queries may indicate the next steps taken by the user or other users. As such, the prediction engine may predict one or more next steps for the user based on the previously executed queries of the query history, and provide these predictions in the prediction box of the user interface layer. As such, the sensor device system may lower the system's entry-barrier to the end-user by adapting to his/her previous usage, thereby allowing faster results to be provided by the business intelligence system. Furthermore, as indicated above, instead of restarting from scratch from every query, the sensor device system allows the user to build on each query, thereby building context.

In one or more embodiments, a server can be a key hub for communications with a variety of people, resources, assets, applications, and data sources that may have relevance to the user. As shown, the data sources may include a database of support network data (e.g., location, schedule, specialties, etc.) and a database of third-party app data and interfaces (e.g., social media, local search, navigation, etc.) and affinity programs. The data sources may also include data sources accessible over a network (e.g., local network, public network, private network, internet, IOT, etc.) such as a database of user data (e.g., medical, professional, public records, media, etc.), a database of local user data (e.g., police reports, trends, etc.) and a database of local data feeds (e.g., events, traffic, news, weather, camera feeds, etc.). Additional data sources may include user data sources including user data and analytics, including predictive analytics data, etc. The user data and analytics may include database(s) and engine(s), action/response engine, interface coordination database(s) and engine(s) assessment/prediction, learning database(s) and engine(s), (trending) context and behavior inference database(s) and engine(s), user profile, support network, schedule/calendar, devices/vehicles, user usage, hobbies, media posts, behavioral data, location/context profiles, historical location/context data, locations, places of interests (POIs), suppliers, user medical data, and personal data, as well as administration, security, and verification functions.

The server also serves as the primary analytical engine for developing and processing algorithms for profiling a user's behavior, tendencies, and probabilities for a wide range of possible situations, and for determining a variety of actions to, for, or on behalf of the user to improve the user's overall well-being. Such server functionality can be physically and/or logically configured in many forms. It can be centralized in one or more servers. It can be partitioned in a centralized manner such that functionality is split among different servers, such as one server being a communications network front-end for communicating with various users, devices, sensors, and other networks, while another server or set of servers does the analysis of the data. It can also be architected in distributed manner such that some or all of the functionality is performed on user and/or support network devices. It can be architected such that some or all of the functionality is done in the Cloud via various forms of cloud computing. Regardless of physical and/or logical distribution of functionality, it may be described as or referred to as a server unless otherwise indicated. The server serves as a monitoring, assessing, and controlling function of, for, and/or on behalf of the user. This could include providing a variety of alerts to various resources for the user.

Another aspect of exemplary embodiments of the present disclosure is the use of multiple location determination technologies or sources to determine locations of users and other persons/places/things. These technologies or sources include, but are not limited to, sensor networks (e.g., Internet of Things (IoT), etc.), GPS/Assisted GPS, cell tower identification, cell tower triangulation (TDOA, AFLT), beacons, Radio Frequency fingerprinting, Real-Time Location Services (RTLS), Wi-Fi based location systems, Radio Frequency Identification (RFID) based location systems and similar systems, drones, crowdsourcing, hybrids, simultaneous localization and mapping (SLAM), and/or combinations of these or other location determination systems. These location determination systems may be on, worn or carried by, used by, embedded in, or nearby the user.

Not all aspects of the present disclosure need to be centralized in the server. The user's local device(s) may also have functionality as disclosed herein, both for Peer-to-Peer, IoT, Mesh, ZigBee, LPWAN, Star, Client/Server, and/or machine-to-machine (M2M) networking, situations and in circumstances where the server or other parts of the present disclosure are not operating or accessible. An example of this functionality is in the device on/in/around the user detecting a high-risk situation and the user attempting to enter and drive a car in an underground garage (thereby preventing a GPS locate).

The user's device would automatically connect with the vehicle's transportation system (e.g., personal vehicle, friend or colleague's vehicle, transportation service like Uber, airlines, public transportations, etc.) to inform or provide an alert of a high-risk situation and proceeding to disable the car. Indeed, many, even all of the server's functions could conceivably be done in one or more of the user's device(s) or in other computing/data processing architectures such as cloud computing; a centralized server is a convenient/logical way to represent many of the present disclosure's functions, but not inherently necessary to its overall functionality.

Devices that can be associated with the user include but are not limited to portable devices such as mobile phones/smartphones, tablets, laptops, other portable or mobile devices, etc.; wearable devices and tags on or in clothing, jewelry, shoes, watches, etc.; mobile payment devices/wallets, etc.; embedded sensors, tags, chips or other electronics that can be implanted or ingested (e.g., ingestibles or implantables, etc.) in a user, augmented reality and heads-up displays (e.g. Google GLASS, etc.) and virtual reality-enabling systems. Fixed or mobile/fixed hybrid devices such as desktop computers and smart home connected devices that can also be associated with the identity and/or location user are also part of aspects of some exemplary embodiments of the present disclosure. For example, additional examples of smart home connected devices include a TV, refrigerator, and microwave. As more and more devices become smart, the smart device will have the ability to capture data that will help determine a person's location/context through onboard or connected data capture devices such as video, audio, and/or other sensors. Combined with the device's known location (or ability to determine the device's location), and the connectivity associated with communicating to and from these devices (also known as the Internet of Things or "IoT"), these devices/networks may provide new key sources of personal context information.

The IoT user-related sensors, devices, and networks may include smart vehicle, connected vehicle, driverless vehicle sensors, devices, and networks, such as cars, trucks, aircraft, trains, boats, RVs/rec vehicles, etc. The IoT user-related sensors, devices, and networks may include nearby human sensors, devices, and networks, such as nearby (to the user and/or support resource) person(s), devices, networks, and sensors—including proximity and/or access to person(s) et al. and contextual data on, in or near that person as well as groups of persons and activities. The IoT user-related sensors, devices, and networks may include smart office, work environment sensors, devices, and networks, such as temperature, entry/exit, security, work-activity related, stress (mental or physical)-related, productivity-related, co-worker, office/work area-related. The IoT user-related sensors, devices, and networks may include smart city sensors, devices, and networks, such as public spaces and infrastructure with associated sensors, devices, and/or networks (e.g., that user/support resources, etc.) including parking, meters, advertising, police, first responders, etc.) that are in proximity of, connected to, and/or associated with that provide location/contextual information about user, support resources, and activities to help detect, anticipate, and manage situations. In various embodiments, a learning engine is provided that utilizes artificial intelligence and other learning algorithms and methods to learn from a user's behavior and to refine various systems, algorithms, and processes, such as a user's likelihood of relapse, effectiveness of actions taken, and types and frequency of data collected.

Numerous communication methods to/from the user and other resources are used in various embodiments of the present disclosure. These can include (but are not limited to) text/SMS/MMS, voice calls, email, social media, video, peer-to-peer and machine-to-machine communications, instant messaging, voice messaging/mail, 3rd party applications, heads-up displays (such as Google GLASS), hologram projections, and other applicable voice and data methods and mediums.

As discussed before, interfaces with third party applications may be provided in various embodiments. In various embodiments, a wide variety of interfaces may be provided to interact with the user, support network, and third parties. Such interfaces include but are not limited to: Direct manipulation interface (e.g. augmented/virtual reality), Graphical user interfaces, Web-based user interfaces, Touchscreens, Command line interfaces (e.g., command string input), Touch user interfaces, Hardware interfaces (e.g. knobs, buttons), Attentive user interfaces (e.g., that determine when to interrupt a person), Batch interfaces, Conversational interfaces, Conversational interface agents (e.g. animated person, robot, dancing paper clip), Crossing-based interfaces (e.g., crossing boundaries versus pointing), Gesture interfaces (e.g. hand gestures, etc.), Holographic user interfaces, Intelligent user interfaces (e.g., human to machine and vice versa), Motion tracking interfaces, Multi-screen interfaces, Non-command user interfaces (e.g., infer user attention), Object-oriented user interfaces (e.g., to manipulate simulated objects), Reflexive user interfaces (e.g., achieves system changes), Search interface, Tangible user interfaces (e.g., touch), Task-focused interfaces (e.g., focused on tasks, not files), Text-based user interfaces, Voice user interfaces, Natural-language interfaces. Zero-input (e.g., sensor-based) interfaces, Zooming (e.g., varying-levels of scale) user interfaces. Various mechanisms may be provided for selecting/modifying the interfaces based on the user's context. In various embodiments, robots and robotics may be used. In various embodiments, scheduling and to-do lists of the user are utilized, as well as the user's support network.

In some embodiments, the two-way communication system may be integrated with third-party providers, such as Amazon ALEXA and Apple SIRI, such that a request from other mobile devices may be received.

In one or more embodiments, the present disclosure relates to a user monitor with a help screen system to monitor a user's health status. A user monitor, such as a pulse oximeter, is provided that displays physiological information and includes a user-input device that allows a user to access an input screen system. The system may be integral to the user monitor or in a separate device. In operation, the healthcare provider may access this system to seek answers for questions about the user. In one or more embodiments, the present techniques also apply to providing information regarding system or user warnings or alarms, user monitoring data or reports, and so on.

In one or more embodiments, a monitoring system (e.g., pulse oximeter) may include a user monitor configured to display physiological information related to a user. The monitoring system may include a user input device in communication with the monitor. The user input device may cause the monitor to display, for example, a report of user data, a report of performance of the user monitor, a warning, an alarm, a help message, or any combination thereof, and so on. The information displayed may be context sensitive to the current status of the user monitor or to a current point in a menu tree of a control scheme of the user monitor, for example.

The approaches described herein provide users with a way to view and organize content by providing a classic hierarchical visualization structure in various computing environments, for example desktop and mobile environments. In some approaches, the user may rearrange the navigation hierarchy based on the provided content, further enhancing the context-sensitive nature of the navigation.

In one or more embodiments, a display apparatus is provided having an interface with an input and an output and a processor coupled to the interface. The output is configured to display a first panel at a variable panel display portion of a display. The first panel includes one or more first selectable nodes associated with a control system and information associated with the control system.

Upon the input receiving a selection of one or more of the selectable nodes, the processor is configured to access a server and present a panel associated with the selected node at the variable panel display portion. This panel includes one or more second selectable nodes and information associated with the selected node. The processor is further configured to adjust the size of the variable panel display portion displayed at the output to accommodate a number of panels and to allow navigation between the panels that is independent of information displayed at a working portion of the display. In some examples, the processor is further configured to present the first panel and the panel associated with the selected node adjacent to each other on the variable display portion via the output.

In one or more embodiments, the display apparatus may further include any number of additional panels which are configured to display the selected node and information associated therewith. The processor may be configured to determine the size of the variable panel display portion corresponding to a maximum number of displayable panels in the variable panel display portion and compare the determined size to the number of presented panels and thereafter display the maximum number of displayable panels in the variable panel display portion.

Approaches are provided that allow for efficiently visualizing hierarchical data structures across a number of different devices having displays. In one aspect, the approaches allow for the resizing of the hierarchical structure to accommodate displays having a number of different configurations. The hierarchical structure may also be navigated while a working portion of the display maintains the content contained therein via a graphical user interface (or in some instances, an audio cue). The hierarchical structure may provide an indication for the current visible panels and may be navigable to allow the display of alternative panels. The hierarchical structure may also include contextual information (such as, for example, a folder name, title, or other common identifier) beyond identification information.

The principles of user interface and user signaling disclosed in this document are applicable for use with information from any sensors that can provide information related to motion and/or position of body parts and/or physiological states or any other objects that can provide an indication of motion of users' body parts. Further, this motion/position information can be derived using a variety of sensors including but not restricted to accelerometers, gyroscopes, image sensors, wave field sensors, radars, electric field sensors, acoustic sensors, ultrasonic sensors, EMG sensors, OCG sensors, resistive sensors, as well as others. Further, some user actions may not be detectable visibly from outside but be detectable by other sensors. For example, users can change their meditation or attention level consciously. Alternatively, they can also intentionally change the level of their Alpha, Beta, Theta or Delta brain waves. These levels and/or level changes can be measured by brainwave, EEG, or other suitable sensors.

The term Primary Control Expression (PCE) is used to refer to user actions that can be used to signify user intention. This application also introduces the concept of Primary Control Motion (PCM) which is analogous to PCE and therefore can be used to signify user intention. The concept of Primary Control Motion (PCM) is similar to the concept of PCE. While a PCE is facial expression, a PCM can be a designated bodily motion or pose/position/orientation (of a designated set of one or more body parts). PCM can include designated combination(s) or sequence(s) of bodily motions that can include motions of the entire head, eyeballs, hands, fingers, arms, shoulders, torso, legs, feet, toes, etc. Note that motions of the entire head such as head nods, head tilts, side to side heads motions or head rolls, etc. are considered to be head/body motions and not facial expressions. Motion of the eyeballs is also considered to be body motion and not a facial expression. However, motion of eyelids such as opening/closing of eyes, blinking, and winking are considered to be facial expressions. Similarly, motion of eyebrows such as eyebrow raises, furrowing of eyebrows and other eyebrow motions are considered to be facial expressions. Just as PCEs are accorded special significance, the PCMs are also accorded special significance when communicating with electronic devices. A PCM or a PCE can be used as an enabler, trigger, modifier, or a specific command, while communicating with an Electronic Device. A PCE and PCM can also comprise actions such as entering meditative/attentive states, tensing internal muscles, relaxing, deep breathing, etc., as these actions can be used to signify user intention and thereby can be used in heuristics explained just as any other body actions. PCEs and PCMs together can be called as User Intention actions.

Neurosky, Inc. (http://neurosky.com) is one vendor that provides hardware and software to measure brainwaves and detect changes in meditation and attention level of the user. Some embodiments then can use brainwave sensors that provide readings of either meditation level or attention level or any other biometric quantity that the user can consciously have an effect on and/or can cause a change in magnitude, frequency, direction, or other measurable attribute. For example, instead of performing a facial expression, the user can increase or decrease meditation or attention level, which then can be treated as "PCE" information and used in the heuristics/principles as described in this and above referenced documents. Brainwave sensors, EEG and other biometric sensors can be used as PCE sensors and used to control electronic devices. Similarly, certain conscious bodily muscular action may be hard to detect visibly, however, may be easily detectable by EMG sensors and other sensors. For example, clenching of the teeth or different parts of lower jaw, tensing throat, other parts of face or head, scalp, various auricularis muscles, parts of torso, shoulders, arms, legs, feet, fingers, toes, thighs, calves, or various sphincters of the body may not be externally visible but could be detected by EMG or other sensors. Again, these sensors can be used as PCE/PCM sensors and all the heuristics defined for PCE/PCM sensors can be used with these sensors as well.

All of the above disclosed concepts/principles/heuristics/techniques/algorithms, etc. can be used in variety of different fields and applications. Some of the examples are Augmentative and alternative communication (AAC), Assistive Technology, Speech Generation Devices, Augmented/Mixed/Virtual Reality, Desktop & Mobile Computing, Gaming, Industrial Control, Healthcare, Defense, Aviation, Transportation, Manufacturing, Product Lifecycle Management, Aerospace, & others. All the concepts/principles/heuristics/techniques/algorithms, etc. disclosed in this document can also be used with all the apparatuses/devices disclosed in the referenced documents, as well as with devices including but not limited to head worn devices such as smart glasses, smart helmets, virtual/mixed/augmented reality devices, head worn controllers, in-ear controllers, headphones, ear plugs, head bands and neck bands. Further, they are also applicable to other body worn devices such as arm/wrist bands, devices utilizing wearable sensors and smart watches, devices embedded inside the user's body, as well as devices that are not physically worn in/on user's body such as smart phones, tablets, desktop computers, smart TVs, set top devices, and others that may possibly utilize image, radar, sonar, sound/voice, ultrasonic, laser and other sensors to sense any or all body action and/or physiological states.

In one or more embodiments, a method includes monitoring a biosignal from a set of electrodes placed on a user. The method includes automatically adjusting a selected one of: (i) a resting threshold; and (ii) a switch threshold that is greater than the resting threshold based at least in part on a trend of the biosignal. The method includes determining whether an amplitude of the biosignal is less than the resting threshold. The method includes, in response to determining that the amplitude is less than the resting threshold, determining whether an amplitude of the biosignal subsequently is equal to or greater than the switch threshold. In response to determining that the biosignal is greater than the switch threshold, the method includes triggering a device with a switch signal.

In one or more embodiments, the method further includes monitoring a movement sensor that is attached to the user, wherein triggering the device with the switch signal is further in response to determining that a movement signal sensed by the movement sensor concurrently with the biosignal is less than a spasm threshold. In one or more embodiments, the method further includes determining, by the device, whether a contextual trigger condition exists. In response to determining that the contextual trigger condition exists, the method includes presenting to the user an application that is associated with the contextual trigger condition. The method includes controlling the application with the switch signal. In a particular embodiment, the contextual trigger condition is a chronological event. In a particular embodiment, the contextual trigger condition comprises an ambient environmental event and the application comprises an environmental control interface. In a particular embodiment, the contextual trigger condition is a detected third-party proximity event and the application comprises a human communication application.

In one or more embodiments, a system includes a set of bioelectrical electrodes attached to a user. The system includes a user interface device. The system includes a processor in communication with the set of bioelectrical sensors and the user interface device. The system projects functionality to monitor a biosignal from the set of bioelectrical electrodes. The functionality includes automatically adjusting a selected one of: (i) a resting threshold; and (ii) a switch threshold that is greater than the resting threshold based at least in part on a trend of the biosignal. The functionality includes determining whether an amplitude of the biosignal is less than the resting threshold. In response to determining that the amplitude is less than the resting threshold, the functionality includes determining whether an amplitude of the biosignal subsequently is equal to or greater than the switch threshold. In response to determining that the biosignal is greater than the switch threshold, the functionality includes triggering the user interface device with a switch signal.

In one or more embodiments, the system further includes monitoring an activity sensor that is attached to the user, wherein triggering the device with the switch signal is further in response to determining that a movement signal sensed by the movement sensor concurrently with the biosignal is less than a spasm threshold. In one or more embodiments, the system further includes determining, by the device, whether a contextual trigger condition exists. In response to determining that the contextual trigger condition exists, the system includes presenting to the user an application that is associated with the contextual trigger condition. The system includes controlling the application with the switch signal. In a particular embodiment, the contextual trigger condition comprises a chronological event. In a particular embodiment, the contextual trigger condition comprises an ambient environmental event and the application comprises an environmental control interface. In a particular embodiment, the contextual trigger condition comprises a detected third-party proximity event and the application comprises a human communication application.

The methods, human interface devices, and computer program products of the present invention provide for an improved multilevel switch from each bioelectrical sensor while incorporating the ability to ignore involuntary spasms. In one or more embodiments, a biosignal is received from a bioelectrical sensor by an electronic processor of a first electrode switch device. In response to determining whether the amplitude of the biosignal has changed from less than a first switch range to (a) greater than the first switch range and (b) less than the second switch range, the electrode switch device communicates a first switch signal to control the human interface system. In response to determining that the amplitude of the biosignal has changed from less than the second switch range to greater than the second switch range, the electrode switch device performs one of: (i) ignoring the instance and (ii) communicating a second switch signal to control the human interface system.

Figure 20:
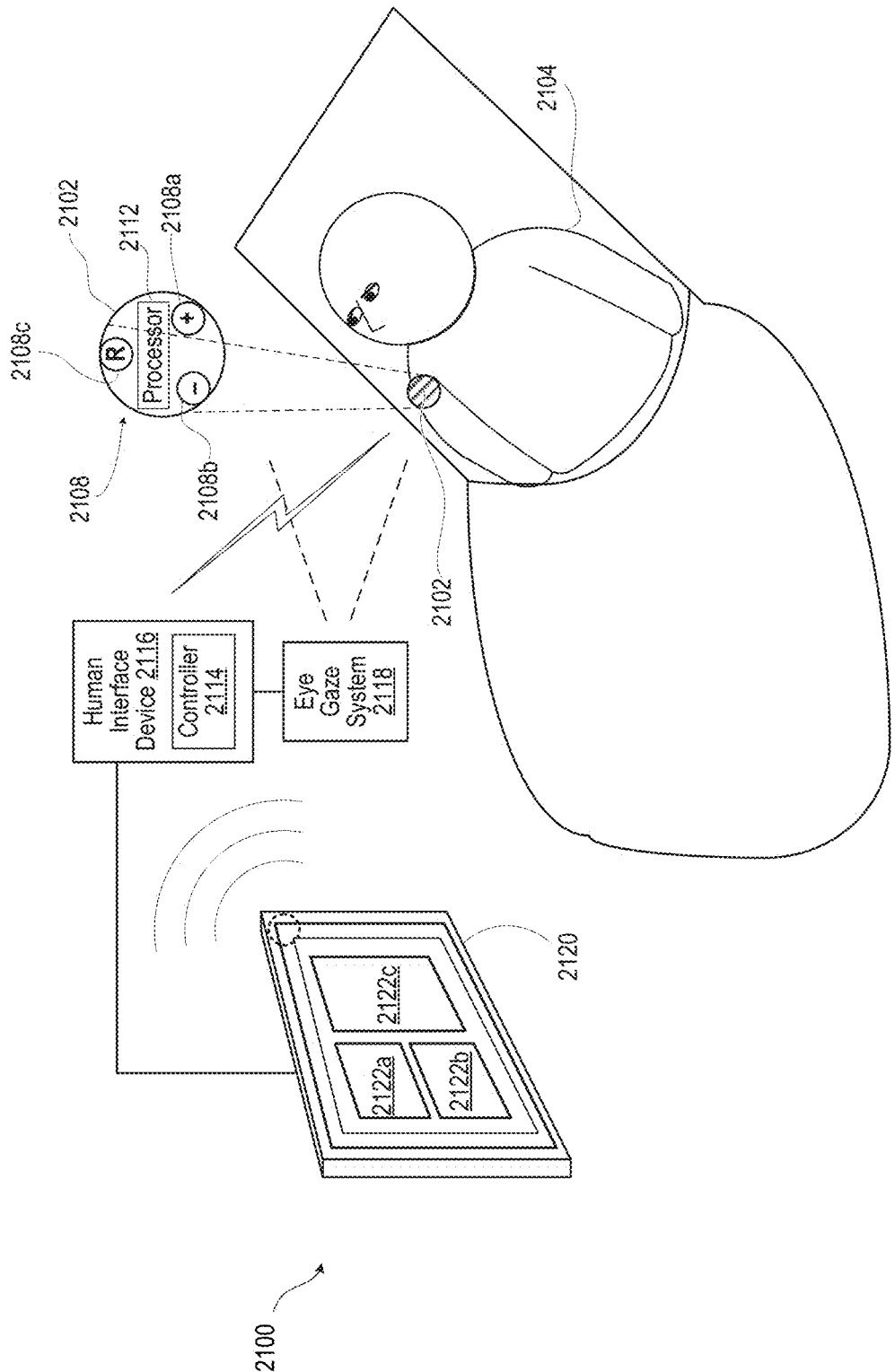
FIG. 20 is a three-dimensional diagram of a human interface system that is configurable to provide multiple level signal detection and/or multiple device signal detection to control an array of devices, according to one or more embodiments.

FIG. 20 is a three-dimensional diagram of a human interface system 2100 that is configurable to provide multiple level signal detection and/or multiple device signal detection to control an array of devices. In one or more embodiments, an electrode switch (biosignal sensor) device 2102 is positioned on a user 2104 and configured for providing the improved multilevel functionality by detecting a biosignal such as electromyography (EMG) or other response that can be volitionally created. In one or more embodiments, the biosignal sensor device 2102 provides all of the human interface device (HID) 2116 functionality of the human interface system 2100. In one or more embodiments, human interface system 2100 includes an HID module that receives switch signals from the biosignal sensor device 2102 and other switches.

The biosignal sensor device 2102 each include a set of bioelectrical electrodes 2108 such as a first active ("+") electrode 2108a, a second active ("−") electrode 2108b and a reference ("R") electrode 2108c that are placed on the user 2104. The electrodes 2108 can be attached to a back surface of the biosignal sensor device 2102. In other embodiments, each electrode 2108a-2108c is individually adhered to the user 2104 and communicatively coupled by wires or low power wireless links. The biosignal sensor device 2102 supports dynamic and static adjustments to switching threshold that accommodate specific requirements of the user 2104 as compared to other individuals or as compared to changing characteristics of the user 2104.

In one or more embodiments, each biosignal sensor device 2102 is a mesh accessible surface electromyography controller, wearable by a user 2104, for capturing electromyography and electrocardiography data from certain muscles, including the heart. Biosignal sensor device 2102 has the ability to store the data onboard for extended periods, and to send the data by Bluetooth or Wi-Fi or other wireless means to a receiver. A processor 2112 in the biosignal sensor device 2102 can analyze the data onboard or send data to a controller 2114 of human interface device (HID) 2116 for analysis by code or by a person. When analyzing the data onboard, the biosignal sensor device 2102 can assess certain intentions of the user 2104. The biosignal sensor device 2102 monitors parameters and sensor systems and incorporates algorithms that continually adapt to abilities of the user 2104. The HID 2116 can interface to other devices such as an eye gaze system 2118 and a display device 2120. The display device 2120 can be intended to present content to the user 2104. The display device 2120 can be a user interface to a system that provides communication services, environmental control services, security system services, etc. In an example, the eye gaze system 2118 can detect that the user 2104 is gazing toward a particular display element 2122a-2122c and the HID 2116 can detect a selection by the user 2104.

In one aspect, the human interface system 2100 can provide enhanced functionality of each biosignaling device by incorporating an upper limit ignore switch. In another aspect, the human interface system 2100 can provide multiple switching functionality from each biosignaling device by incorporating multiple level signal detection. The biosignal sensor device 2102 is configured for providing the improved multilevel functionality over the prior biosignal sensor devices described in greater detail in commonly-owned United States Patent Application Number US2019/0142349A1 to James E. Schorey, et al., published May 26, 2019, and entitled "ELECTROMYOGRAPHY (EMG) ASSISTIVE COMMUNICATIONS DEVICE WITH CONTEXT-SENSITIVE USER INTERFACE", the disclosure of which is hereby incorporated by reference in its entirety. The biosignal sensor devices 2102 enable automatically customizable and adaptable detection of volitional user bioelectrical inputs.

Figure 21:
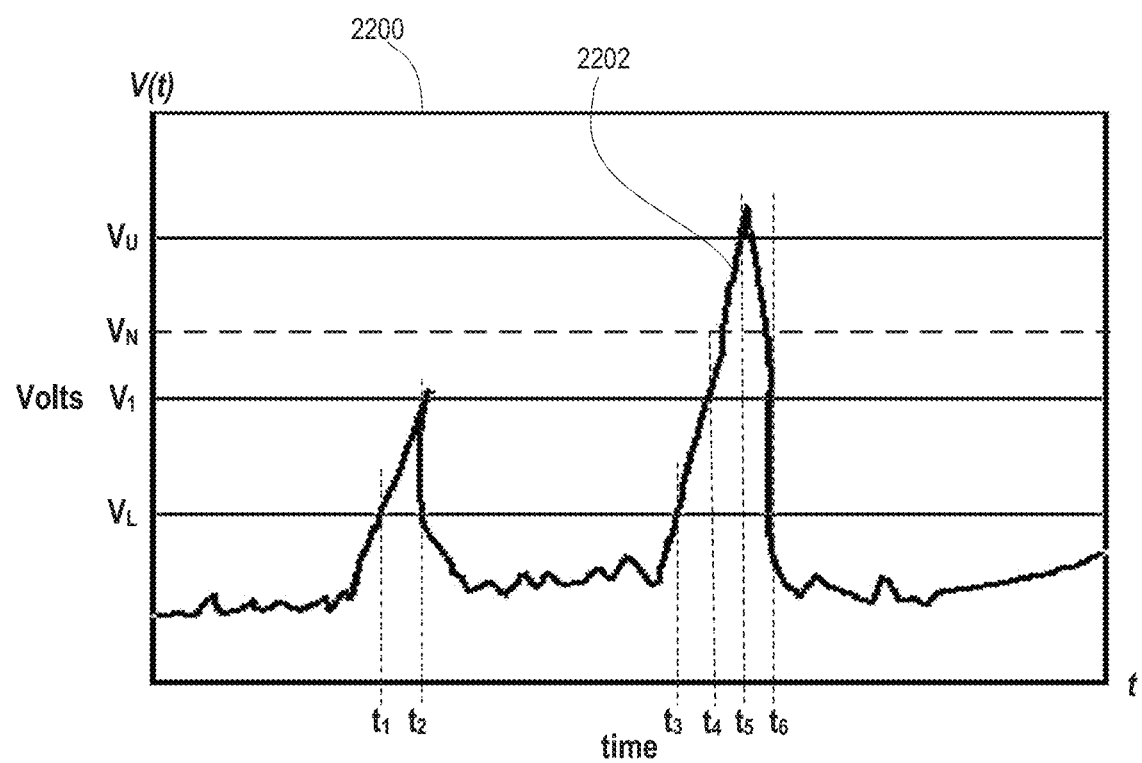
FIG. 21 depicts a graphical plot of a biosignal that is compared to multiple voltage levels for implementing the upper limit ignore switch and/or the multiple level signal detection, according to one or more embodiments.

FIG. 21 depicts a graphical plot 2200 of a biosignal 2202 that is compared by controller 2114 (FIG. 20) to multiple voltage levels ($V_L$, $V_1$, ... $V_N$, $V_U$) for implementing the upper limit ignore switch and/or the multiple level signal detection. $V_L$ refers to a lower voltage level threshold. $V_1$ refers to a first activating voltage level threshold. $V_N$ refers to one or more other activating voltage level thresholds that can be optionally implemented for additional switch activations for users able to create granularly and volitionally a biosignal. $V_U$ refers to an upper (ignore) voltage level threshold that is exceeded in some users by an involuntary spasm or other occurrence.

In an example scenario, before time $t_1$, biosignal 2202 is below the level $V_L$. To provide hysteresis, a switch activation in one or embodiments requires transitioning within a predetermined amount of time from below the lower voltage level threshold $V_L$ to at least above the first activating voltage level threshold $V_1$, which occurs at time $t_2$. Then biosignal 2202 resets by dropping below the lower voltage level threshold $V_L$. At time $t_3$, the biosignal 2202 again goes above the lower voltage level threshold $V_L$ followed at time $t_4$ by going above the first activating voltage level threshold $V_1$ and continuing on at time is by immediately going above the upper (ignore) voltage level threshold $V_U$. Then the biosignal 2202 drops below the lower voltage level threshold $V_L$. At time $t_6$. In an example, a biosignal amplitude of that strength is associated with an involuntary muscle spasm and is thus ignored as not a volitional biosignal response. In one or more embodiments, the biosignal 2202 goes above a particular signal activating threshold $V_N$ without triggering the upper (ignore) voltage level threshold $V_U$. The same biosignal 2202 is thus capable of triggering more than one switch signal based on different amplitude levels.

Figure 22:
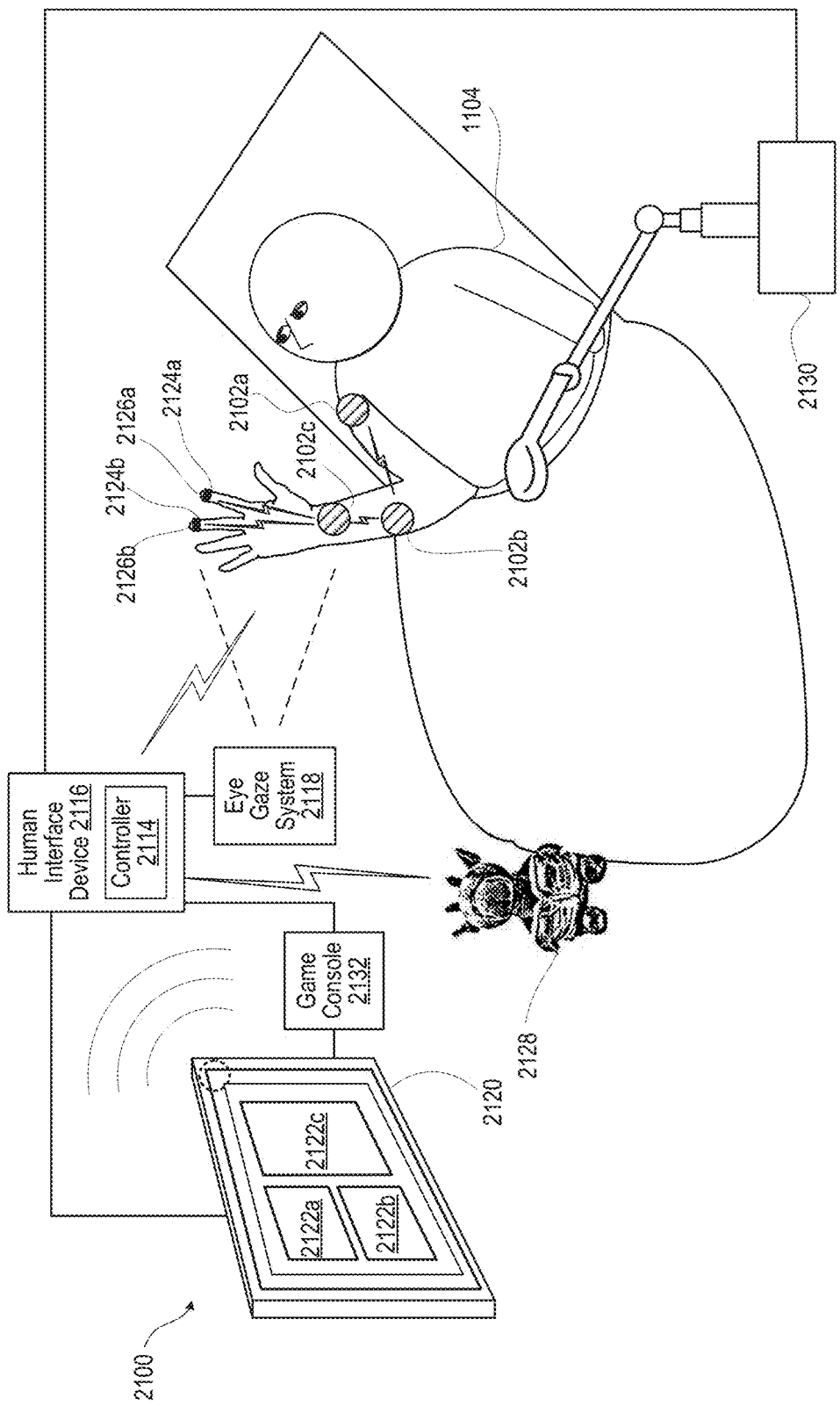
FIG. 22 is a three-dimensional diagram of the human interface system that is alternatively or additionally configured to use one or more different configurations of user switches to control one or more output devices, according to one or more embodiments.

FIG. 22 is a three-dimensional diagram of the human interface system 2100 that is alternatively or additionally configured with the HID 2116 to use one or more different configurations of user switches to control one or more output devices. In one aspect, the human interface system 2100 can provide multiple switching functionality using a combination of biosignal sensor devices 2102a-2102c and (ii) spatial sensors 2124a-2124b. The number, type and positioning of sensors are customized to capabilities of the user 2104 and number of switching inputs needed. In an example, biosignal sensor devices 2102a-2102c are respectively adhered to a right shoulder, right forearm, and right wrist of the user 2104. Spatial sensors 2124a-2124b are rings placed on respective fingertips of a right index finger 2126a and right middle finger 2126b. biosignal sensor device 2102a is wirelessly connected to biosignal sensor device 2102b, which in turn is wirelessly connected to biosignal sensor device 2102c. Spatial sensors 2124a-2124b are wirelessly connected to biosignal sensor device 2102c, which in turn is connected on behalf of the other sensors to HID 2116. Certain processing of movement data can be performed by spatial sensors 2124a-2124b and certain processing of biosignals can be performed by the biosignal sensor devices 2102a-2102c. Controller 2114 of HID 2116 can perform some or all of the processing of switch logic or code for the human interface system 2100. In response to multiple switching commands detected by the controller 2114, the human interface system 2100 can additionally control output devices such as an electronic toy 2128, a feeding robot 2130, and a game console 2132.

Figure 23A:
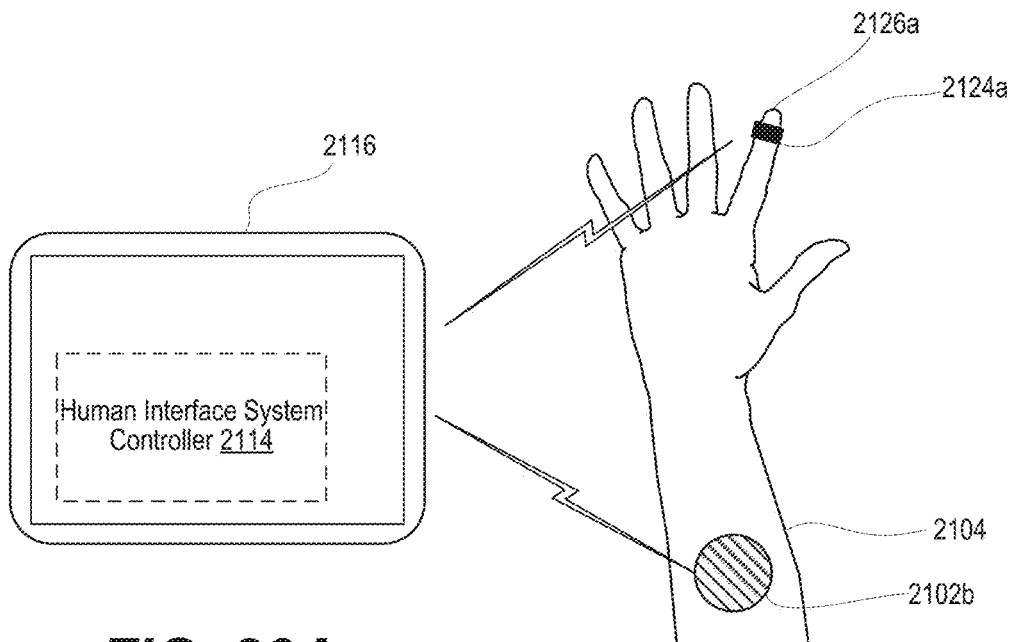
FIG. 23A depicts the human interface system that includes a controller wirelessly connected to a single spatial sensor and an electromyography (EMG) device, according to one or more embodiments.

FIG. 23A depicts the controller 2114 of human interface system 2100 (FIG. 22) wirelessly connected to a single spatial sensor 2124a on the right index finger 2126a and wirelessly connected to a single biosignal sensor device 2102b on the right forearm of the user 2104. In one or more embodiments, the controller 2114 is communicatively connected by wires to one or both of the spatial sensor 2124a and the biosignal sensor device 2102b.

Figure 23B:
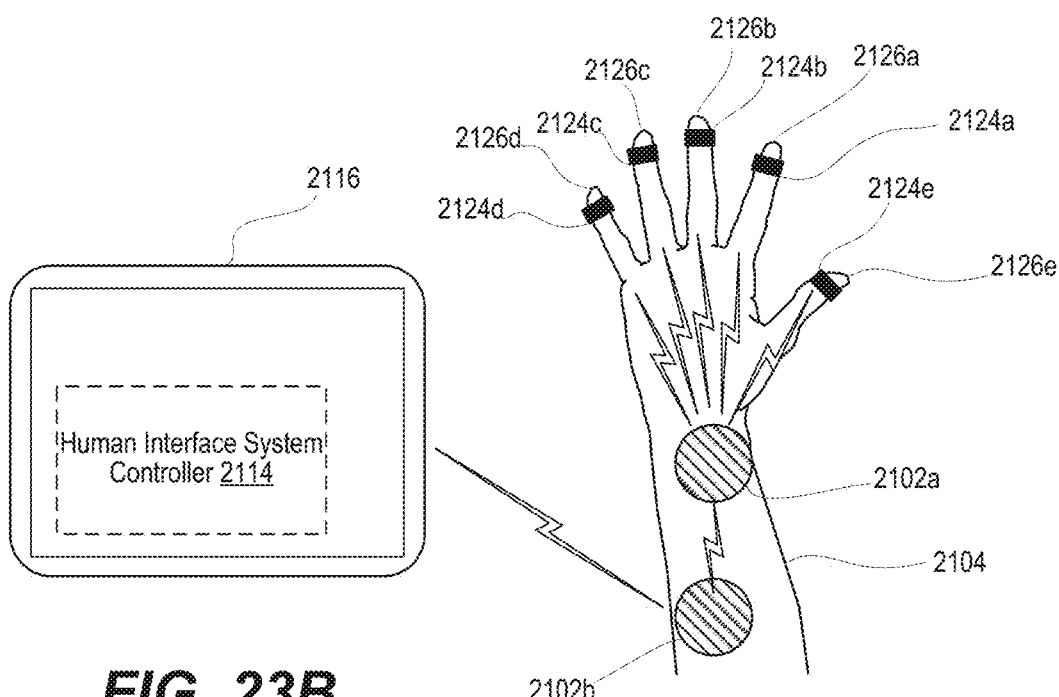
FIG. 23B depicts the human interface system that includes a controller wirelessly connected to a combination of spatial sensors and biosignal sensor devices, according to one or more embodiments.

FIG. 23B depicts the controller 2114 of human interface system 2100 (FIG. 22) wirelessly connected to a single spatial sensor 2124a on the right index finger 2126a and wirelessly connected to a single biosignal sensor device 2102b on the right forearm of the user 2104, which in turn is wirelessly connected to biosignal sensor device 2102a on the right wrist, which in turn is wirelessly connected to the spatial sensors 2124a-2124e respectively on the fingertips of the index, middle, ring, pinky, and thumb fingers 2126a-2126e. The connectivity configurations, numbers, types, and positions of the spatial sensors 2124a-2124e and biosignal sensor devices 2102a-2102b are not all inclusive with many possibilities being supportable by the human interface system 2100.

Figure 24:
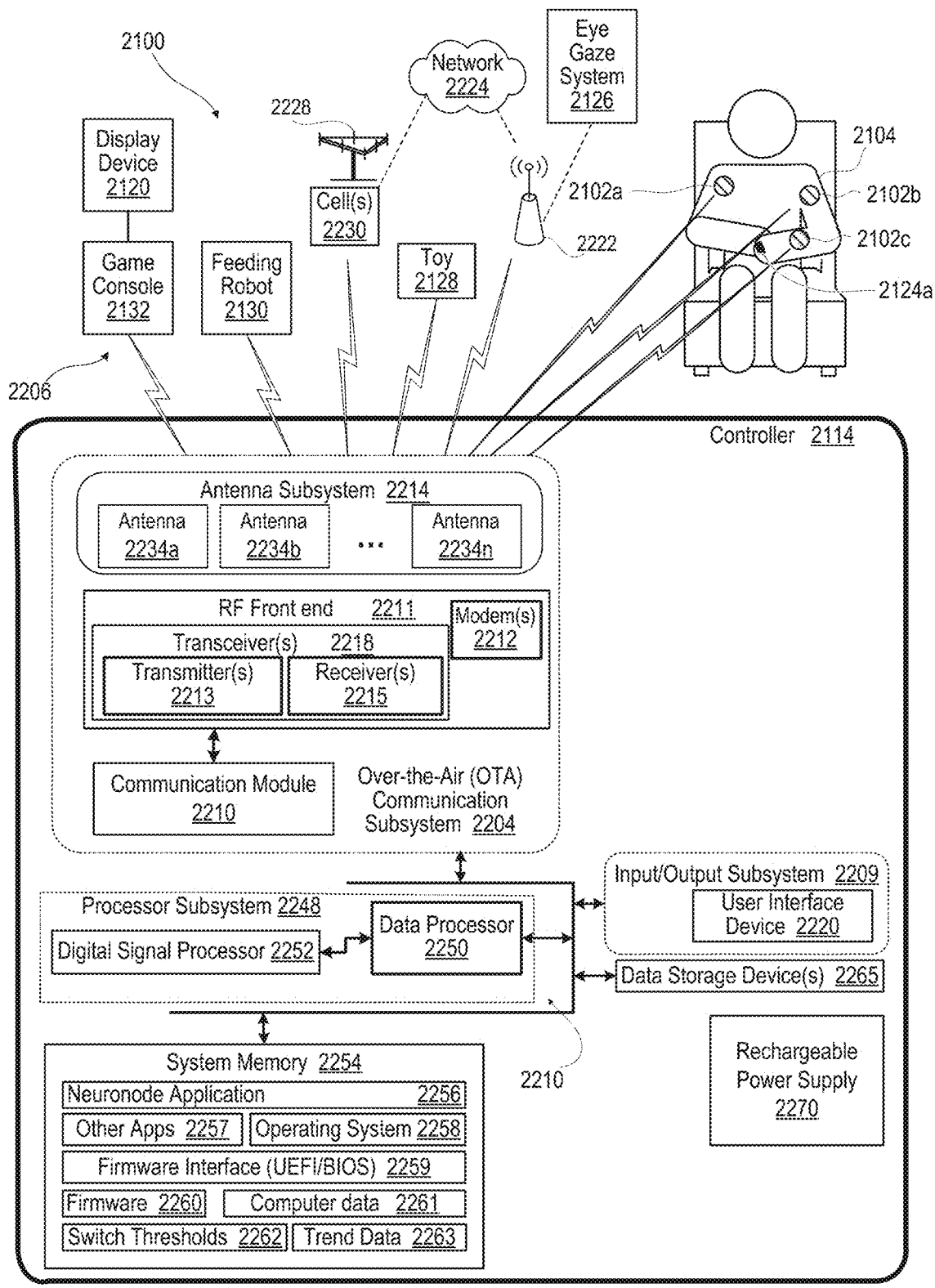
FIG. 24 is a functional block diagram of the human interface system that performs the functionality of multiple level and/or multiple device switching, according to one or more embodiments.

FIG. 24 is a functional block diagram of the human interface system 2100 having the controller 2114 of the human interface device 2116 (FIG. 22) that performs the functionality of multiple level and/or multiple device switching. The controller 2114 includes over-the-air (OTA) communication subsystem 2204 that communicates with various output devices described herein and others. Controller 2114 provides computing and data storage functionality in support of OTA communication with human interface device 2116 (FIG. 22). Controller includes data storage subsystem 2265 and input/output (I/O) subsystem 2209 that are communicatively coupled to each other via a system interlink 2210.

OTA communication subsystem 2204 includes communication module 2210 that operates in baseband to encode data for transmission and decodes received data, according to a predetermined communication protocol. OTA communication subsystem 2204 includes radio frequency (RF) front end 2211 having one or more modem(s) 2212. Modem(s) 2212 modulate baseband encoded data from communication module 2210 onto a carrier signal to provide a transmit signal that is amplified by transmitter(s) 2213. Modem(s) 2212 demodulates the received signal from node 2222 detected by antenna subsystem 2214. The received signal is amplified and filtered by receiver(s) 2215, which demodulate received encoded data from a received carrier signal.

Controller 2114 controls the OTA communication subsystem 2204, user interface device 2220, and other functions and/or operations. These functions and/or operations include, but are not limited to including, application data processing and signal processing. Controller 2114 may use hardware component equivalents for application data processing and signal processing. For example, controller 2114 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 2210) are illustrated in FIG. 24, it is to be understood that more, fewer, or different interconnections may be present in other embodiments.

In one or more embodiments, controller 2214, via OTA communication subsystem 2204, performs multiple types of OTA communication with external OTA communication system 2206. OTA communication subsystem 2204 can communicate with one or more personal access network (PAN) devices within external OTA communication system 2206, such as smart watch that is reached via Bluetooth connection. In one or more embodiments, OTA communication subsystem 2204 communicates with one or more locally networked devices via a wireless local area network (WLAN) link provided by WLAN node 2222. WLAN node 2222 is in turn connected to wide area network 2224, such as the Internet. In one or more embodiments, OTA communication subsystem 2204 communicates with radio access network (RAN) 2228 having respective base stations (BSs) or cells 2230. RANs 2228 are a part of a wireless wide area network (WWAN) that is connected to wide area network 2224 and provides data services. In one or more embodiments, antenna subsystem 2214 includes multiple antenna elements 2234*a-n* that are individually tuned to selected RF bands to support different RF communication bands and protocols. Antenna elements 2234*a-n* can be used in combination for multiple input multiple output (MIMO) operation for beam steering and spatial diversity.

Controller 2114 includes processor subsystem 2248, which executes program code to provide functionality of the human interface system 2100. Processor subsystem 2248 includes one or more central processing units (CPUs) ("data processor") 2250. In one or more embodiments, processing subsystem 2248 includes a digital signal processor (DSP) 2252. Controller 2114 includes system memory 2254, which contains actively used program code and data. In one or more embodiments, system memory 2254 includes therein a plurality of such program code and modules, including applications such as sensor device application 2256 and other applications 2257. System memory 2254 can also include operating system (OS) 2258, firmware interface 2259 such as basic input/output system (BIOS) or Uniform Extensible Firmware Interface (UEFI), and platform firmware 2260. Computer data 2261 that is used by applications is stored in system memory 2254. Examples of computer data 2261 are dynamic switching thresholds 2262 and trend data 2263. These software and/or firmware modules have varying functionality when their corresponding program code is executed by processor subsystem 2248 or secondary processing devices within human interface system 2100.

Data storage subsystem 2265 provides nonvolatile storage accessible to controller 2114. For example, data storage subsystem 22654 can provide a large selection of other applications 2257 that can be loaded into system memory 2254. I/O subsystem 2209 includes or remotely communicates with input and output devices such as an integral user interface device 2220. Power for the human interface system 2100 can be provided by a rechargeable power supply 2270.

Figure 25B:
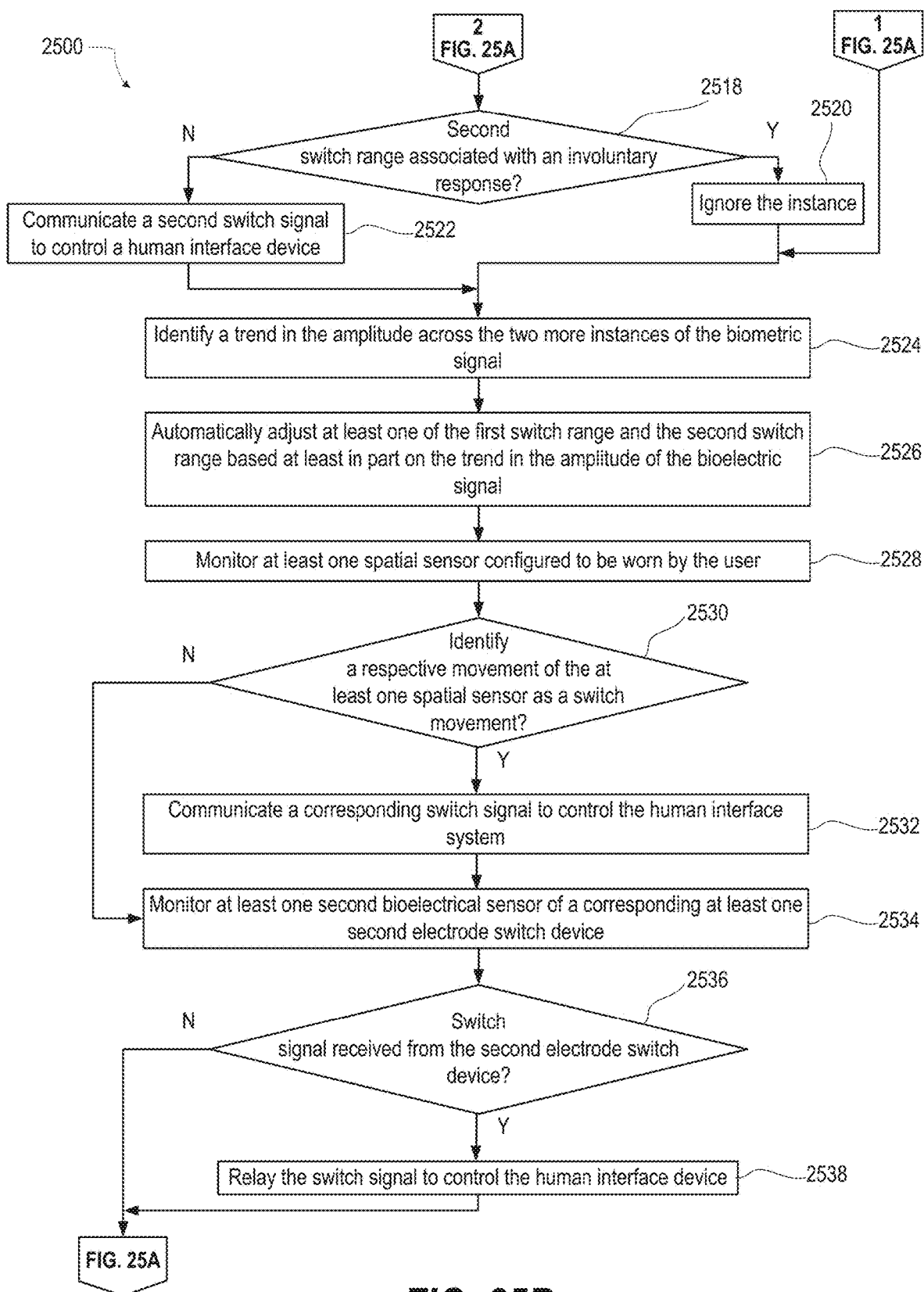

FIGS. 25A-25B depict a flow diagram of a method 2500 for multiple switch level control of a human interface system. Controller 2114 can execute program code on a computer program product to configure the human interface system 2100 (FIG. 20) to perform the functionality of method 2500 described herein. Component referenced in method 2500 can be the identical or similar components described above for FIGS. 20-22, 23A-23B, and 24. With reference to FIG. 25A, method 2500 includes receiving a biosignal from a bioelectrical sensor by an electronic processor of a first electrode switch device (block 2502). Method 2500 includes automatically adjusting, by the electronic processor, a switch range with initial values of a resting threshold and a switch threshold (block 2504).

Method 2500 includes determining a resting threshold, and a first switch threshold, and a second switch threshold, the first switch threshold being greater than the resting threshold and the second switch threshold being greater than the first switch threshold (block 2506). Method 2500 includes monitoring, by the electronic processor, a range of two or more instances within a predefined period of time of a biosignal from a set of electrodes placed on a user at a target muscle site (block 2508). Each instance includes a first resting level, followed by a switching level that is greater than the first resting level, and second resting level that is less than the switching level. Method 2500 includes comparing, by the electronic processor, an amplitude of the biosignal to both: (i) a first switch range defined by the resting threshold and the first switch threshold and (ii) a second switch range that is defined between the resting threshold and the second switch threshold (block 2510). Method 2500 includes determining whether the amplitude of the biosignal has changed from less than the first switch range to greater than the first switch range and less than the second switch range (decision block 2512). In response to determining that the amplitude of the biosignal has not changed from less than the first switch range to greater than the first switch range and less than the second switch range, method 2500 proceeds to decision block 2516. In response to determining that the amplitude of the biosignal has changed from less than the first switch range to greater than the first switch range and less than the second switch range, method 2500 includes communicating, by the first electrode switch device, a first switch signal to control a human interface device (block 2514). Then method 2500 proceeds to block 2524 (FIG. 25B). In response to determining that the amplitude of the biosignal has not changed from less than the first switch range to greater than the first switch range and less than the second switch range, method 2500 includes determining whether the amplitude of the biosignal has changed from less than the second switch range to greater than the second switch range (decision block 2516). In response to determining that the amplitude of the biosignal has not changed from less than the second switch range to greater than the second switch range, method 2500 proceeds to block 2524 (FIG. 25B).

Method 2500 continues with reference to FIG. 25B. In response to determining that the amplitude of the biosignal has changed from less than the second switch range to greater than the second switch range, method 2500 includes determining whether the second switch range is associated with an involuntary response (decision block 2518). In response to determining that the second switch range is associated with an involuntary response, method 600 includes ignoring the instance (block 2520). Then method 2500 proceeds to block 2524 (FIG. 25B). In response to determining that the second switch range is not associated with an involuntary response, method 2500 includes communicating, by the first electrode switch device, a second switch signal to control the human interface system (block 2522). Method 2500 includes identifying, by the electronic processor, a trend in the amplitude across the two more instances of the biometric signal (block 2524). Method 2500 includes automatically adjusting, by the electronic processor, at least one of the first switch range and the second switch range based at least in part on the trend in the amplitude of the biosignal based on a change in at least one of: (i) fatigue level of the user; and (ii) electrode interface condition to respond reliably and accurately to minimal signals at the target muscle site that are volitionally generated by a user (block 2526). Method 2500 includes monitoring at least one spatial sensor configured to be worn by the user (block 2528). Method 2500 includes determining whether a respective movement of the at least one spatial sensor is identified as a switch movement (decision block 2530). In response to determining that the respective movement of the at least one spatial sensor is not identified as a switch movement, method 2500 proceeds to block 2534. In response to determining that the respective movement of the at least one spatial sensor is identified as a switch movement, method 2500 includes communicating, by the first electrode switch device, a corresponding switch signal to control the human interface system in response to the switch movement (block 2532). Method 2500 includes monitoring at least one second bioelectrical sensor of a corresponding at least one second electrode switch device (block 2534). Method 2500 includes determining whether a switch signal is received from a second electrode switch device (decision block 2536). In response to not receiving the switch signal from the second electrode switch device, method 2500 returns to block 2502 (FIG. 25A). In response to receiving the switch signal from the second electrode switch device, method 2500 includes relaying, by the first electrode switch device, a corresponding switch signal received from the at least one second bioelectrical sensor of the corresponding at least one second electrode switch device to control the human interface system in response (block 2538). Then method 2500 returns to block 2502 (FIG. 25A).

It must be noted that, as used in this specification and the appended claims, the singular forms "a," "an" and "the" include plural referents unless the content clearly dictates otherwise. Thus, for example, reference to a "colorant agent" includes two or more such agents. Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions. It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A method comprising:
   receiving a biosignal from a bioelectrical sensor by an electronic processor of a first electrode switch device;
   determining a resting threshold, and a first switch threshold, and a second switch threshold, the first switch threshold being greater than the resting threshold and the second switch threshold being greater than the first switch threshold;
   monitoring, by the electronic processor, a range of two or more instances within a predefined period of time of a biosignal from a set of electrodes placed on a user at a target muscle site, each instance comprising a first resting level, followed by a switching level that is greater than the first resting level, and second resting level that is less than the switching level;
   comparing, by the electronic processor, an amplitude of the biosignal to both: (i) a first switch range defined by the resting threshold and the first switch threshold and (ii) a second switch range that is defined between the resting threshold and the second switch threshold;
   in response to determining that the amplitude of the biosignal has changed from less than the first switch range to greater than the first switch range and less than the second switch range, communicating, by the first electrode switch device, a first switch signal to control a human interface device; and
   in response to determining that the amplitude of the biosignal has changed from less than the second switch range to greater than the second switch range, performing one of: (i) ignoring the instance and (ii) communicating, by the first electrode switch device, a second switch signal to control the human interface system.

2. The method of claim 1, further comprising:
   automatically adjusting, by the electronic processor, a switch range with initial values of a resting threshold and a switch threshold;
   identifying, by the electronic processor, a trend in the amplitude across the two more instances of the biometric signal; and
   automatically adjusting, by the electronic processor, at least one of the first switch range and the second switch range based at least in part on identifying the trend in the amplitude of the biosignal based on a change in at least one of: (i) fatigue level of the user; and (ii) electrode interface condition to respond reliably and accurately to minimal signals at the target muscle site that are volitionally generated by a user.

3. The method of claim 1, further comprising ignoring the instance in response to determining that the amplitude of the biosignal has changed from less than the second switch range to greater than the second switch range.

4. The method of claim 1, further comprising communicating, by the first electrode switch device, the second switch signal to control the human interface system in response to determining that the amplitude of the biosignal has changed from less than the second switch range to greater than the second switch range.

5. The method of claim 1, further comprising:
monitoring at least one spatial sensor configured to be worn by the user;
determining whether a respective movement of the at least one spatial sensor is identified as a switch movement; and
communicating, by the first electrode switch device, a corresponding switch signal to control the human interface system in response to the switch movement.

6. The method of claim 1, further comprising:
monitoring at least one second bioelectrical sensor of a corresponding at least one second electrode switch device; and
relaying, by the first electrode switch device, a corresponding switch signal received from the at least one second bioelectrical sensor of the corresponding at least one second electrode switch device to control the human interface system in response.

7. A human interface system comprising:
a first electrode switch device comprising a bioelectrical sensor having a set of electrodes configured to be placed on a user at a target muscle site to receive a biosignal;
a controller having an electronic processor communicatively connected to the bioelectrical sensor and a human interface device, and which:
determines a resting threshold, and a first switch threshold, and a second switch threshold, the first switch threshold being greater than the resting threshold and the second switch threshold being greater than the first switch threshold;
monitors a range of two or more instances within a predefined period of time of a biosignal from a set of electrodes placed on a user at a target muscle site, each instance comprising a first resting level, followed by a switching level that is greater than the first resting level, and second resting level that is less than the switching level;
compares an amplitude of the biosignal to both: (i) a first switch range defined by the resting threshold and the first switch threshold and (ii) a second switch range that is defined between the resting threshold and the second switch threshold;
in response to determining that the amplitude of the biosignal has changed from less than the first switch range to greater than the first switch range and less than the second switch range, communicates a first switch signal to control a human interface device; and
in response to determining that the amplitude of the biosignal has changed from less than the second switch range to greater than the second switch range, performs one of: (i) ignoring the instance and (ii) communicating, by the first electrode switch device, a second switch signal to control the human interface system.

8. The human interface system of claim 7, wherein the controller:
automatically adjusts a switch range with initial values of a resting threshold and a switch threshold;
identifies, by the electronic processor, a trend in the amplitude across the two more instances of the biometric signal; and
automatically adjusts at least one of the first switch range and the second switch range based at least in part on identifying the trend in the amplitude of the biosignal based on a change in at least one of: (i) fatigue level of the user; and (ii) electrode interface condition to respond reliably and accurately to minimal signals at the target muscle site that are volitionally generated by a user.

9. The human interface system of claim 7, wherein the controller ignores the instance in response to determining that the amplitude of the biosignal has changed from less than the second switch range to greater than the second switch range.

10. The human interface system of claim 7, wherein the controller communicates the second switch signal to control the human interface system in response to determining that the amplitude of the biosignal has changed from less than the second switch range to greater than the second switch range.

11. The human interface system of claim 7, further comprising at least one spatial sensor configured to be worn by the user and communicatively coupled to the controller, wherein the controller:
determines whether a respective movement of the at least one spatial sensor is identified as a switch movement; and
communicates a corresponding switch signal to control the human interface system in response to the switch movement.

12. The human interface system of claim 7, further comprising:
monitors at least one second bioelectrical sensor of a corresponding at least one second electrode switch device; and
relaying, by the first electrode switch device, a corresponding switch signal received from the at least one second bioelectrical sensor of the corresponding at least one second electrode switch device to control the human interface system in response.

13. A computer program product comprising:
a computer readable storage device; and
program code on the computer readable storage device that when executed by a processor associated with an electrode switch device, the program code enables the electrode switch device to provide functionality of:
receiving a biosignal from a bioelectrical sensor;
determining a resting threshold, and a first switch threshold, and a second switch threshold, the first switch threshold being greater than the resting threshold and the second switch threshold being greater than the first switch threshold;
monitoring a range of two or more instances within a predefined period of time of a biosignal from a set of electrodes placed on a user at a target muscle site, each instance comprising a first resting level, followed by a switching level that is greater than the first resting level, and second resting level that is less than the switching level;
comparing an amplitude of the biosignal to both: (i) a first switch range defined by the resting threshold and the first switch threshold and (ii) a second switch range that is defined between the resting threshold and the second switch threshold;

in response to determining that the amplitude of the biosignal has changed from less than the first switch range to greater than the first switch range and less than the second switch range, communicating, by the first electrode switch device, a first switch signal to control a human interface device; and in response to determining that the amplitude of the biosignal has changed from less than the second switch range to greater than the second switch range, performing one of: (i) ignoring the instance and (ii) communicating, by the first electrode switch device, a second switch signal to control the human interface system.

14. The computer program product of claim 13, wherein the program code enables the electronic device to provide the functionality of:

automatically adjusting a switch range with initial values of a resting threshold and a switch threshold;

identifying a trend in the amplitude across the two more instances of the biometric signal; and automatically adjusting at least one of the first switch range and the second switch range based at least in part on identifying the trend in the amplitude of the biosignal based on a change in at least one of: (i) fatigue level of the user; and (ii) electrode interface condition to respond reliably and accurately to minimal signals at the target muscle site that are volitionally generated by a user.

15. The computer program product of claim 13, wherein the program code enables the electronic device to provide the functionality of ignoring the instance in response to determining that the amplitude of the biosignal has changed from less than the second switch range to greater than the second switch range.

16. The computer program product of claim 13, wherein the program code enables the electronic device to provide the functionality of communicating the second switch signal to control the human interface system in response to determining that the amplitude of the biosignal has changed from less than the second switch range to greater than the second switch range.

17. The computer program product of claim 13, wherein the program code enables the electronic device to provide the functionality of:

monitoring at least one spatial sensor configured to be worn by the user;

determining whether a respective movement of the at least one spatial sensor is identified as a switch movement; and communicating, by the first electrode switch device, a corresponding switch signal to control the human interface system in response to the switch movement.

18. The computer program product of claim 13, wherein the program code enables the electronic device to provide the functionality of:

monitoring at least one second bioelectrical sensor of a corresponding at least one second electrode switch device; and relaying, by the first electrode switch device, a corresponding switch signal received from the at least one second bioelectrical sensor of the corresponding at least one second electrode switch device to control the human interface system in response.

* * * * *